(12) United States Patent
Tahara et al.

(10) Patent No.: US 7,048,428 B2
(45) Date of Patent: May 23, 2006

(54) LIGHT GUIDE PLATE WITH CONVEX PORTIONS HAVING LOW RADIUS OF CURVATURE TIPS, OR LOW SURFACE ROUGHNESS

(75) Inventors: Hisashi Tahara, Hiratsuka (JP); Akimasa Kaneishi, Hiratsuka (JP)

(73) Assignee: Mitsubishi Engineering-Plastics Corp., Tokyo (JP)

( * ) Notice: Subject to any disclaimer, the term of this patent is extended or adjusted under 35 U.S.C. 154(b) by 379 days.

(21) Appl. No.: 10/119,767

(22) Filed: Apr. 11, 2002

(65) Prior Publication Data

US 2002/0181224 A1    Dec. 5, 2002

(30) Foreign Application Priority Data

Apr. 12, 2001  (JP)  .............. 2001-113892
Apr. 8, 2002   (JP)  .............. 2002-104969

(51) Int. Cl.
  *F21V 7/22*  (2006.01)
(52) U.S. Cl. .............. 362/626; 362/625; 362/623; 349/62
(58) Field of Classification Search ............ 362/31, 362/361, 339, 330, 626, 561, 23, 26, 29, 362/600, 615, 623, 625, 551, 559, 560, 317, 362/326, 327, 341; 349/63, 65, 62, 61; 385/129, 385/901
See application file for complete search history.

(56) References Cited

U.S. PATENT DOCUMENTS

| | | | | | |
|---|---|---|---|---|---|
| 4,737,896 | A | * | 4/1988 | Mochizuki et al. | 362/301 |
| 5,575,549 | A | * | 11/1996 | Ishikawa et al. | 362/31 |
| 5,727,107 | A | * | 3/1998 | Umemoto et al. | 385/129 |
| 5,741,446 | A | | 4/1998 | Tahara et al. | |
| 6,486,931 | B1 | * | 11/2002 | Ueda | 362/31 |
| 6,729,736 | B1 | * | 5/2004 | Umemoto | 362/31 |
| 6,835,440 | B1 | * | 12/2004 | Konishi et al. | 362/31 |

FOREIGN PATENT DOCUMENTS

| | | |
|---|---|---|
| JP | 8-318534 | 12/1996 |
| JP | 10-55712 | 2/1998 |
| JP | 11-34068 | 2/1999 |
| JP | 11-42650 | 2/1999 |

* cited by examiner

*Primary Examiner*—Thomas M. Sember
*Assistant Examiner*—Ismael Negron
(74) *Attorney, Agent, or Firm*—Wenderoth, Lind & Ponack, L.L.P.

(57) ABSTRACT

A light guide plate made of a transparent resin includes a first main surface and a second main surface opposite to the first main surface. The first main surface has a surface portion provided with convex portions having a height in the range of $5\times10^{-7}$ m to $6\times10^{-5}$ m each and a pitch in the range of $5\times10^{-7}$ m to $4\times10^{-4}$ m. The light guide plate having tip portions of at least 80% of the total convex portions with a radius of curvature of $2\times10^{-6}$ m or less, or the surface of the convex portions having a surface roughness of $3\times10^{-7}$ m or less.

34 Claims, 19 Drawing Sheets

LIGHT GUIDE PLATE WITH CONVEX PORTIONS HAVING LOW RADIUS OF CURVATURE TIPS, OR LOW SURFACE ROUGHNESS

BACKGROUND OF THE INVENTION AND RELATED ART STATEMENT

The present invention relates to a light guide plate (light guiding plate) made of a transparent resin for a liquid crystal display in a personal computer, a cellular phone, PDA (personal digital assistant) and the like or for use in other fields, a molding method of a light guide plate, an insert block suitable for molding the above light guide plate, a mold assembly having the insert block suitable for molding the above light guide plate, and an area light apparatus (surface-emitting light source apparatus) having such a light guide plate.

A liquid crystal display for use in a personal computer, a cellular phone, PDA and the like has an area light apparatus incorporated to cope with demands of a decrease in thickness, a decrease in weight, power saving, higher brightness and higher definition of the liquid crystal display. The area light apparatus generally has a wedge-shaped light guide plate having tapered slanting surfaces. The light guide plate has a flat first main surface and a flat second main surface opposite to the first main surface, and is generally made from a transparent material.

A light source is incorporated into light tools or lights of transportation means such as an automobile, a train, a vessel and an aircraft (for example, a headlight, a taillight, a high-mount stop light, a small light, a turn signal lamp, a fog light, a room lamp, a light for meter panel, light sources housed in various buttons, a destination display lamp, an emergency light, an emergency exit guiding lamp, etc.); various light tools and lights of buildings (for example, an outdoor lamp, an interior lamp, an illuminator, an emergency lamp, an emergency exit guiding lamp, etc.); a street lamp; a signal; a display board; illuminators for a machine and an apparatus; and a lighting portion of a tunnel and an underpass. A reflector is also sometimes provided thereto. These will be sometimes generically referred to as "lighting tool" hereinafter.

In a back-light-type area light apparatus in a liquid crystal display, the area light apparatus is arranged such that a second main surface 344 of a wedge-shaped light guide plate 340 faces a liquid crystal display 60 as its conceptual view is shown in FIG. 21A (in FIGS. 21A and 21B, a concave-convex portion 342 is formed in a first main surface 341. Light that is emitted from a light source 350 and enters a larger-thickness end portion 345 of the wedge-shaped light guide plate 340 is divided into light that is reflected by the first main surface 341 and transmitted from the second main surface 344 and light that is transmitted through the first main surface 341. The light that is transmitted through the first main surface 341 is reflected from a reflection member 351 positioned so as to face the first main surface 341, re-enters the light guide plate 340 and is transmitted from the second main surface 344. Light that is transmitted from the second main surface 344 is introduced to the liquid crystal display 60 positioned so as to face the second main surface 344. Between the liquid crystal display 60 and the second main surface 344 of the light guide plate 340, generally, a stack of a plurality of prism sheets 355 and a plurality of diffusing sheets 352 are arranged and work to uniformly diffuse the light.

In a front-light-type area light apparatus in a liquid crystal display, the area light apparatus is arranged such that a second main surface 344 of a light guide plate 340 faces a liquid crystal display 60 as its conceptual view is shown in FIG. 21B. Light that is emitted from a light source 350 and enters a large-thickness end portion 345 of the wedge-shaped light guide plate 340 is reflected by a first main surface 341 and is transmitted through the second main surface 344. And, the light is allowed to pass through the liquid crystal display 60 arranged in a position facing the second main surface 344, is reflected by a reflection member 354 and is allowed to re-pass through the liquid crystal display 60. This light further passes through a phase-shift film 353 and an anti-reflection layer (not shown) formed on the second main surface 344 of the light guide plate 340 and is transmitted through the first main surface 341 of the light guide plate 340, to be recognized as a screen image. The front-light-type area light apparatus gives a brighter screen than the back-light-type area light apparatus and can attain a bright screen with external light alone if it is a daytime, so that it has an advantage that a power consumption can be decreased.

Meanwhile, a plurality of the prism sheets 355 have problems that they are expensive and that the number of steps for assembling them is large. The above problems are overcome by forming a concavo-convex portion 342 in the first main surface 341 of the light guide plate 340 (see, for example, JP-A-55712/1998). For attaining low power consumption and a higher brightness, it is required to improve the brightness efficiency by increasing the density of the concavo-convex portion 342 having a prism form to the utmost. Further, it is attempted to remove the diffusion sheet by providing the second main surface 344 with an emboss having a light-diffusing effect by blast finishing.

Conventionally, the above light guide plate is formed from a material such as PMMA. However, the heat to be generated inside a machine such as a personal computer, a cellular phone, PDA and the like tends to increase, and the above material is being replaced with a polycarbonate resin having high heat resistance.

However, when the light guide plate 340 having the prism-shaped concavo-convex portion 342 in the surface is formed from a polycarbonate resin having poor flowability by an injection molding method, particularly, there is caused a problem that no prism-shaped concavo-convex portion can be formed in a surface portion of a light guide plate positioned far from a gate portion. It is assumed that the above phenomenon is caused as follows. Since the cavity surface of a mold is made of a metal, a molten polycarbonate resin injected into a cavity is rapidly cooled, and as a result, a solidified layer is formed, and the solidified layer inhibits the formation of the prism-shaped concavo-convex portion 342 in that portion.

For example, JP-A-318534/1996 discloses a method in which an insert block made of zirconia ($ZrO_2$) ceramics including partially stabilized zirconia (partially stabilized zirconium oxide, $ZrO_2$) is incorporated into a mold for molding a molded article made of a thermoplastic resin, to improve the surface appearance, etc., of the molded article. In the mold having a first mold member and a second mold member, disclosed in the above Japanese Laid-open Patent Publication, the insert block is arranged in the first mold member, and a cover plate for protecting the end portion of the insert block is attached to the first mold member so that no load is exerted on the insert block when the first mold member and the second mold member are clamped, to prevent the damage of the insert block. And, the surface of a portion of the insert block facing the cover plate (to be sometimes referred to as "facing surface of the insert block" hereinafter) and the cover plate are arranged to have a clearance of 0.03 mm or less.

When such an insert block is used to form a light guide plate whose surface has a prism-shaped concavo-convex portion, it is required to mechanically machine the surface of the insert block to form a concavo-convex portion in the surface of the insert block. However, it is difficult to form a prism-shaped concavo-convex portion in zirconia ceramics, since the zirconia ceramics has high hardness and is fragile. When an insert block is manufactured from zirconia ceramics and then the concavo-convex portion is mechanically formed in the surface of the insert block, it is difficult to form an intended shape or pattern. Further, when the concavo-convex portion is mechanically formed in the surface concurrently with the formation of the insert block from zirconia ceramics, the insert block is liable to break due to a crack that occurs in the surface.

It is therefore difficult to employ a method in which the concavo-convex portion is formed in the surface of the insert block disclosed in JP-A-318534/1996 and the concavo-convex portion is transferred to the surface of the light guide plate while improving transferability and overcoming non-uniformity in the transfer.

In the technique disclosed in JP-A-318534/1996, the insert block is made of a fragile inorganic material such as ceramics or glass. Particularly, the end portion of the insert block has a form weak in view of strength, so that there is caused a problem that when a stress is exerted on the end portion during assembling of a mold, the insert block is broken. In a mold disclosed, for example, in JP-A-42650/1999, when a surface of an insert block and an insert-block-covering portion, facing such a surface of the insert block, have no sufficient high parallelism during clamping of the mold, there is a risk that the end portion of the insert block comes in contact with the insert-block-covering portion and, as a result, may be broken.

Zirconia ceramics used for the above insert block has hardness at least twice as high as hardness of metal. It is therefore difficult to cut zirconia ceramics with a general metal working machine. Further, when it is cut (machined), the end portion of a cutting tool is liable to escape so that cutting is very difficult. For fitting an insert block in a mold member accurately at a clearance of 0.03 mm or less, therefore, not only is it required to fabricate the insert block with accuracy of ±0.01 mm so that the insert block itself is improved in machining accuracy, but it is also required to delicately machine and adjust a mold portion to which the insert block is to be fitted (insert-block-fitting portion) and an insert-block-covering portion to the dimensions of the insert block. Further, when the insert block is constituted in a three-dimensional form, the problem is that metal machining of a mold portion near the insert-block-fitting portion is very difficult, so that it is required to rely on an ultra-precision working machine or a highly skilled worker. Further, as the machining accuracy of the insert block increases, the production cost of the insert block decreases, and further, the cost of the mold itself increases.

Moreover, when an insert block made of zirconia ceramics is fitted to a mold portion provided with the insert-block-covering portion, or when the insert block is fitted to a first mold member, the insert block may break if the fitting is not highly accurate. A working machine for ceramics and a working machine for metal differ, and such a difference makes the fitting of the insert block difficult.

That is, it is difficult to cut an insert block made of ceramics with a surface cutting machine for metal. It is therefore required to cut the insert-block-fitting portion to the height (or thickness) of the insert block fabricated, or cut the reverse surface of a metal plate bonded to the reverse surface of an insert block with an adhesive, in order to adjust a clearance between the height (or thickness) of the insert block and the insert-block-fitting portion. However, the above machining is complicated. Further, when the thickness of the adhesive is not uniform, the procedure of cutting the reverse surface of the metal plate for adjusting the height (or thickness) of the insert block is required to be carried out several times, so that the number of steps for manufacturing increases and increases a cost. Further, it is required to carry out the cutting with a precision cutting machine for improving the parallelism between the mold parting surface and the insert block. When the parallelism between the mold parting surface and the insert block is poor, there is caused a problem that the insert block may break in a worst case.

If a metal layer having a thickness sufficient for machining with a general metal working machine is formed on the surface of an insert block made of zirconia ceramics, it is no longer necessary to attain extremely high metal machining accuracy of a mold portion near the insert-block-fitting portion. That is, the metal layer formed on the surface of the insert block made of zirconia ceramics is machined with a metal working machine, whereby the insert block can be finely adjusted to a mold or the insert-block-fitting portion.

Since, however, general zirconia ceramics is electrically non-conductive, it is required to employ a chemical vapor deposition method (CVD method) or a physical vapor deposition method (PVD method) such as a vacuum deposition method, a sputtering method, an ion plating method, an ion beam deposition method and an IVD method (ion vapor deposition method) for forming a metal layer on the surface of an insert block, as described in JP-A-34068/1999. By any one of these methods, generally, a metal layer having a thickness of 20 μm or less can be formed on the surface of the insert block. In these methods, however, it is difficult to form any metal layer having a thickness sufficient for cutting with a general cutting machine on the surface of the insert block. Further, the cost of forming the metal layer is high, and another problem is that the adhesion of the metal layer to the surface of the insert block is not so high.

It is thinkable to employ a method of forming a thick metal layer on the surface of an insert block made of zirconia ceramics by an electric plating method. Since, however, general zirconia ceramics is electrically non-conductive as already described, it is impossible to form the metal layer by an electric plating method alone. Further, when the metal layer is formed by an electric plating method, it is required to form an intermediate layer or film on the surface of the insert block so that the metal layer has higher adhesion to the zirconia ceramics.

An insert block made of zirconia ceramics has low strength particularly in an edge portion, and a C plane cut or an R rounded surface finishing is generally retained in the edge portion. However, some insert blocks are required to have a sharp edge portion depending upon the forms of molded articles. In some cases, a parting surface on which a mold clamping force is exerted is required to be constituted of an edge portion of an insert block. In these cases, if the breakage of the edge portion of the insert block can be reliably prevented, molded articles can be considerably improved in the degree of freedom of their forms.

For example, a diamond-shaped concavo-convex portion having a relatively large height and a large pitch of peaks and valleys is formed in a surface of a light-transmitting member constituting a lighting tool typified by a light tool of a transportation means. The lighting tool is designed such that light emitted from a light source is reflected by a reflection member and that the light is collectively reflected or diffuse-reflected by a concavo-convex portion for visual observation of the light in a broad range. However, the concavo-convex portion has a relatively large height and has a large pitch of peaks and valleys, and further, the distance from the light source to the concavo-convex portion differs depending upon peaks and valley regions of the concavo-convex portion, so that non-uniformity in brightness is liable to occur, or light from the source or light reflected by the reflection member cannot always be fully utilized. For overcoming the above problems, the pitch of the concavo-convex portions is decreased, and the number of peaks and valleys of the concavo-convex portion is increased. However, it is difficult to form fine peaks and valleys of the concavo-convex portion in the surface of the light-transmitting member by an injection molding method. Further, the reflection member has a relatively large size (volume), and it is greatly demanded to decrease the lighting tool in size depending upon where the lighting tool is placed.

Further, in the lighting tool typified, for example, by a room lamp, a cover of the lighting tool has a coarse diffusion pattern or a kind of lens pattern for effectively utilizing light from a light source (for example, fluorescent lamp). However, the effect of the diffusion pattern or lens pattern is not so high, and the number of such lighting tools is actually increased to secure brightness indoors or in some other place. However, it cannot be said that the above measures are preferred in view of energy saving. In a room or underpass not exposed to sunlight, further, it is often required to keep a lighting tool or the like on. For a safety reason, for example, an emergency lamp is always kept on. In such cases, it is very important to accomplish effective use of light from a light source from the viewpoint of energy saving.

OBJECT AND SUMMARY OF THE INVENTION

It is a first object of the present invention to provide a light guide plate (light guiding plate) that has desired concave portions or convex portions accurately and reliably formed in its surface and is made of a transparent resin and a molding method of a light guide plate, an insert block that permits accurate and reliable formation of desired concave portions or convex portions in the surface of a light guide plate (light guiding plate) made of a transparent resin, a mold assembly into which the above insert block is incorporated, and an area light apparatus (surface-emitting light source apparatus) into which the above light guide plate (light guiding plate) is incorporated.

It is a second object of the present invention to provide a mold assembly for use with an insert block, which can be relatively easily adjusted when the insert block is attached to a mold portion, which permits a decrease in fabrication cost of a mold assembly, which can reliably prevent damage or breakage of an end portion or an edge portion of the insert block, which is excellent in transfer of a cavity surface of the insert block to the surface of a light guide plate (light guiding plate), and which has durability against continuous operation of molding for a long period of time, in addition to the above first object.

According to a first aspect of the present invention for achieving the above first object, there is provided a light guide plate (light guiding plate) which is made of a transparent resin and has a first main surface and a second main surface opposite to said first main surface, said first main surface having a surface portion provided with convex portions having a height of $5 \times 10^{-7}$ m to $6 \times 10^{-5}$ m each and a pitch of $5 \times 10^{-7}$ m to $4 \times 10^{-4}$ m, each convex portion having a tip portion, and the convex portions of at least 80% of the total convex portions having the tip portions having a radius of curvature of $2 \times 10^{-6}$ m or less.

Light guide plates according to second to fourth aspects of the present invention, area light apparatuses (surface-emitting light source apparatuses) according to first to fourth aspects of the present invention, insert blocks according to first to fourth aspects of the present invention, mold assemblies according to first to fourth aspects of the present invention, and molding methods of a light guide plate made of a transparent resin according to first to fourth aspects of the present invention will be explained hereinafter. The light guide plate (light guiding plate) and the area light apparatus (surface-emitting light source apparatus) according to the first aspect of the present invention will be generically referred to as "light guide plate/area light apparatus according to the first aspect of the present invention". The light guide plate (light guiding plate) and the area light apparatus (surface-emitting light source apparatus) according to the second aspect of the present invention will be generically referred to as "light guide plate/area light apparatus according to the second aspect of the present invention". The light guide plate (light guiding plate) and the area light apparatus (surface-emitting light source apparatus) according to the third aspect of the present invention will be generically referred to as "light guide plate/area light apparatus according to the third aspect of the present invention". The light guide plate (light guiding plate) and the area light apparatus (surface-emitting light source apparatus) according to the fourth aspect of the present invention will be generically referred to as "light guide plate/area light apparatus according to the fourth aspect of the present invention". Further, the light guide plates (light guiding plates) and the area light apparatuses (surface-emitting light source apparatuses) according to the first to fourth aspects of the present invention will be generically referred to as "light guide plate/area light apparatus of the present invention".

Further, an insert block, a mold assembly and a molding method of a light guide plate made of a transparent resin according to the first aspect of the present invention will be generically referred to as "insert block/mold assembly/molding method according to the first aspect of the present invention". An insert block, a mold assembly and a molding method of a light guide plate made of a transparent resin according to the second aspect of the present invention will be generically referred to as "insert block/mold assembly/molding method according to the second aspect of the present invention". An insert block, a mold assembly and a molding method of a light guide plate made of a transparent resin according to the third aspect of the present invention will be generically referred to as "insert block/mold assembly/molding method according to the third aspect of the present invention". An insert block, a mold assembly and a molding method of a light guide plate made of a transparent resin according to the fourth aspect of the present invention will be generically referred to as "insert block/mold assembly/molding method according to the fourth aspect of the present invention". Further, the insert blocks, the mold assemblies and the molding methods of a light guide plate made of a transparent resin according to the first to fourth aspects of the present invention will be generically referred to as "insert block/mold assembly/molding method of the present invention".

Further, the light guide plate/area light apparatus according to the first aspect of the present invention and the light guide plate/area light apparatus according to the third aspect of the present invention will be generically referred to as "light guide plate/area light apparatus according to the first/third aspects of the present invention". The light guide plate/area light apparatus according to the second aspect of the present invention and the light guide plate/area light apparatus according to the fourth aspect of the present invention will be generically referred to as "light guide plate/area light apparatus according to the second/fourth aspects of the present invention". The insert block/mold assembly/molding method according to the first aspect of the present invention and the insert block/mold assembly/molding method according to the third aspect of the present invention will be generically referred to as "insert block/mold assembly/molding method according to the first/third aspects of the present invention". The insert block/mold assembly/molding method according to the second aspect of the present invention and the insert block/mold assembly/molding method according to the fourth aspect of the present invention will be generically referred to as "insert block/mold assembly/molding method according to the second/fourth aspects of the present invention". Further, the light guide plate/area light apparatus according to any one of the first to fourth aspects of the present invention and the insert block/mold assembly/molding method according to any one of the first to fourth aspects of the present invention will be simply generically referred to as "the present invention", and the mold assemblies and the molding methods according to the first to fourth aspects of the present invention will be generically referred to as "mold assembly/molding method of the present invention".

According to the first aspect of the present invention for achieving the above first object, there is provided an area light apparatus (surface-emitting light source apparatus) comprising;

(a) a light guide plate (light guiding plate) which is made of a transparent resin and has a first main surface and a second main surface opposite to said first main surface, said first main surface having a surface portion provided with convex portions having a height of $5 \times 10^{-7}$ m to $6 \times 10^{-5}$ m each and a pitch of $5 \times 10^{-7}$ m to $4 \times 10^{-4}$ m, each convex portion having a tip portion, and the convex portions of at least 80% of the total convex portions having the tip portions having a radius of curvature of $2 \times 10^{-6}$ m or less, and (b) a light source, the light guiding plate having the form of a wedge-shaped truncated quadrangular pyramid as a whole, opposite two side walls of the truncated quadrangular pyramid corresponding to said first main surface and said second main surface, the light emitted from the light source enters through a side wall corresponding to a bottom surface of truncated quadrangular pyramid of the light guide plate, and the light exits from said first main surface and/or said second main surface of the light guide plate.

In the light guide plate/area light apparatus according to the first aspect of the present invention, or in a light guide plate in the insert block/mold assembly/molding method according to the first aspect of the present invention to be described later, desirably, the height of each convex portion is $5 \times 10^{-7}$ m to $6 \times 10^{-5}$ m, preferably $1 \times 10^{-6}$ m to $5 \times 10^{-5}$ m, more preferably $2 \times 10^{-6}$ m to $4 \times 10^{-5}$ m, and the pitch of the convex portions is $5 \times 10^{-7}$ m to $4 \times 10^{-4}$ m, preferably $5 \times 10^{-6}$ m to $3.5 \times 10^{-4}$ m, more preferably $3 \times 10^{-5}$ m to $3.0 \times 10^{-4}$ m. Further, desirably, the convex portions of at least 80%, preferably at least 85%, more preferably all, of the total convex portions have the tip portions having a radius of curvature of $2 \times 10^{-6}$ m or less, preferably $5 \times 10^{-7}$ m or less, more preferably $1 \times 10^{-7}$ m or less.

According to the second aspect of the present invention for achieving the above first object, there is provided a light guide plate (light guiding plate) which is made of a transparent resin and has a first main surface and a second main surface opposite to said first main surface, said first main surface having a surface portion provided with concave portions having a depth of $5 \times 10^{-7}$ m to $6 \times 10^{-5}$ m each and a pitch of $5 \times 10^{-7}$ m to $4 \times 10^{-4}$ m, each concave portion having a bottom portion, and the concave portions of at least 80% of the total concave portions having the bottom portions having a radius of curvature of $2 \times 10^{-6}$ m or less.

According to the second aspect of the present invention for achieving the above first object, there is provided an area light apparatus (surface-emitting light source apparatus) comprising;

(a) a light guide plate (light guiding plate) which is made of a transparent resin and has a first main surface and a second main surface opposite to said first main surface, said first main surface having a surface portion provided with concave portions having a depth of $5 \times 10^{7}$ m to $6 \times 10^{-5}$ m each and a pitch of $5 \times 10^{-7}$ m to $4 \times 10^{-4}$ m, each concave portion having a bottom portion, and the concave portions of at least 80% of the total concave portions having the bottom portions having a radius of curvature of $2 \times 10^{-6}$ m or less, and (b) a light source, the light guiding plate having the form of a wedge-shaped truncated quadrangular pyramid as a whole, opposite two side walls of the truncated quadrangular pyramid corresponding to said first main surface and said second main surface, the light emitted from the light source enters through a side wall corresponding to a bottom surface of truncated quadrangular pyramid of the light guide plate, and the light exits from said first main surface and/or said second main surface of the light guide plate.

In the light guide plate/area light apparatus according to the second aspect of the present invention, or in a light guide plate in the insert block/mold assembly/molding method according to the second aspect of the present invention to be described later, desirably, the depth of each concave portion is $5 \times 10^{-7}$ m to $6 \times 10^{-5}$ m, preferably $1 \times 10^{-6}$ m to $5 \times 10^{-5}$ m, more preferably $2 \times 10^{-6}$ m to $4 \times 10^{-5}$ m, and the pitch of the concave portions is $5 \times 10^{-7}$ m to $4 \times 10^{-4}$ m, preferably $5 \times 10^{-6}$ m to $3.5 \times 10^{-4}$ m, more preferably $3 \times 10^{-5}$ m to $3.0 \times 10^{-4}$ m. Further, desirably, the concave portions of at least 80%, preferably at least 85%, more preferably all, of the total concave portions have the bottom portions having a radius of curvature of $2 \times 10^{-6}$ m or less, preferably $5 \times 10^{-7}$ m or less, more preferably $1 \times 10^{-7}$ m or less.

According to the third aspect of the present invention for achieving the above first object, there is provided a light guide plate (light guiding plate) which is made of a transparent resin and has a first main surface and a second main surface opposite to said first main surface, said first main surface having a surface portion provided with convex portions having a height of $5 \times 10^{-7}$ m to $6 \times 10^{-5}$ m each and a pitch of $5 \times 10^{-7}$ m to $4 \times 10^{-4}$ m, and each convex portion having a surface roughness of 0.3 µm or less.

According to the third aspect of the present invention for achieving the above first object, there is provided an area light apparatus (surface-emitting light source apparatus) comprising;

(a) a light guide plate (light guiding plate) which is made of a transparent resin and has a first main surface and a second main surface opposite to said first main surface, said first main surface having a surface portion provided with convex portions having a height of $5 \times 10^{-7}$ m to $6 \times 10^{-5}$ m each and a pitch of $5 \times 10^{-7}$ m to $4 \times 10^{-4}$ m, each convex portion having a surface roughness of 0.3 µm or less, and (b) a light source, the light guiding plate having the form of a wedge-shaped truncated quadrangular pyramid as a whole, opposite two side walls of the truncated quadrangular pyramid corresponding to said first main surface and said second main surface, the light emitted from the light source enters through a side wall corresponding to a bottom surface of truncated quadrangular pyramid of the light guide plate, and the light exits from said first main surface and/or said second main surface of the light guide plate.

In the light guide plate/area light apparatus according to the third aspect of the present invention, or in a light guide plate in the insert block/mold assembly/molding method according to the third aspect of the present invention to be described layer, it is sufficient that at least 70%, preferably at least 80% of total of the convex portions formed in the surface portion of the first main surface satisfy a surface roughness of 0.3 µm or less, preferably 0.15 µm or less, more preferably 0.08 µm or less. Further, the height of each convex portion is $5 \times 10^{-7}$ m to $6 \times 10^{-5}$ m, preferably $1 \times 10^{-6}$ m to $5 \times 10^{-5}$ m, more preferably $2 \times 10^{-6}$ m to $4 \times 10^{-5}$ m, and the pitch of the convex portions is $5 \times 10^{-7}$ m to $4 \times 10^{-4}$ m, preferably $5 \times 10^{-6}$ m to $3.5 \times 10^{-4}$ m, more preferably $3 \times 10^{-5}$ m to $3.0 \times 10^{-4}$ m.

According to the fourth aspect of the present invention for achieving the above first object, there is provided a light guide plate (light guiding plate) which is made of a transparent resin and has a first main surface and a second main surface opposite to said first main surface, said first main surface having a surface portion provided with concave portions having a depth of $5 \times 10^{-7}$ m to $6 \times 10^{-5}$ m each and a pitch of $5 \times 10^{-7}$ m to $4 \times 10^{-4}$ m, and each concave portion having a surface roughness of 0.3 µm or less.

According to the fourth aspect of the present invention for achieving the above first object, there is provided an area light apparatus (surface-emitting light source apparatus) comprising;

(a) a light guide plate (light guiding plate) which is made of a transparent resin and has a first main surface and a second main surface opposite to said first main surface, said first main surface having a surface portion provided with concave portions having a depth of $5 \times 10^{-7}$ m to $6 \times 10^{-5}$ m each and a pitch of $5 \times 10^{-7}$ m to $4 \times 10^{-4}$ m, each concave portion having a surface roughness of 0.3 µm or less, and (b) a light source, the light guiding plate having the form of a wedge-shaped truncated quadrangular pyramid as a whole, opposite two side walls of the truncated quadrangular pyramid corresponding to said first main surface and said second main surface, the light emitted from the light source enters through a side wall corresponding to a bottom surface of truncated quadrangular pyramid of the light guide plate, and the light exits from said first main surface and!or said second main surface of the light guide plate.

In the light guide plate/area light apparatus according to the fourth aspect of the present invention, or in a light guide plate in the insert block/mold assembly/molding method according to the fourth aspect of the present invention to be described later, it is sufficient that at least 70%, preferably at least 80% of total of the concave portions formed in the surface portion of the first main surface satisfy a surface roughness of 0.3 µm or less, preferably 0.15 µm or less, more preferably 0.08 µm or less. Further, the depth of each concave portion is $5 \times 10^{-7}$ m to $6 \times 10^{-5}$ m, preferably $1 \times 10^{-6}$ m to $5 \times 10^{-5}$ m, more preferably $2 \times 10^{-6}$ m to $4 \times 10^{-5}$ m, and the pitch of the concave portions is $5 \times 10^{-7}$ m to $4 \times 10^{-4}$ m, preferably $5 \times 10^{-6}$ m to $3.5 \times 10^{-4}$ m, more preferably $3 \times 10^{-5}$ m to $3.0 \times 10^{-4}$ m.

In the light guide plate/area light apparatus according to the first/third aspects of the present invention, or in the light guide plate in the insert block/mold assembly/molding method according to the first/third aspects of the present invention, desirably, the value of minimum brightness value/maximum brightness value obtained as a result of brightness measurement of a plurality of parts of the surface portion provided with the convex portions in the first main surface satisfies at least 0.65, preferably at least 0.85, more preferably at least 0.9. In the light guide plate/area light apparatus according to the second/fourth aspects of the present invention, or in the light guide plate in the insert block/mold assembly/molding method according to the second/fourth aspects of the present invention, desirably, the value of minimum brightness value/maximum brightness value obtained as a result of brightness measurement of a plurality of parts of the surface portion provided with the concave portions in the first main surface satisfies at least 0.65, preferably at least 0.85, more preferably at least 0.9. The above brightness measurement is conducted as follows. For example, in a dark room, a light guide plate is placed on a unit capable of introducing light from an end portion of the light guide plate (for example, the side wall corresponding to the bottom surface of the truncated quadrangular pyramid) into the light guide plate, and light emitted from a lamp is introduced from the end portion of the light guide plate (for example, the side wall corresponding to the bottom surface of the truncated quadrangular pyramid) into the light guide plate. And, light emitted from the light guide plate is measured for a brightness with a brightness meter positioned approximately 35 cm above the light guide plate. The measurement range can be changed in size by changing the distance from the light guide plate to the brightness meter. In the brightness measurement of the light guide plate, preferably, the light guide plate is divided as equally as possible into regions sufficient for the measurement, and the measurement is conducted in the center of each region by placing the brightness meter right above the center of each region.

In the light guide plate/area light apparatus of the present invention, or in the light guide plate in the insert block/mold assembly/molding method of the present invention, preferably, the surface portion of the second main surface is nearly a plane surface, although the surface portion shall not be limited thereto. The surface portion of the second main surface may be a mirror surface, or may be, for example, a fine concavo-convex surface.

In the light guide plate/area light apparatus according to the first/third aspects of the present invention, or in the light guide plate in the insert block/mold assembly/molding method according to the first/third aspects of the present invention, each convex portion provided in the surface portion of the first main surface may comprise a continuous convex extending along a direction making a predetermined angle with the direction of incidence of light into the light guide plate. In the light guide plate/area light apparatus according to the first aspect of the present invention, or in the light guide plate in the insert block/mold assembly/molding method according to the first aspect of the present invention, the cross-sectional form of the continuous convex obtained by cutting the light guide plate with an imaginary plane that is in the direction of incidence of light into the light guide plate and perpendicular to the first main surface includes, for example, a triangle; any quadrilaterals including a square, a rectangle and a trapezoid; and any polygons. When the cross-sectional form of the continuous convex is a triangular form, a top edge line (ridge) of the continuous convex corresponds to the tip portion of the convex portion. When the above cross-sectional form is a quadrilateral or polygonal form, edge lines (ridges) defined by the top surface and the side walls of the continuous convex correspond to the tip portion of the convex portion. When even part of the edge line (ridge) of each convex portion fails to satisfy a radius of curvature of $2 \times 10^{-6}$ m or less, it is regarded as failing to satisfy the requirement that the tip portion of the convex portion has a radius of curvature of $2 \times 10^{-6}$ m or less. In the light guide plate/area light apparatus according to the third aspect of the present invention, or in the light guide plate in the insert block/mold assembly/molding method according to the third aspect of the present invention, the cross-sectional form of the continuous convex obtained by cutting the light guide plate with an imaginary plane that is in the direction of incidence of light into the light guide plate and perpendicular to the first main surface includes a triangle; any quadrilaterals including a square, a rectangle and a trapezoid; any polygons; and any moderate curves including a circle, an oval, a parabola, a hyperbola, a catenary and the like. The "direction making a predetermined angle with the direction of incidence of light into the light guide plate" means a direction at 60 degrees to 120 degrees when the direction of incidence of light into the light guide plate is taken as 0 degree. The "direction making a predetermined angle with the direction of incidence of light into the light guide plate" will be also used in this sense hereinafter.

In the light guide plate/area light apparatus according to the first/third aspects of the present invention, or in the light guide plate in the insert block/mold assembly/molding method according to the first/third aspects of the present invention, each convex portion provided in the surface portion of the first main surface may comprise discontinuous convexes (a kind of projections or protrusions) arranged along a direction making a predetermined angle with the direction of incidence of light into the light guide plate. In the light guide plate/area light apparatus according to the first aspect of the present invention, or in the light guide plate in the insert block/mold assembly/molding method according to the first aspect of the present invention, the form of the discontinuous convex includes a pyramid, a cone, a column and polygonal prisms including a trigonal prism and a tetragonal prism. When the discontinuous convex has the form of a pyramid or a cone, the peak portion of the discontinuous convex corresponds to the tip portion of the convex portion. When it has the form of a column, an edge portion (ridge) defined by the top surface and the side wall of the discontinuous convex corresponds to the tip portion of the convex portion. When it has the form of a polygonal prism, edge portions (ridges) defined by the top surface and the side walls of the discontinuous convex correspond to the tip portion of the convex portion. When even part of the edge line(s) (ridge) of each convex portion fails to satisfy a radius of curvature of $2 \times 10^{-6}$ m or less, it is regarded as failing to satisfy the requirement that the tip portion of the convex portion has a radius of curvature of $2 \times 10^{-6}$ m or less. In the light guide plate/area light apparatus according to the third aspect of the present invention, or in the light guide plate in the insert block/mold assembly/molding method according to the third aspect of the present invention, the form of the discontinuous convex includes a pyramid, a cone, a column, polygonal prisms including a trigonal prism and a tetragonal prism, and various moderately curved surfaces such as part of a sphere, part of a spheroid of revolution, part of a paraboloid of revolution and part of a hyperboloid of revolution. When the discontinuous convex has the form of a pyramid or a cone, the side wall(s) of the discontinuous convex is (are) required to satisfy a surface roughness of 0.3 μm or less. When it has the form of a column or a polygonal prism, the top surface and the side wall(s) of the discontinuous convex are required to satisfy a surface roughness of 0.3 μm or less. When it has the form of a curved surface, the entire curved surface is required to satisfy a surface roughness of 0.3 μm or less. When the discontinuous convex has the form of a curved surface, the surface roughness is preferably defined by a surface roughness $R_t$. When the discontinuous convex has the form other than a curved surface, or when the convex portion comprises a continuous convex, the surface roughness is preferably defined by a surface roughness $R_z$.

The surface roughness $R_z$ and the surface roughness $R_t$ is defined in JIS B 0601:2001.

In the light guide plate/area light apparatus according to the second/fourth aspects of the present invention, or in the light guide plate in the insert block/mold assembly/molding method according to the second/fourth aspects of the present invention, each concave portion provided in the surface portion of the first main surface may comprise a continuous concave extending along a direction making a predetermined angle with the direction of incidence of light into the light guide plate. In the light guide plate/area light apparatus according to the second aspect of the present invention, or in the light guide plate in the insert block/mold assembly/molding method according to the second aspect of the present invention, the cross-sectional form of the continuous concave obtained by cutting the light guide plate with an imaginary plane that is in the direction of incidence of light into the light guide plate and perpendicular to the first main surface includes, for example, a triangle; any quadrilaterals including a square, a rectangle and a trapezoid; and any polygons. When the cross-sectional form of the continuous concave is a triangular form, a bottom edge line (bottom of valley) of the continuous concave corresponds to the bottom portion of the concave portion. When the above cross-sectional form is a rectangular or polygonal form, edge lines defined by the bottom surface and the side walls of the continuous concave correspond to the bottom portion of the concave portion. When even part of the edge line of each concave portion fails to satisfy a radius of curvature of $2 \times 10^{-6}$ m or less, it is regarded as failing to satisfy the requirement that the bottom portion of the concave portion has a radius of curvature of $2 \times 10^{-6}$ m or less. In the light guide plate/area light apparatus according to the fourth aspect of the present invention, or in the light guide plate in the insert block/mold assembly/molding method according to the fourth aspect of the present invention, the cross-sectional form of the continuous concave obtained by cutting the light guide plate with an imaginary plane that is in the direction of incidence of light into the light guide plate and perpendicular to the first main surface includes a triangle; any quadrilaterals including a square, a rectangle and a trapezoid; any polygons; and any moderately curved lines including a circle, an oval, a parabola, a hyperbola and a catenary and the like.

In the light guide plate/area light apparatus according to the second/fourth aspects of the present invention, or in the light guide plate in the insert block/mold assembly/molding method according to the second/fourth aspects of the present invention, each concave portion provided in the surface portion of the first main surface may comprise discontinuous concaves (a kind of pits or dents) arranged along a direction making a predetermined angle with the direction of incidence of light into the light guide plate. In the light guide plate/area light apparatus according to the second aspect of the present invention, or in the light guide plate in the insert block/mold assembly/molding method according to the second aspect of the present invention, the form of the discontinuous concave includes a pyramid, a cone, a column and polygonal prisms including a trigonal prism and a tetragonal prism. When the discontinuous concave has the form of a pyramid or a cone, the peak portion of the discontinuous concave corresponds to the bottom portion of the concave portion. When it has the form of a column, an edge portion defined by the bottom surface and the side wall of the discontinuous concave corresponds to the bottom portion of the concave portion. When it has the form of a polygonal prism, edge portions defined by the bottom surface and the side walls of the discontinuous concave correspond to the bottom portion of the concave portion. When even part of the edge line of each concave portion fails to satisfy a radius of curvature of $2 \times 10^{-6}$ m or less, it is regarded as failing to satisfy the requirement that the bottom portion of the concave portion has a radius of curvature of $2 \times 10^{-6}$ m or less. In the light guide plate/area light apparatus according to the fourth aspect of the present invention, or in the light guide plate in the insert block/mold assembly/molding method according to the fourth aspect of the present invention, the form of the discontinuous concave includes a pyramid, a cone, a column, polygonal prisms including a trigonal prism and a tetragonal prism, and various moderately curved surfaces such as part of a sphere, part of a spheroid of revolution, part of a paraboloid of revolution and part of a hyperboloid of revolution. When the discontinuous concave has the form of a pyramid or a cone, the side wall(s) of the discontinuous concave is (are) required to satisfy a surface roughness of 0.3 μm or less. When it has the form of a column, the bottom surface and the side wall of the discontinuous concave are required to satisfy a surface roughness of 0.3 μm or less. When it has the form of a polygonal prism, the bottom surface and the side walls of the discontinuous concave are required to satisfy a surface roughness of 0.3 μm or less. When it has the form of a curved surface, the entire curved surface is required to satisfy a surface roughness of 0.3 μm or less. When the discontinuous concave has the form of a curved surface, the surface roughness is preferably defined by a surface roughness $R_r$. When the discontinuous concave has the form other than a curved surface, or when the concave portion comprises a continuous concave, the surface roughness is preferably defined by a surface roughness $R_z$.

The light guide plate according to any one of the first to fourth aspects of the present invention, or the light guide plate in the insert block/mold assembly/molding method of the present invention has the form of a wedge-shaped truncated quadrangular pyramid as a whole, and it may have a constitution in which opposite two side walls of the truncated quadrangular pyramid correspond to the first main surface and the second main surface, light enters through the side wall corresponding to the bottom surface of the truncated quadrangular pyramid, and the light exits from the first main surface and/or the second main surface. In this case, in the light guide plate/area light apparatus according to the first/third aspects of the present invention, or in the light guide plate in the insert block/mold assembly/molding method according to the first/third aspects of the present invention, it is preferred to satisfy an $H_2/H_1$ ratio of at least 0.8, in which $H_1$ is an average height of the convex portion provided in the surface portion of the first main surface positioned near the side wall corresponding to the bottom surface of the truncated quadrangular pyramid, and $H_2$ is an average height of the convex portion provided in the surface portion of the first main surface positioned near the side wall corresponding to the top surface of the truncated quadrangular pyramid. In the light guide plate/area light apparatus according to the second/fourth aspects of the present invention, or in the light guide plate in the insert block/mold assembly/molding method according to the second/fourth aspects of the present invention, it is preferred to satisfy a $D_2/D_1$ ratio of at least 0.8, in which $D_1$ is an average depth of the concave portion provided in the surface portion of the first main surface positioned near the side wall corresponding to the bottom surface of the truncated quadrangular pyramid, and $D_2$ is an average depth of the concave portion provided in the surface portion of the first main surface positioned near the side wall corresponding to the top surface of the truncated quadrangular pyramid.

According to the first aspect of the present invention, the above first object is achieved by an insert block for use in a mold and for partly constituting a cavity in the mold, for molding a first main surface of a light guide plate which is made of a transparent resin and has said first main surface and a second main surface opposite to said first main surface, said first main surface having a surface portion provided with convex portions having a height of $5 \times 10^{-7}$ m to $6 \times 10^{-5}$ m each and a pitch of $5 \times 10^{-7}$ m to $4 \times 10^{-4}$ m, each convex portion having a tip portion, and the convex portions of at least 80% of the total convex portions having the tip portions having a radius of curvature of $2 \times 10^{-6}$ m or less, the insert block comprising;

an insert block body made of zirconia ceramics or electrically conductive zirconia ceramics, and a metal layer that is formed on the surface of the insert block body facing the cavity and is provided with concave portions for forming the convex portions of the light guide plate.

According to the second aspect of the present invention, the above first object is achieved by an insert block for use in a mold and for partly constituting a cavity in the mold, for molding a first main surface of a light guide plate which is made of a transparent resin and has said first main surface and a second main surface opposite to said first main surface, said first main surface having a surface portion provided with concave portions having a depth of $5 \times 10^{-7}$ m to $6 \times 10^{-5}$ m each and a pitch of $5 \times 10^{-7}$ m to $4 \times 10^{-4}$ m, each concave portion having a bottom portion, and the concave portions of at least 80% of the total concave portions having the bottom portions having a radius of curvature of $2\times10^{-6}$ m or less, the insert block comprising;

an insert block body made of zirconia ceramics or electrically conductive zirconia ceramics, and a metal layer that is formed on the surface of the insert block body facing the cavity and is provided with convex portions for forming the concave portions of the light guide plate.

According to the third aspect of the present invention, the above first object is achieved by an insert block for use in a mold and for partly constituting a cavity in the mold, for molding a first main surface of a light guide plate which is made of a transparent resin and has said first main surface and a second main surface opposite to said first main surface, said first main surface having a surface portion provided with convex portions having a height of $5\times10^{-7}$ m to $6\times10^{-5}$ m each and a pitch of $5\times10^{-7}$ m to $4\times10^{-4}$ m, and each convex portion having a surface roughness of 0.3 μm or less, the insert block comprising;

an insert block body made of zirconia ceramics or electrically conductive zirconia ceramics, and a metal layer that is formed on the surface of the insert block body facing the cavity and is provided with concave portions for forming the convex portions of the light guide plate.

According to the fourth aspect of the present invention, the above first object is achieved by an insert block for use in a mold and for partly constituting a cavity in the mold, for molding a first main surface of a light guide plate which is made of a transparent resin and has said first main surface and a second main surface opposite to said first main surface, said first main surface having a surface portion provided with concave portions having a depth of $5\times10^{-7}$ m to $6\times10^{-5}$ m each and a pitch of $5\times10^{-7}$ m to $4\times10^{-4}$ m, and each concave portion having a surface roughness of 0.3 μm or less, the insert block comprising;

an insert block body made of zirconia ceramics or electrically conductive zirconia ceramics, and a metal layer that is formed on the surface of the insert block body facing the cavity and is provided with convex portions for forming the concave portions of the light guide plate.

In the present invention, the term "zirconia ceramics" alone refers to zirconia ceramics having no electric conductivity, that is, having a specific volume resistivity of greater than $1\times10^9$ Ω·cm.

The above phrase "partly constituting a cavity" means constituting part of a "cavity surface" to define an external form of a light guide plate. More specifically, the cavity is constituted of cavity-constituting surfaces of a first mold member and a second mold member to be described later (cavity surface of a mold member), a surface of the insert block which surface partly constitutes the cavity (cavity surface of the insert block), and optionally, a cavity-constituting surface of a cover plate to be described later (cavity surface of the cover plate). The above terms and phrase are used in this sense hereinafter. On the entire cavity surface of the insert block, or on a desired surface portion of the insert block, is formed the metal layer having concave portions or convex portions. In the latter case, i.e., a flat metal layer is formed on any remaining cavity surface other than the desired surface portion.

In the insert block/mold assembly/molding method of the present invention, when the second mold member and part of the insert block face each other in a state where the first mold member and the second mold member are clamped, the insert block body may have the metal layer formed on such part or may have no metal layer formed on such part. In the former case, the surface of the formed metal layer is required to be flat, and in the latter case, the surface of that part of the insert block body which faces the second mold member is required to be flat. In the insert block/mold assembly/molding method of the present invention, if the surface portion of the inset block, having the concave portions or convex portions, faces the second mold member, the insert block and that portion of the second mold member which faces the insert block (to be referred to as "the second mold member portion") come in poor surface contact with each other, and the insert block may be broken or damaged, or a molten transparent resin enters a space between the insert block and the second mold member portion to cause burs on the light guide plate. For the same reason, the portion of the insert block that is to face the second mold member is to have none of concave portions and convex portions in any embodiments to be explained hereinafter. The above second object of the present invention can be achieved by forming a metal layer on the portion of the insert block body that it to face the second mold member.

Alternatively, when the mold assembly is further provided with a cover plate that is attached to the first or second mold member, partly constitutes the cavity and is for covering an end portion of the insert block, and when part of the insert block overlaps the cover plate, a metal layer may be formed or may not be formed on the surface of portion of the insert block body that is to face the cover plate in a state where the first mold member and the second mold member are clamped. "The surface of portion of the insert block body that is to face the cover plate" is sometimes referred to as "cover-plate-facing surface of the insert block". In the former case, the surface of the metal layer is required to be flat, and in the latter case, the cover-plate-facing surface of the insert block is required to be flat. The above second object can be achieved by constituting the insert block in the former case.

Further, when the mold assembly is further provided with a cover plate that is attached to the first or second mold member, partly constitutes the cavity and is for covering part of the end portion of the insert block, a metal layer may be formed or may not be formed on the cover-plate-facing surface of the insert block in a state where the first mold member and the second mold member are clamped. In the former case, the surface of the metal layer is required to be flat, and in the latter case, the cover-plate-facing surface of the insert block is required to be flat. Further, a metal layer may be formed or may not be formed on the surface of portion of the insert block body that is to face the second mold member. In the former case, the surface of the metal layer is required to be flat, and in the latter case, the surface of portion of the insert block body that is to face the second mold member is required to be flat. The above second object can be achieved by constituting the insert block in the former case.

According to the first aspect of the present invention, the above first object is achieved by a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with convex portions having a height of $5\times10^{-7}$ m to $6\times10^{-5}$ m each and a pitch of $5\times10^{-7}$ m to $4\times10^{-4}$ m, each convex portion having a tip portion, and the convex portions of at least 80% of the total convex portions having the tip portions having a radius of curvature of $2\times10^{-6}$ m or less, the insert block comprising;

an insert block body made of zirconia ceramics or electrically conductive zirconia ceramics, and a metal layer that is formed on the surface of the insert block body facing the cavity and is provided with concave portions for forming the convex portions of the light guide plate.

According to the first aspect of the present invention, the above first object is achieved by a method for molding a light guide plate made of a transparent resin by the use of a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with convex portions having a height of $5\times10^{-7}$ m to $6\times10^{-5}$ m each and a pitch of $5\times10^{-7}$ m to $4\times10^{-4}$ m, each convex portion having a tip portion, and the convex portions of at least 80% of the total convex portions having the tip portions having a radius of curvature of $2\times10^{-6}$ m or less, the insert block comprising;

an insert block body made of zirconia ceramics or electrically conductive zirconia ceramics, and a metal layer that is formed on the surface of the insert block body facing the cavity and is provided with concave portions for forming the convex portions of the light guide plate, said method comprising clamping the first mold member and the second mold member, introducing a molten transparent resin into the cavity through the molten resin injection portion, cooling the transparent resin in the cavity to solidness, then, opening the mold and taking the light guide plate out of the mold.

According to the second aspect of the present invention, the above first object is achieved by a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with concave portions having a depth of $5\times10^{-7}$ m to $6\times10^{-5}$ m each and a pitch of $5\times10^{-7}$ m to $4\times10^{-4}$ m, each concave portion having a bottom portion, and the concave portions of at least 80% of the total concave portions having the bottom portions having a radius of curvature of $2\times10^{-6}$ m or less, the insert block comprising;

an insert block body made of zirconia ceramics or electrically conductive zirconia ceramics, and a metal layer that is formed on the surface of the insert block body facing the cavity and is provided with convex portions for forming the concave portions of the light guide plate.

According to the second aspect of the present invention, the above first object is achieved by a method for molding a light guide plate made of a transparent resin by the use of a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with concave portions having a depth of $5\times10^{-7}$ m to $6\times10^{-5}$ m each and a pitch of $5\times10^{-7}$ m to $4\times10^{-4}$ m, each concave portion having a bottom portion, and the concave portions of at least 80% of the total concave portions having the bottom portions having a radius of curvature of $2\times10^{-6}$ m or less, the insert block comprising;

an insert block body made of zirconia ceramics or electrically conductive zirconia ceramics, and a metal layer that is formed on the surface of the insert block body facing the cavity and is provided with convex portions for forming the concave portions of the light guide plate, said method comprising clamping the first mold member and the second mold member, introducing a molten transparent resin into the cavity through the molten resin injection portion, cooling the transparent resin in the cavity to solidness, then, opening the mold and taking the light guide plate out of the mold.

According to the third aspect of the present invention, the above first object is achieved by a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with convex portions having a height of $5 \times 10^{-7}$ m to $6 \times 10^{-5}$ m each and a pitch of $5 \times 10^{-7}$ m to $4 \times 10^{-4}$ m, and each convex portion having a surface roughness of 0.3 μm or less, the insert block comprising;

an insert block body made of zirconia ceramics or electrically conductive zirconia ceramics, and a metal layer that is formed on the surface of the insert block body facing the cavity and is provided with concave portions for forming the convex portions of the light guide plate.

According to the third aspect of the present invention, the above first object is achieved by a method for molding a light guide plate made of a transparent resin by the use of a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with convex portions having a height of $5 \times 10^{-7}$ m to $6 \times 10^{-5}$ m each and a pitch of $5 \times 10^{-7}$ m to $4 \times 10^{-4}$ m, and each convex portion having a surface roughness of 0.3 μm or less, the insert block comprising;

an insert block body made of zirconia ceramics or electrically conductive zirconia ceramics, and a metal layer that is formed on the surface of the insert block body facing the cavity and is provided with concave portions for forming the convex portions of the light guide plate, said method comprising clamping the first mold member and the second mold member, introducing a molten transparent resin into the cavity through the molten resin injection portion, cooling the transparent resin in the cavity to solidness, then, opening the mold and taking a light guide plate out of the mold.

According to the fourth aspect of the present invention, the above first object is achieved by a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with concave portions having a depth of $5 \times 10^{-7}$ m to $6 \times 10^{-5}$ m each and a pitch of $5 \times 10^{-7}$ m to $4 \times 10^{-4}$ m, and each concave portion having a surface roughness of 0.3 μm or less, the insert block comprising;

an insert block body made of zirconia ceramics or electrically conductive zirconia ceramics, and a metal layer that is formed on the surface of the insert block body facing the cavity and is provided with convex portions for forming the concave portions of the light guide plate.

According to the fourth aspect of the present invention, the above first object is achieved by a method for molding a light guide plate made of a transparent resin by the use of a mold assembly comprising;

(A) a mold comprising a first mold member and a second mold member for molding a light guide plate made of a transparent resin, in which a cavity is formed when the mold is clamped, (B) a molten resin injection portion provided in the first mold member and/or the second mold member and provided for introducing a molten transparent resin into the cavity, and (C) an insert block provided in the first mold member and provided for partly constituting the cavity, the insert block being for use for molding a first main surface of the light guide plate having said first main surface and a second main surface opposite to said first main surface, said first main surface having a surface portion provided with concave portions having a depth of $5 \times 10^{-7}$ m to $6 \times 10^{-5}$ m each and a pitch of $5 \times 10^{-7}$ m to $4 \times 10^{-4}$ m, and each concave portion having a surface roughness of 0.3 μm or less, the insert block comprising;

an insert block body made of zirconia ceramics or electrically conductive zirconia ceramics, and a metal layer that is formed on the surface of the insert block body facing the cavity and is provided with convex portions for forming the concave portions of the light guide plate, said method comprising clamping the first mold member and the second mold member, introducing a molten transparent resin into the cavity through the molten resin injection portion, cooling the transparent resin in the cavity to solidness, then, opening the mold and taking a light guide plate out of the mold.

In the insert block/mold assembly/molding method according to the first/third aspects of the present invention, each concave portion formed in the metal layer is required to have a form complementary to the convex portion of the light guide plate according to the first or third aspect of the present invention. In the insert block/mold assembly/molding method according to the first/third aspects of the present invention, the depth of each concave portion formed in the metal layer is $5 \times 10^{-7}$ m to $6 \times 10^{-5}$ m, preferably $1 \times 10^{-6}$ m to $5 \times 10^{-5}$ m, more preferably $2 \times 10^{-6}$ m to $4 \times 10^{-5}$ m, and the pitch of the concave portions is $5 \times 10^{-7}$ m to $4 \times 10^{-4}$ m, preferably $5 \times 10^{-6}$ m to $3.5 \times 10^{-4}$ m, more preferably $3 \times 10^{-5}$ m to $3.0 \times 10^{-4}$ m. In the insert block/mold assembly/molding method according to the first aspect of the present invention, desirably, the concave portions of at least 80%, preferably at least 85%, more preferably all, of the total concave portions formed in the metal layer have the bottom portions having a radius of curvature of $2 \times 10^{-6}$ m or less, preferably $5 \times 10^{-7}$ m or less, more preferably $1 \times 10^{-7}$ m or less. In the insert block/mold assembly/molding method according to the first/third aspects of the present invention, desirably, the surface roughness of the surface of each concave portion formed in the metal layer is 0.2 μm or less. It is sufficient that at least 80%, preferably at least 90% of the total concave portions formed in the metal layer satisfy a surface roughness of 0.2 μm or less, preferably 0.1 μm or less, more preferably 0.05 μm or less.

In the insert block/mold assembly/molding method according to the first/third aspects of the present invention, each concave portion formed in the metal layer may comprise a continuous concave extending along a direction making a predetermined angle with the direction of incidence of light into the light guide plate. In the insert block/mold assembly/molding method according to the first aspect of the present invention, the cross-sectional form of the continuous concave obtained by cutting the metal layer with an imaginary plane that is in the direction of incidence of light into the light guide plate and perpendicular to the first main surface includes, for example, a triangle; quadrilaterals including a square, a rectangle and a trapezoid; and any polygons. When the cross-sectional form of the continuous concave is a triangular form, a bottom edge line (bottom of valley) of the continuous concave corresponds to the bottom portion of the concave portion. When the above cross-sectional form is a rectangular or polygonal form, edge lines defined by the bottom surface and the side walls of the continuous concave correspond to the bottom portion of the concave portion. When even part of the edge line of each concave portion fails to satisfy a radius of curvature of $2 \times 10^{-6}$ m or less, it is regarded as failing to satisfy the requirement that the bottom portion of the concave portion has a radius of curvature of $2 \times 10^{-6}$ m or less. In the insert block/mold assembly/molding method according to the third aspect of the present invention, the cross-sectional form of the continuous concave obtained by cutting the metal layer with an imaginary plane that is in the direction of incidence of light into the light guide plate and perpendicular to the first main surface includes, for example, a triangle; quadrilaterals including a square, a rectangle and a trapezoid; any polygons; and moderately curved lines including a sphere, a spheroid, a parabola, a hyperbola and a catenary and the like.

Alternatively, in the insert block/mold assembly/molding method according to the first/third aspects of the present invention, each concave portion formed in the metal layer may comprise discontinuous concaves (a kind of pits or dents) arranged along a direction making a predetermined angle with the direction of incidence of light into the light guide plate. In the insert block/mold assembly/molding method according to the first aspect of the present invention, the form of the discontinuous concave formed in the metal layer includes, for example, a pyramid, a cone, a column, and polygonal prisms including a trigonal prism and a tetragonal prism. When the discontinuous concave has the form of a pyramid or a cone, the peak portion of the discontinuous concave corresponds to the bottom portion of the concave portion. When it has the form of a column, an edge line defined by the bottom surface and the side wall of the discontinuous concave corresponds to the bottom portion of the concave portion. When it has the form of a polygonal prism, edge lines defined by the bottom surface and the side walls of the discontinuous concave correspond to the bottom portion of the concave portion. When even part of the edge line of each concave portion fails to satisfy a radius of curvature of $2 \times 10^{-6}$ m or less, it is regarded as failing to satisfy the requirement that the bottom portion of the concave portion has a radius of curvature of $2 \times 10^{-6}$ m or less. In the insert block/mold assembly/molding method according to the third aspect of the present invention, the form of the discontinuous concave formed in the metal layer includes a pyramid, a cone, a column, polygonal prisms including a trigonal prism and a tetragonal prism, and various moderately curved surfaces such as part of a sphere, part of a spheroid of revolution, part of a paraboloid of revolution and part of a hyperboloid of revolution. When each discontinuous concave has the form of a pyramid or a cone, preferably, the side wall(s) of the discontinuous concave is required to satisfy a surface roughness of 0.2 μm or less. When it has the form of a column, preferably, the bottom surface and the side wall of the discontinuous concave are required to satisfy a surface roughness of 0.2 μm or less. When it has the form of a polygonal prism, preferably, the bottom surface and the side walls of the discontinuous concave are required to satisfy a surface roughness of 0.2 μm or less. When it is a curved surface, preferably, the entire curved surface is required to satisfy a surface roughness of 0.2 μm or less. When the discontinuous concave has the form of a curved surface, the surface roughness is preferably defined by a surface roughness $R_r$. When the discontinuous concave has the form other than a curved surface, or when the concave portion comprises a continuous concave, the surface roughness is preferably defined by a surface roughness $R_z$.

In the insert block/mold assembly/molding method according to the second/fourth aspects of the present invention, each convex portion formed in the metal layer is required to have a form complementary to the form of the concave portion of the light guide plate according to the second or fourth aspect of the present invention. In the insert block/mold assembly/molding method according to the second/fourth aspects of the present invention, the height of each convex portion formed in the metal layer is $5 \times 10^{-7}$ m to $6 \times 10^{-5}$ m, preferably $1 \times 10^{-6}$ m to $5 \times 10^{-5}$ m, more preferably $2 \times 10^{-6}$ m to $4 \times 10^{-5}$ m, and the pitch of the convex portions is $5 \times 10^{-7}$ m to $4 \times 10^{-4}$ m, preferably $5 \times 10^{-6}$ m to $3.5 \times 10^{-4}$ m, more preferably $3 \times 10^{-5}$ m to $3.0 \times 10^{-4}$ m. Further, in the insert block/mold assembly/molding method according to the second aspect of the present invention, desirably, the convex portions of at least 80%, preferably at least 85%, more preferably all, of the total convex portions formed in the metal layer have the tip portions having a radius of curvature of $2 \times 10^{-6}$ m or less, preferably $5 \times 10^{-7}$ m or less, more preferably $1 \times 10^{-7}$ m or less. In the insert block/mold assembly/molding method according to the second/fourth aspects of the present invention, desirably, the surface of the convex portions formed in the metal layer satisfies a surface roughness of 0.2 μm or less. It is sufficient that at least 80%, preferably at least 90% of the total convex portions formed in the metal layer satisfy a surface roughness of 0.2 μm or less, preferably 0.1 μm or less, more preferably 0.05 μm or less.

In the insert block/mold assembly/molding method according to the second/fourth aspects of the present invention, each convex portion formed in the metal layer may comprise a continuous convex extending along a direction making a predetermined angle with the direction of incidence of light into the light guide plate. In the insert block/mold assembly/molding method according to the second aspect of the present invention, the cross-sectional form of the continuous convex obtained by cutting the metal layer with an imaginary plane that is in the direction of incidence of light into the light guide plate and perpendicular to the first main surface includes, for example, a triangle; quadrilaterals including a square, a rectangle and a trapezoid; and any polygons. In the insert block/mold assembly/molding method according to the second aspect of the present invention, when each continuous convex formed in the metal layer has the cross-sectional form of a triangle, a top edge line (ridge) of the continuous convex corresponds to the tip portion of the convex portion. When it has the cross-sectional form of a quadrilateral or a polygon, edge lines (ridges) defined by the top surface and the side walls of the continuous convex correspond to the tip portion of the convex portion. When even part of the edge line(s) of each convex portion fails to satisfy a radius of curvature of $2\times10^{-6}$ m or less, it is regarded as failing to satisfy the requirement that the tip portion of the convex portion has a radius of curvature of $2\times10^{-6}$ m or less. In the insert block/mold assembly/molding method according to the fourth aspect of the present invention, the cross-sectional form of the continuous convex obtained by cutting the metal layer with an imaginary plane that is in the direction of incidence of light into the light guide plate and perpendicular to the first main surface includes, for example, a triangle; quadrilaterals including a square, a rectangle and a trapezoid; any polygons; and moderately curved lines including a sphere, a spheroid, a parabola, a hyperbola and a catenary and the like.

Alternatively, in the insert block/mold assembly/molding method according to the second/fourth aspects of the present invention, each convex portion formed in the metal layer may comprise discontinuous convexes (a kind of projections or protrusions) arranged along a direction making a predetermined angle with the direction of incidence of light into the light guide plate. In the insert block/mold assembly/molding method according to the second aspect of the present invention, the form of the discontinuous convex includes, for example, a pyramid, a cone, a column, and polygonal prisms including a trigonal prism and a tetragonal prism. When each discontinuous convex has the form of a pyramid or a cone, the peak portion of the discontinuous convex corresponds to the tip portion of the convex portion. When each discontinuous convex has the form of a column, an edge line (ridge) defined by the top surface and the side wall of the discontinuous convex corresponds to the tip portion of the convex portion. When each discontinuous convex has the form of a polygonal prism, edge lines (ridges) defined by the top surface and the side walls of the discontinuous convex correspond to the tip portion of the convex portion. When even part of the edge line(s) (ridge) of each convex portion fails to satisfy a radius of curvature of $2\times10^{-6}$ m or less, it is regarded as failing to satisfy the requirement that the tip portion of the convex portion has a radius of curvature of $2\times10^{-6}$ m or less. In the insert block/mold assembly/molding method according to the fourth aspect of the present invention, further, the form of the discontinuous convex formed in the metal layer includes a pyramid, a cone, a column, polygonal prisms including a trigonal prism and a tetragonal prism, and various moderately curved surfaces such as part of a sphere, part of a spheroid of revolution, part of a paraboloid of revolution and part of a hyperboloid of revolution. When each discontinuous convex has the form of a pyramid or a cone, preferably, the side wall(s) of the discontinuous convex is required to satisfy a surface roughness of 0.2 µm or less. When each discontinuous convex has the form of a column or a polygonal prism, preferably, preferably, the top surface and the side wall(s) of the discontinuous convex are required to satisfy a surface roughness of 0.2 µm or less. When each discontinuous convex has the form of a curved surface, preferably, the entire curved surface satisfies a surface roughness of 0.2 µm or less. When the discontinuous convex has the form of a curved surface, the surface roughness is preferably defined by a surface roughness $R_r$. When the discontinuous convex has the form other than a curved surface, or when the convex portion comprises a continuous convex, the surface roughness is preferably defined by a surface roughness $R_z$.

In the insert block/mold assembly/molding method of the present invention, desirably, the cavity-facing surface of the insert block body has a surface roughness $R_z$ of 0.1 µm to 10 µm, preferably 0.1 µm to 8 µm, more preferably 0.1 µm to 5 µm. When the cavity-facing surface of the insert block body has a surface roughness $R_z$ of 0.1 µm or more, an anchor effect can be produced in forming the metal layer on such a surface by an electroless plating method. As a result, the metal layer can be formed on such a surface by an electroless plating method. When the surface roughness $R_z$ of the cavity-facing surface of the insert block body exceeds 10 µm, the surface of the metal layer is roughened, and the time period required for surface-polishing the metal layer is liable to increase or pinholes are liable to occur in the metal layer. The cavity-facing surface of the insert block body can be roughened by blasting or etching.

The insert block/mold assembly/molding method of the present invention may have a constitution in which a second insert block is disposed inside the mold and partly constitutes the cavity of the mold for shaping the second main surface of the light guide plate. In this case and when the light guide plate according to any one of the first to fourth aspects of the present invention is applied to a back-light-type area light apparatus, the surface of the second insert block which surface faces the cavity may be a mirror surface or a blasted surface. When the light guide plate according to any one of the first to fourth aspects of the present invention is applied to a front-light-type area light apparatus, the surface of the second insert block which surface faces the cavity is required to be a mirror surface. When the cavity-facing surface of the second insert block is formed to be a mirror surface, desirably, the surface roughness $R_z$ of the cavity-facing surface of the second insert block is 0.01 µm to 0.1 µm, preferably 0.01 µm to 0.08 µm, more preferably 0.01 µm to 0.05 µm. The second insert block may have a constitution in which it is made of zirconia ceramics, or made of zirconia ceramics or electrically conductive zirconia ceramics and a metal layer formed thereon. In the former case, it is sufficient that the surface roughness $R_z$ of the zirconia ceramics satisfies the above value. In the latter case, the surface roughness $R_z$ of the metal layer satisfies the above value. The second insert block having the above constitution will be sometimes referred to as "second insert block made of ceramics" for convenience. The second insert block may be made of a metal in some case.

In the insert block/mold assembly/molding method according to the first/third aspects of the present invention including the second insert block made of ceramics, the metal layer is made of at least one material selected from the group consisting of Cr, a Cr compound, Cu, a Cu compound, Ni and an Ni compound, and desirably, the thickness t (unit: m) of the metal layer satisfies $(d+5)\times10^{-6}\,m \leq t \leq 5\times10^{-4}\,m$, preferably $(d+10)\times10^{-6}\,m \leq t \leq 1\times10^{-4}\,m$, in which d is a depth of the concave portions formed in the metal layer. In the insert block/mold assembly/molding method according to the second/fourth aspects of the present invention including the second insert block made of ceramics, the metal layer is made of at least one material selected from the group consisting of Cr, a Cr compound, Cu, a Cu compound, Ni and an Ni compound, and desirably, the thickness t (unit: m) of the metal layer satisfies $(h+5)\times10^{-6}$ m $\leq$ t $\leq$ $5\times10^{-4}$ m, preferably $(h+10)\times10^{-6}$ m $\leq$ t $\leq$ $1\times10^{-4}$ m, in which h is a height of the convex portions formed in the metal layer. The concave portions or the concave portions can be accordingly formed in the metal layer by various methods, and the metal layer can be accordingly easily machined with a general cutting machine. Further, when a molten transparent resin introduced into the cavity comes in contact with the metal layer, rapidly cooling of the molten transparent resin can be prevented. Further, fine adjustment of the insert block relative to the mold portion (an insert block attaching portion, an insert block attaching core or a cover plate) can be easily made. Moreover, high scratch resistance and surface hardness can be accomplished. The thickness t of the metal layer refers to a distance from the bottom portion of the concave portions or the tip portion of the convex portions formed in the metal layer to the surface of the insert block body or to an interface between an activated metal layer (to be described later) and the metal layer when the activated metal layer is formed.

In the insert block/mold assembly/molding method of the present invention including the second insert block made of ceramics, the metal layer may be formed of a single layer or may be formed of a plurality of layers. Specifically, the Cr compound includes a nickel-chromium alloy, and the Cu compound includes a copper-zinc alloy, a copper-cadmium alloy and a copper-tin alloy. Further, the Ni compound includes a nickel-iron alloy, a nickel-cobalt alloy, a nickel-tin alloy, a nickel-phosphorus alloy (Ni—P), a nickel-iron-phosphorus alloy (Ni—Fe—P) and a nickel-cobalt-phosphorus alloy (Ni—Co—P).

In the insert block/mold assembly/molding method of the present invention, the concave portions or the convex portions can be formed in the metal layer by a physical method or a chemical method. The concave portions or the convex portions can be formed in the metal layer by machining using a diamond tool. When the concave portions or the convex portions are formed by a chemical method, for example, a resist layer is applied to the surface of the metal layer, the resist layer is exposed to ultraviolet ray through a desired mask to form a pattern in the resist layer, or a resist layer is formed by a printing method, and then the metal layer is etched while using the resist layer as an etching mask, whereby the concave portions or the convex portions can be formed in the metal layer. The formation of a resist layer and subsequent etching may be carried out a plurality of times as required, to form the concave portions or the convex portions.

In the insert block/mold assembly/molding method according of the present invention including the second insert block made of ceramics, the metal layer can be formed by an electric plating method, an electroless plating method, or a combination of an electric plating method and an electroless plating method. In a first constitution of the present invention to be described later, when an electric plating method is applied, it is not essential to form an activated metal layer. However, after the roughening of the cavity-facing surface of the insert block body, it is required to carry out electroless plating and then to carry out electric plating. When the metal layer is required to have high scratch resistance, it is suitable to use, for example, chromium (Cr) to constitute the metal layer. When the metal layer is not much required to have scratch resistance but required to have a certain thickness, it is preferred to use, for example, copper (Cu) to constitute the metal layer. Further, when the metal layer is required to have scratch resistance to some extent and is also required to have a certain thickness, it is preferred to use, for example, nickel (Ni) to constitute the metal layer. Further, when the metal layer is required to have a certain thickness and is also required to have surface hardness, preferably, the metal layer has a two-layered structure, a lower layer is formed of copper (Cu) or nickel (Ni) to attain a desired thickness and to adjust the thickness, and an upper layer is formed of a thin chromium (Cr) layer.

In the insert block/mold assembly/molding method of the present invention including the second insert block made of ceramics, it is sufficient that the metal layer is formed on the cavity-facing surface of the insert block and on various facing surfaces to be described later, and for example, it may be formed on the entire surface of the insert block body.

In the above various embodiments and the insert block/mold assembly/molding method of the present invention including the second insert block made of ceramics, there may be employed a constitution in which the insert block body is made of zirconia ceramics and an activated metal layer is formed between the insert block body and the metal layer. This constitution will be referred to as "first constitution of the present invention" for convenience.

In the first constitution of the present invention, preferably, the activated metal layer is formed of a eutectic composition of a metal (activated metal) selected from the group consisting of Ti, Zr and Be and a metal selected from the group consisting of Ni, Cu, Ag and Fe, and the activated metal layer has a thickness of $1\times10^{-6}$ m to $5\times10^{-5}$ m, desirably, $3\times10^{-6}$ m to $5\times10^{-5}$ m. More specifically, examples of the eutectic composition include Ti—N, Ti—Cu, Ti—Cu—Ag, Ti—Ni—Ag, Zr—Ni, Zr—Fe, Be—Cu and Be—Ni. The activated metal layer having a thickness of $1\times10^{-6}$ m to $5\times10^{-5}$ m can have high electric conductivity, that is, non-conductive zirconia ceramics can be imparted with electric conductivity, so that the metal layer can be formed, for example, by an electric plating method.

For forming the activated metal layer, an activated metal soldering method can be employed. By employing an activated metal soldering method, the activated metal layer can have high adhesion to the surface of the insert block body. Further, the metal layer can have high adhesion to the insert block body. The above activated metal soldering method refers to a method in which a paste made of metal material(s) for constituting the activated metal layer is applied to the surface of the insert block body, for example, by a screen printing method and baked at a high temperature of approximately 800° C. to 1000° C. in vacuum or in an inert gas.

Alternatively, in the above various embodiments and the insert block/mold assembly/molding method of the present invention including the second insert block made of ceramics, there may be employed a constitution in which the insert block body is made of electrically conductive zirconia ceramics having a specific volume resistivity of $1\times10^9$ $\Omega\cdot$cm or lower, preferably $1\times10^4$ $\Omega\cdot$cm or lower. This constitution will be referred to as "second constitution" for convenience. When the specific volume resistivity of the electrically conductive zirconia ceramics exceeds $1\times10^9$ $\Omega\cdot$cm, the zirconia ceramics is an insulating material, so that it is difficult to form the metal layer directly on the surface of the insert block body. The lower limit value of the specific volume resistivity of the electrically conductive zirconia ceramics is preferably $1\times10^{-4}$ $\Omega\cdot$cm.

In the first or second constitution of the present invention, the zirconia ceramics or the electrically conductive zirconia ceramics is preferably constituted of partially stabilized zirconia ceramics. When the zirconia ceramics in the first constitution of the present invention is constituted of the partially stabilized zirconia ceramics, or when the electrically conductive zirconia ceramics in the second constitution of the present invention is constituted of the partially stabilized zirconia ceramics, a partially stabilizing agent in the partially stabilized zirconia ceramics is preferably at least one material selected from the group consisting of calcia (calcium oxide, CaO), yttrialite (yttrium oxide, $Y_2O_3$), magnesia (magnesium oxide, MgO), silica (silicon oxide, $SiO_2$) and ceria (cerium oxide, $CeO_2$). The amount of the partially stabilizing agent in the zirconia ceramics or the electrically conductive zirconia ceramics is 3 mol % to 15 mol %, preferably, 6 mol % to 10 mol % when it is calcia, 1 mol % to 8 mol %, preferably, 2 mol % to 5 mol % when it is yttrialite, 4 mol % to 15 mol %, preferably, 8 mol % to 10 mol % when it is magnesia, or 3 mol % to 18 mol %, preferably, 6 mol % to 12 mol % when it is ceria.

In the second constitution of the present invention, it is sufficient to add an electrically conducting agent to zirconia ceramics for converting zirconia ceramics to electrically conductive zirconia ceramics. The electrically conducting agent can be at least one material selected from the group consisting of $Fe_2O_3$, NiO, $Co_3O_4$, $Cr_2O_3$, $TiO_2$ and TiN, or can be at least one material selected from carbides such as TiC, WC, TaC and the like. Desirably, the content of the electrically conducting agent in the electrically conductive zirconia ceramics is at least 10% by weight. When the above content is less than 10% by weight, it is sometimes difficult to attain a specific volume resistivity of $1 \times 10^9$ $\Omega \cdot$cm or lower. When a large amount of the electrically conducting agent is added, the specific volume resistivity of the zirconia ceramics decreases, but such a large amount impairs the strength of the insert block body that is obtained as a sintered body. The content of the electrically conducting agent is therefore desirably 40% by weight or less.

In the second constitution of the present invention, a sintering temperature controlling agent in an amount of 3% by weight or less may be incorporated into the electrically conductive zirconia ceramics. When the electrically conducting agent is selected from $Fe_2O_3$, NiO, $Co_2O_4$, $Cr_2O_3$, $TiO_2$ or TiN, the sintering temperature controlling agent can be selected from oxides such as Ca, K, Na, Mg, Zn and Sc. When the electrically conducting agent is selected from carbides such as TiC, WC and TaC, the sintering temperature controlling agent can be selected from $Al_2O_3$ or $TiO_2$. When the above sintering temperature controlling agent in an amount of 3% by weight or less is incorporated, the sintering temperature can be decreased and the grain growth of zirconia and the electrically conducting agent can be suppressed, so that the insert block body can be improved in mechanical properties such as flexural strength and hardness.

In the above various embodiments and the insert block/mold assembly/molding method of the present invention including the second insert block made of ceramics, desirably, the thickness of the insert block body or the insert block body constituting the second insert block made of ceramics is preferably 0.1 mm to 10 mm, preferably 0.5 mm to 10 mm, more preferably 1 mm to 7 mm, still more preferably 2 mm to 5 mm. When the thickness of the insert block body is less than 0.1 mm, the heat insulation effect of the insert block decreases, and the molten transparent resin introduced in the cavity is rapidly cooled, so that it is difficult to form the convex portions or the concave portions in the light guide plate. When the insert block is fixed to the mold portion made of a metal or an alloy constituting the mold assembly, the insert block can be bonded to the mold portion with a heat-curable adhesive. However, when the thickness of the insert block body is less than 0.1 mm, and if the thickness of the adhesive is non-uniform, a non-uniform stress remains in the insert block, so that an undulation phenomenon may occur in the surface of the light guide plate or that the insert block may break due to a pressure caused by a molten transparent resin introduced in the cavity. When the thickness of the insert block body exceeds 10 mm, the heat insulation effect of the insert block may be too large, and the light guide plate may be deformed after taken out if the cooling time period of the resin in the cavity is not increased. There may be therefore caused a problem that the molding cycle takes a longer time period.

The zirconia ceramics, the electrically conductive zirconia ceramics or the partially stabilized zirconia ceramics constituting the insert block body has a heat conductivity of 8.5 J/(m·s·k) or lower [8.5 W/(m·k) or lower, or $2 \times 10^{-2}$ cal/(cm·s·k) or lower], specifically, approximately 3.5 to 6 J/(m·s·k). When the insert block body is made of an inorganic material having a heat conductivity of over 8.5 J/(m·s·k), a molten transparent resin in the cavity is rapidly cooled by the insert block, so that there can be obtained only a light guide plate having an appearance almost equivalent to the appearance of a light guide plate produced by means of a general mold assembly made of carbon steel or the like, without any insert block.

For preventing the damage or breaking of the insert block caused by a fine crack that occurs in an edge portion of the insert block body and comes in contact with a molten transparent resin, preferably, the edge portion of the insert block body is polished with a diamond grinder to prevent the focusing of a stress in some cases. Alternatively, the focusing of a stress on the edge portion of the insert block body is preferably avoided by forming a curvature surface having a radius of 0.3 mm or smaller or a C cut surface in some cases.

In the mold assembly/molding method of the present invention including the above various embodiment, desirably, the metal layer having a flat surface is formed on the surface of that portion of the insert block body which faces the second mold member in a state where the first mold member and the second mold member are clamped; and, in a state where the first mold member and the second mold member are clamped, the facing surface of the second mold member which surface faces the insert block and that portion of the insert block which faces the facing surface of the second mold member have a clearance $C_{11}$ of 0.03 mm or less ($C_{11} \leq 0.03$ mm).

The above structure will be referred to as "first structure of the mold assembly, etc.". By employing the first structure of the mold assembly, etc., the above second object can be achieved. That portion of the insert block which faces the facing surface of the second mold member will be sometimes referred to as "facing surface of the insert block". The convex portions or the concave portions are formed in a desired portion (including the entire cavity surface of the insert block) of the cavity-constituting surface of the insert block (cavity surface of the insert block) other than the facing surface of the insert block. In a state where the first mold member and the second mold member are clamped, preferably, an overlap amount $\Delta S_{11}$ of the facing surface of the second mold member relative to the insert block is at least 0.5 mm. The facing surface of the second mold member may be a kind of notch (cutout) made in the surface of the second mold member which surface faces the facing surface of the insert block, or may be an extending portion of parting surface of the second mold member.

In the mold assembly/molding method of the present invention including the above various embodiments, desirably, there is further provided a cover plate that is attached to the first or second mold member, partly constitutes the cavity and covers an end portion of the insert block; a metal layer having a flat surface is formed on the surface of that portion of the insert block body which faces the cover plate in a state where the first mold member and the second mold member are clamped; and, in a state where the first mold member and the second mold member are clamped, a clearance $C_{21}$ between the insert block and the cover plate is 0.03 mm or less ($C_{21} \leq 0.03$ mm), and an overlap amount $\Delta S_{21}$ of the cover plate relative to the insert block is at least 0.5 mm ($\Delta S_{21} \geq 0.5$ mm).

The above structure will be referred to as "second structure of the mold assembly, etc.". By employing the second structure of the mold assembly, etc., the above second object can be achieved. That portion of the insert block which faces the cover plate will be sometimes referred to as "facing surface of the insert block". The convex portions or the concave portions are formed in a desired portion (including the entire cavity surface of the insert block) of the cavity-constituting surface of the insert block (cavity surface of the insert block) other than the facing surface of the insert block. The molten resin injection portion in the mold assembly having the above constitution has, for example, a side gate structure or an overlap gate structure. The cover plate overlaps the entire circumference of the insert block.

Alternatively, in the mold assembly/molding method of the present invention including the above various embodiments, there is further provided a cover plate that is attached to the first or second mold member, partly constitutes the cavity and covers part of end portion of the insert block; a metal layer having a flat surface is formed on the surface of that portion of the insert block body which faces the cover plate in a state where the first mold member and the second mold member are clamped, and a metal layer having a flat surface is formed on the surface of that portion of the insert block body which faces the second mold member; and, in a state where the first mold member and the second mold member are clamped, a clearance between the facing surface of the second mold member which faces the insert block and that portion of the insert block which faces the facing surface of the second mold member is 0.03 mm or less ($C_{31} \leq 0.03$ mm), an overlap amount $\Delta S_{31}$ of the facing surface of the second mold member relative to the insert block is at least 0.5 mm ($\Delta S \geq 0.5$ mm), a clearance $C_{32}$ between the insert block and the cover plate is 0.03 mm or less ($C_{32} \leq 0.03$ mm), and an overlap amount $\Delta S_{32}$ of the cover plate relative to the insert block is at least 0.5 mm ($\Delta S_{31} \geq 0.5$ mm).

The mold assembly having the above structure will be referred to as "third structure of the mold assembly, etc.". By employing the above third structure of the mold assembly, etc., the above second object can be achieved. That portion of the insert block which faces the facing surface of the second mold member and that portion of the insert block which faces the cover plate will be sometimes referred to as "facing surface of the insert block". The convex portions or the concave portions are formed in a desired portion (including the entire cavity surface of the insert block) of the cavity-constituting surface (cavity surface of the insert block) other than the facing surface of the insert block. The molten resin injection portion in the mold assembly having the above constitution has, for example, a side gate structure or an overlap gate structure. The cover plate faces only part of the insert block, and the other portion of the cover plate faces the facing surface of the second mold member.

In the insert block/mold assembly/molding method of the present invention, the second insert block may be provided in the second mold member for forming a nearly flat surface portion of second main surface of the light guide plate as already discussed. The above second insert block may be constituted so as to have the same constitution as that of the insert block of the present invention including the above various embodiments except that none of the convex portions and the concave portions are formed. In the mold assembly/molding method of the present invention including the above various embodiments in this case, there may be employed a constitution in which a metal layer having a flat surface is formed on the surface of that portion of the insert block which faces the second insert block in a state where the first mold member and the second mold member are clamped, and in which a metal layer having a flat surface is formed on the surface of that portion of the second insert block which faces the insert block in a state where the first mold member and the second mold member are clamped, and further in which a clearance $C_{41}$ between that portion of the insert block which faces the second insert block and that portion of the second insert block which faces the insert block is 0.03 mm or less ($C_{41} \leq 0.03$ mm) in a state where the first mold member and the second mold member are clamped.

The above structure will be referred to as "fourth structure of the mold assembly, etc.". By employing the above fourth structure of the mold assembly, etc., the above second object can be achieved. That portion of the insert block which faces the second insert block will be sometimes referred to as "facing surface of the insert block", and that portion of the second insert block which faces the insert block will be sometimes referred to as "facing surface of the second insert block". The convex portions or the concave portions are formed in a desired portion (the entire cavity surface of the insert block) of the cavity-constituting surface (cavity surface of the insert block) of the insert block other than the facing surface of the insert block. The cavity surface of the second insert block is nearly flat. In a state where the first mold member and the second mold member are clamped, preferably, an overlap amount $\Delta S_{41}$ of that portion of the insert block which faces the second insert block and that portion of the second insert block which faces the insert block is at least 0.5 mm ($\Delta S_{41} \geq 0.5$ mm). Further, the mold assembly desirably has a cover plate that is provided between the insert block and the second insert block and is attached to the first mold member, the second mold member or both. Further, the cover plate is preferably provided with the molten resin injection portion. Desirably, a clearance $C_{42}$ between the insert block and the cover plate and a clearance $C_{43}$ between the second insert block and the insert block are 0.03 mm or less ($C_{42}, C_{43} \leq 0.03$ mm), an overlap amount $\Delta S_{42}$ of the cover plate relative to the insert block and an overlap amount $\Delta S_{43}$ of the cover plate relative to the second insert block are at least 0.5 mm, ($\Delta S_{42}, \Delta S_{43} \geq 0.5$ mm), and the cover plate is overlap only part of each of the insert block and the second insert block.

In the third or fourth structure of the mold assembly, etc., of the present invention, that portion of the insert block which is near a molten resin injection portion having high pressure is liable to be broken, so that the end portion of the insert block is covered with the cover plate so as to attain the above clearance and the above overlap amount, whereby it is made possible to reliably prevent the breakage of the insert block made of easily breakable zirconia ceramics or electrically conductive zirconia ceramics (and further, the second insert block in some cases). Moreover, the appearance of end portion of the light guide plate is no longer impaired, and no burrs occur in the end portion of the light guide plate.

In the first structure of the mold assembly, etc., of the present invention, the insert block can be arranged in the mold assembly by simply bonding it to the internal surface of the mold portion with an adhesive when a breaking or a burr does not specially take place. In this case, the insert block is arranged inside the mold in such a state that the insert block does not come in contact with any cavity surface of the mold portion under a stress caused by clamping of the mold. Otherwise, the insert block may be fixed with a bolt if possible.

Alternatively, in the first structure of the mold assembly, etc., of the present invention, and further, in the second to fourth structures of the mold assembly, etc., of the present invention, the insert block may be fit directly to the insert-block-fitting portion provided in the mold portion without any adhesive when the insert block that has been machined, etc., in a predetermined form is free from breakage caused by falling from the insert-block-fitting portion or when the insert block can be attached to the insert-block-fitting portion without any adhesive. Further, the insert block may be bonded to the insert-block-fitting portion with an adhesive selected from epoxy, silicon, urethane or acrylic heat-curable adhesives. There may be employed a constitution in which an insert-block-fitting core having an insert-block-fitting portion is employed, the insert block is fixed to the insert-block-fitting portion and the insert-block-fitting core is attached to the mold portion. Otherwise, the insert block may be fixed with a bolt if possible.

The various clearances ($C_{11}$, $C_{21}$, $C_{31}$, $C_{32}$, $C_{41}$, $C_{42}$ and $C_{43}$) are 0.03 mm or less, preferably at least 0 mm but not greater than 0.025 mm (0 mm$\leq C_{11}$, $C_{21}$, $C_{31}$, $C_{32}$, $C_{41}$, $C_{42}$, $C_{43} \leq 0.025$ mm). When the clearance ($C_{11}$, $C_{21}$, $C_{31}$, $C_{32}$, $C_{41}$, $C_{42}$ or $C_{43}$) exceeds 0.03 mm, a molten transparent resin may enter a space between the insert block and the facing surface of the mold portion or the cover plate, to crack the insert block, or there is caused a problem that a burr occurs in the light guide plate or that the light guide plate may break when it is taken out of the mold. In the present invention, however, a fine crack that is liable to occur in an end portion of the insert block is covered with the metal layer, and in this case, breaking of the insert block can be remarkably decreased.

When the value of the overlap amount ($\Delta S_{11}$, $\Delta S_{21}$, $\Delta S_{31}$, $\Delta S_{32}$, $\Delta S_{41}$, $\Delta S_{42}$ or $\Delta S_{43}$) is less than 0.5 mm, a fine crack that occurs in the circumference portion of the insert block and a molten transparent resin collide with each other, and as a result, the crack in the insert block grows and the insert block is broken in some cases. In the present invention, however, the fine crack that is liable to occur in the circumference portion of the insert block is covered with the metal layer, and in this case, breaking of the insert block can be remarkably decreased.

The light guide plate according to any one of the first to fourth aspects of the present invention can be produced by an injection molding method that is generally employed for molding a thermoplastic resin. Alternatively, it can be also produced by a method (injection compression molding method) in which the mold assembly is structured such that the volume of the cavity is variable, the first mold member and the second mold member are clamped such that the volume ($V_c$) of the cavity is greater than the volume ($V_M$) of the light guide plate to be molded, a molten transparent resin is introduced into the cavity (volume: $V_c$), and the cavity volume is decreased to the volume ($V_M$) of the light guide plate to be molded, before the initiation of introduction of the molten transparent resin, concurrently with the introduction, during the introduction or after the introduction. The point of time when the cavity volume comes to be equal to the volume ($V_M$) of the light guide plate to be molded can be a point of time during the introduction of the molten transparent resin or after completion of the introduction (including a time upon completion of the introduction). The structure of the above mold assembly includes a structure in which the first mold member and the second mold member form a telescopic structure and a structure in which the mold assembly further has a movable core in the cavity and the movable core is for varying the cavity volume. The movement of the core can be controlled, for example, by a hydraulic cylinder.

In the injection compression molding method, preferably, the relationship between the volume ($V_M$) of the light guide plate to be molded and the cavity volume ($V_c$) is a relationship that satisfies 0.05 mm$\leq \Delta t \leq 2$ mm, wherein $\Delta t = t_1 - t_0$ in which $t_0$ is a thickness of the light guide plate to be molded and $t_1$ is a distance of the cavity in the thickness direction of the light guide plate when the mold is clamped.

The transparent resin in the present invention includes a polycarbonate resin having a weight-average molecular weight of $1.2 \times 10^4$ to $2.5 \times 10^4$. When the weight-average molecular weight is less than $1.2 \times 10^4$, the light guide plate has insufficient strength. When it exceeds $2.5 \times 10^4$, transferability may be poor. Otherwise, the transparent resin can be selected from an acrylic resin, an amorphous polypropylene resin or a styrene resin including AS resin. The term "transparent resin" in the present invention refers to a resin having a parallel ray transmittance of at least 85% when measured on the basis of JIS K 7105:1981, Paragraph 5.5.2 (Measurement method A). The measurement uses a resin test piece having a thickness of 3.0 mm.

In the light guide plate/area light apparatus according to any one of the first to fourth aspects of the present invention, or in the light guide plate in the insert block/mold assembly/molding method of the present invention, there is no limitation to be imposed on the surface roughness of a flat portion of the first main surface of the light guide plate which flat portion is positioned between one convex portion and another convex portion, or of a flat portion of the first main surface of the light guide plate which flat surface is positioned between one concave portion and another concave portion. That is, such a flat portion of the first main surface of the light guide plate may have a surface roughness $R_z$ of 0.3 μm or lower, or over 0.3 μm. Otherwise, the flat portion may have fine concavo-convexes. In the insert block/mold assembly/molding method of the present invention, further, there is no limitation to be imposed on the surface roughness of the surface of the insert block which surface partly constitutes the cavity and is positioned between one concave portion and another concave portion formed in the metal layer, or of the surface of the insert block which surface partly constitutes the cavity and is positioned between one convex portion and another convex portion formed in the metal layer. That is, the above surface portion of the metal layer may have a surface roughness $R_z$ of 0.2 μm or lower, or over 0.2 μm. Otherwise, the above surface portion may have fine concavo-convexes.

In the light guide plate/area light apparatus according to the first/third aspects of the present invention, or in the light guide plate in the insert block/mold assembly/molding method according to the first/third aspects of the present invention, there may be employed a constitution in which no flat portion is present in that portion of the first main surface of the light guide plate which is positioned between one convex portion and another convex portion. That is, there may be employed a constitution in which concavo-convex portions are provided in the first main surface of the light guide plate. In this case, the concave portions in the concavo-convex portions of the light guide plate may satisfy, or may not satisfy, the requirements of the concave portions in the light guide plate/area light apparatus according to the second/fourth aspects of the present invention including various embodiments. In the light guide plate/area light apparatus according to the third aspect of the present invention, or in the light guide plate in the insert block/mold assembly/molding method according to the third aspect of the present invention, the surface of the convex portion in the concavo-convex portion provided in the surface portion of the first main surface other than the bottom portion of the concavo-convex portion has a surface roughness of 0.3 μm or less, while the entire concavo-convex portion preferably satisfies the surface roughness of 0.3 μm or less. In the insert block/mold assembly/molding method according to the first/third aspects of the present invention, a convex portion may be formed between one concave portion and another concave portion formed in the metal layer. That is, there may be employed a constitution in which concavo-convex portions are formed in the metal layer. In this case, the convex portions in the concavo-convex portions formed in the metal layer may satisfy, or may not satisfy, the requirements of the convex portions in the insert block/mold assembly/molding method according to the second/fourth aspects of the present invention including various embodiments. In the insert block/mold assembly/molding method according to the third aspect of the present invention, desirably, the surface of the concave portion in the concavo-convex portion formed in the metal layer other than the tip portion of the concavo-convex portion has a surface roughness of 0.2 μm or less, while the entire concavo-convex portion preferably satisfies a surface roughness of 0.2 μm or less.

Further, the light guide plate/area light apparatus of the present invention including various embodiments may be constituted by combining the following embodiments. Further, the insert block/mold assembly/molding method of the present invention may be constituted by combining the following embodiments of the insert block/mold assembly/molding method of the present invention including the various embodiments.

first aspect/second aspect
first aspect/third aspects
first aspect/fourth aspect
second aspect/third aspect
second aspect/fourth aspects
third aspect/fourth aspect
first aspect/second aspect/third aspect
first aspect/third aspects/fourth aspect
second aspect/third aspect/fourth aspect
first aspect/second aspect/third aspect/fourth aspect In the light guide plate of the present invention, convex portions or concave portions may not be formed in the circumferential portion of the first main surface, or in the circumferential portion of the first main surface, the convex portions or the concave portions are not necessarily required to satisfy the requirement of the surface roughness. That is, it is not necessarily required to form the convex portions or concave portions in that portion of the first main surface which substantially does not serve for scattering, etc., of light, or such a portion is not necessarily required to satisfy the requirement of the surface roughness of the convex portions or concave portions.

In the area light apparatus according to any one of the first to fourth aspects, for example, a light source is arranged in the end portion of the light guide plate (for example, in the side wall corresponding to the bottom surface of the truncated quadrangular pyramid). And, light that is emitted from the light source and enters the light guide plate is scattered by the convex portions or the concave portions formed in the first main surface of the light guide plate. The height, depth, pitch and form of the convex portions or the concave portions provided in the first main surface of the light guide plate may be constant or may vary as the distance from the light source increases. In the latter case, for example, the pitch of the convex portions or the concave portions may be decreased with an increase in the distance from the light source.

The pitch of the convex portions or the concave portions means a pitch of the convex portions or the concave portions along the direction of incidence of light into the light guide plate.

When the light guide plate (light guiding plate) according to any one of the first to fourth aspects of the present invention is used in a liquid crystal display, it may be incorporated into an edge-type/back-light-type area light apparatus (surface-emitting light source apparatus), or may be incorporated into an edge-type/front-light-type area light apparatus (surface-emitting light source apparatus). These area light apparatus (surface-emitting light source apparatus) correspond to the area light apparatus (surface-emitting light source apparatus) according to any one of the first to fourth aspects.

In the edge-type/back-light-type area light apparatus, the light source formed of, for example, a fluorescent lamp is arranged in the end portion of the light guide plate (for example, the side wall corresponding to the bottom surface of the truncated quadrangular pyramid). A reflection member is arranged opposite to the first main surface of the light guide plate. Further, a liquid crystal display device is arranged opposite to the second main surface of the light guide plate. Light that is emitted from the light source enters the light guide plate through the end portion of the light guide plate (for example, the side wall corresponding to the bottom surface of the truncated quadrangular pyramid), collides with the convex portions or the concave portions of the first main surface to be scattered, exits from the first main surface, is reflected by the reflection member, re-enters the first main surface, and exits from the second main surface to illuminate the liquid crystal display device. Between the liquid crystal display device and the second main surface of the light guide plate, for example, a diffusion sheet may be arranged.

In the edge-type/front-light-type area light apparatus, the light source formed of, for example, a fluorescent lamp is as well arranged in the end portion of the light guide plate (for example, the side wall corresponding to the bottom surface of the truncated quadrangular pyramid). And, a liquid crystal display device is arranged opposite to the second main surface of the light guide plate. Light that is emitted from the light source enters the light guide plate through the end portion of the light guide plate (for example, the side wall corresponding to the bottom surface of the truncated quadrangular pyramid), collides with the convex portions or the concave portions of the first main surface to be scattered, exits from the second main surface, passes a phase difference film and/or a polarizing film and passes the liquid crystal display device. And, the light that exits from the liquid crystal display device is reflected by a reflection member arranged outside the liquid crystal display device, again passes the liquid crystal display device, passes the phase difference film and/or the polarizing film, further, passes the light guide plate and exits from the first main surface of the light guide plate. The light is recognized as an image, etc., displayed on the liquid crystal display device. Generally, an anti-reflection layer is formed on the surface of the second main surface of the light guide plate.

In the area light apparatus (surface-emitting light source apparatus) according to any one of the first to fourth aspects of the present invention, light that is emitted from the light source may be introduced directly to the light guide plate or may be introduced indirectly to the light guide plate. In the latter case, for example, an optical fiber can be used. The light source can be selected from an artificial light source such as a fluorescent lamp, a filament lamp, a light-emitting diode or a fluorescence tube, or natural light such as sunlight. The area light apparatus (surface-emitting light source apparatus) can be applied not only to the above liquid crystal display device, but also to any one of light tools or lights of transportation means such as an automobile, a train, a vessel and an aircraft (for example, a headlight, a taillight, a high-mount stop light, a small light, a turn signal lamp, a fog light, a room lamp, a light for meter panel, light sources housed in various buttons, a destination display lamp, an emergency light, an emergency exit guiding lamp, etc.); various light tools and lights of buildings (for example, an outdoor lamp, an interior lamp, an illuminator, an emergency lamp, an emergency exit guiding lamp, etc.); a street lamp; a signal; a display board, illuminators for a machine and an apparatus; and a lighting portion of a tunnel and an underpass.

In the insert block/mold assembly/molding method of the present invention, rapid cooling of a molten transparent resin in the cavity can be prevented by providing the insert block made of zirconia ceramics or electrically conductive zirconia ceramics. As a result, formation of a solidified layer in a molten transparent resin that has come in contact with the cavity surface of the insert block can be avoided.

In the first constitution of the present invention, further, the activated metal layer may be formed by an activated metal soldering method. In this case, high adhesion of the activated metal layer to the surface of the insert block body can be attained, and high adhesion of the metal layer to the insert block body can be attained. Further, in the first constitution of the present invention, since the activated metal layer may be formed, the surface of the insert block body has electric conductivity, and the metal layer can be formed, for example, by an electric plating method. Alternatively, the surface roughness of that surface of the insert block body which faces the cavity may be defined. In this case, the metal layer can be formed on the insert block body by an electroless plating method, and high adhesion of the metal layer to the insert block body can be attained. In the second constitution of the present invention, the metal layer can be formed directly on the surface of the insert block body by employing electrically conductive zirconia ceramics to constitute the insert block body. In the insert block/mold assembly/molding method of the present invention, further, the metal layer is formed on the outermost surface of the insert block, so that the convex portions or the concave portions can be easily formed (for example, machined) in that surface of the insert block body which faces the cavity, by various processing methods, and that high scratch resistance and high surface hardness can be attained. When a fine crack that occurs in the circumferential portion of the insert block body during the processing of the insert block body is covered with the metal layer, the crack no longer comes in contact with any molten transparent resin, so that the insert block is almost free from breaking.

The metal layer surface constituting the outmost surface of the insert block which surface can suppress the rapid cooling of a molten transparent resin has the convex portions or the concave portions, so that desired concave portions or concave portions can be accurately and reliably formed in or transferred to the surface of the light guide plate.

Further, since the molten transparent resin is improved in flowability as the insert block is present, the pressure for introducing the molten transparent resin into the cavity can be set at a low level, so that a residual stress in the light guide plate can be moderated. As a result, the light guide plate is improved in quality. Further, since the introduction pressure can be decreased, the wall of the mold portion can be decreased in thickness, and a molding apparatus can be decreased in size, so that the cost of the light guide plate can be decreased.

The metal layer may be formed on the circumferential portion of the insert block. In this case, the metal layer on the facing surface of the insert block can be machined with a general cutting machine or the like. As a result, fitting of the insert block to the mold portion can be relatively easily adjusted.

DESCRIPTION OF THE PREFERRED EMBODIMENTS

The present invention will be specifically explained with reference to drawings hereinafter.

EXAMPLE 1

Example 1 is concerned with a light guide plate/area light apparatus according to the first/third aspects of the present invention, and an insert block/mold assembly/molding method according to the first/third aspects of the present invention. The insert block and the mold assembly in Example 1 are concerned with the insert block and the mold assembly having the first constitution of the present invention and further concerned with the second structure of the mold assembly, etc., of the present invention.

Figure 1A:
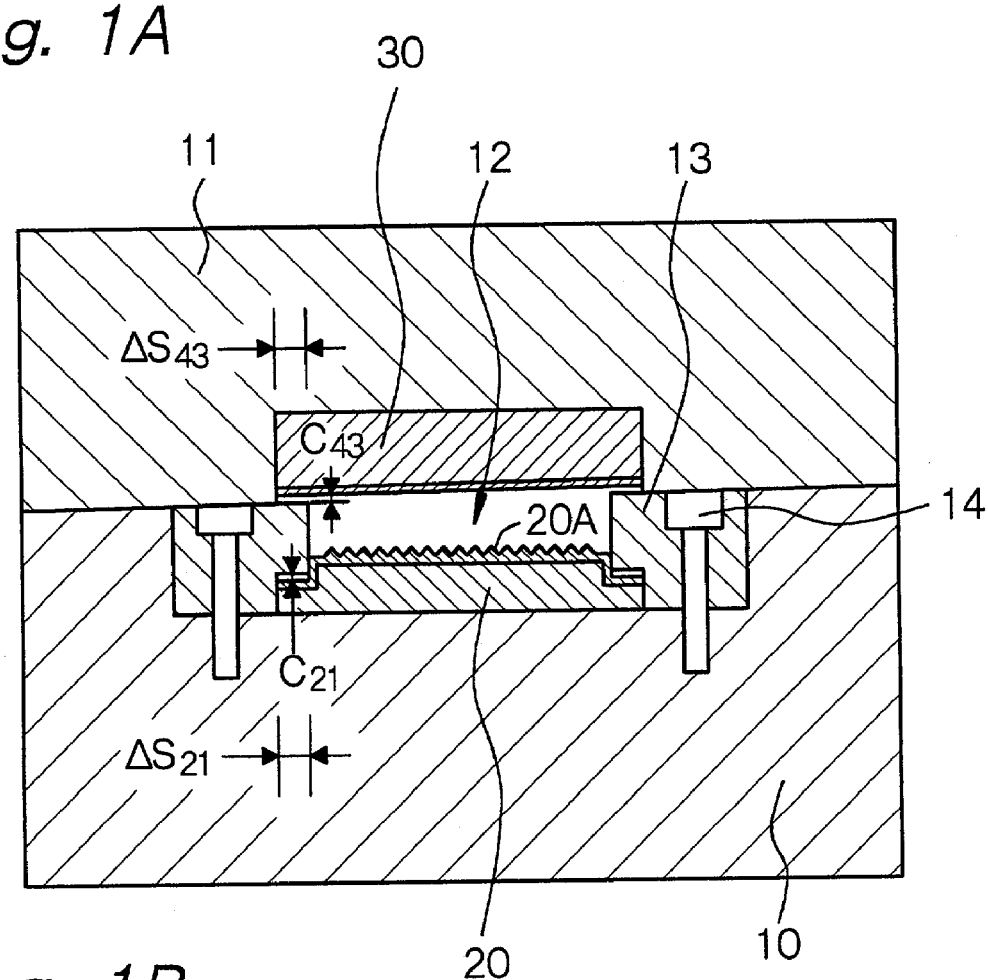
FIGS. 1A, 1B and 1C are a schematic cross-sectional view of a mold assembly in a mold-clamped state, a schematic partial cross-sectional view of an insert block, and a schematic cross-sectional view of an insert block body in Example 1, respectively.
Figure 2A:
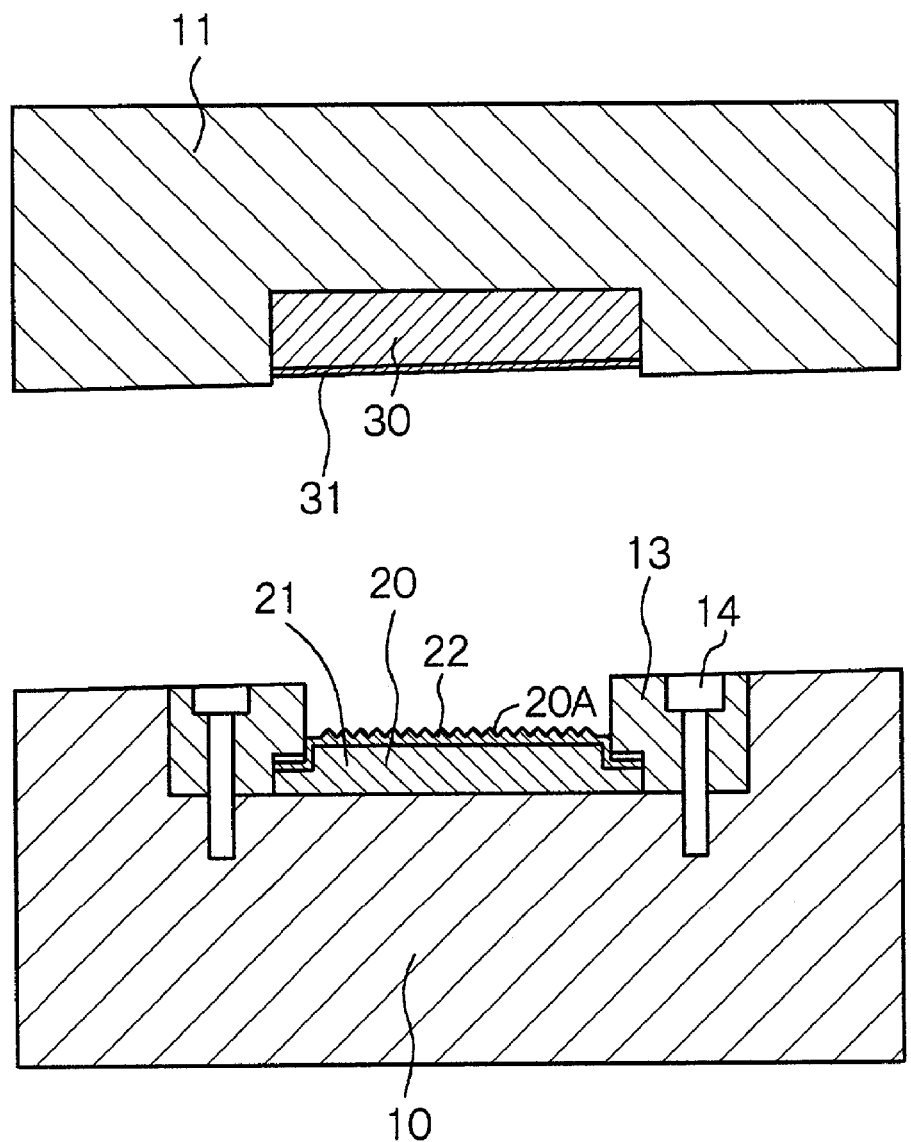
FIGS. 2A and 2B are a schematic cross-sectional view of the mold assembly in a mold-opened state, and a schematic enlarged cross-sectional view of the insert block in Example 1, respectively.

FIG. 1A and FIG. 2A show schematic cross-sectional views of the mold assembly in Example 1. The mold assembly has (A) a mold for forming a light guide plate made of a transparent resin, the mold comprising a first mold member (movable mold member) 10 and a second mold member (fixed mold member) 11 and in which a cavity 12 is formed when the mold is clamped, (B) a side-gate-type molten resin injection portion (not shown) provided for introducing a molten transparent resin into the cavity 12, and (C) an insert block 20 that is provided (arranged) in the first mold member 10 and is provided for partly constituting the cavity 12. FIG. 1A shows the mold assembly in a mold-clamped state. FIG. 2A shows the mold assembly in a mold-opened state. The mold assembly further has a cover plate 13 that is attached to the first mold member 10 with bolts 14, partly constitutes the cavity 12 and covers an end portion of the insert block 20. The cover plate 13 covers the end portion of the entire circumference of the insert block 20. Further, a molten resin injection portion (not shown) is formed in the cover plate 13.

Figure 3A:
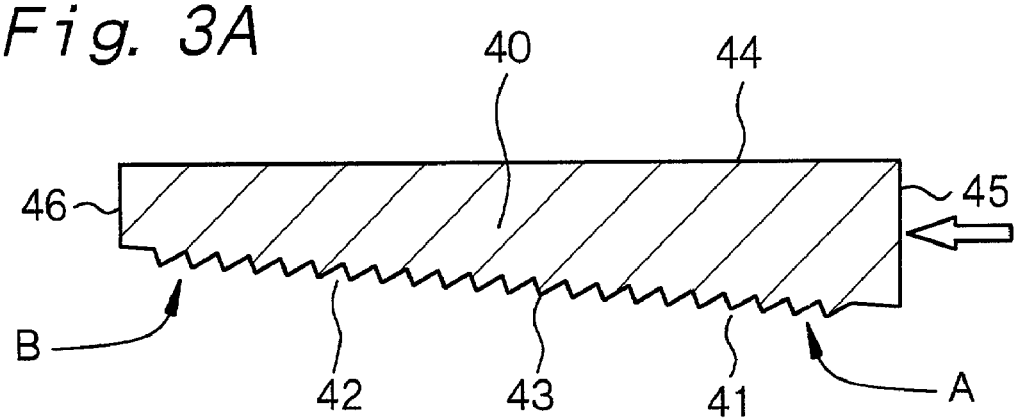
FIGS. 3A, 3B and 3C are a schematic cross-sectional view of a light guide plate, a conceptual view of an edge-type/back-light-type area light apparatus and a conceptual view of an edge-type/front-light-type area light apparatus, respectively.
Figure 4:
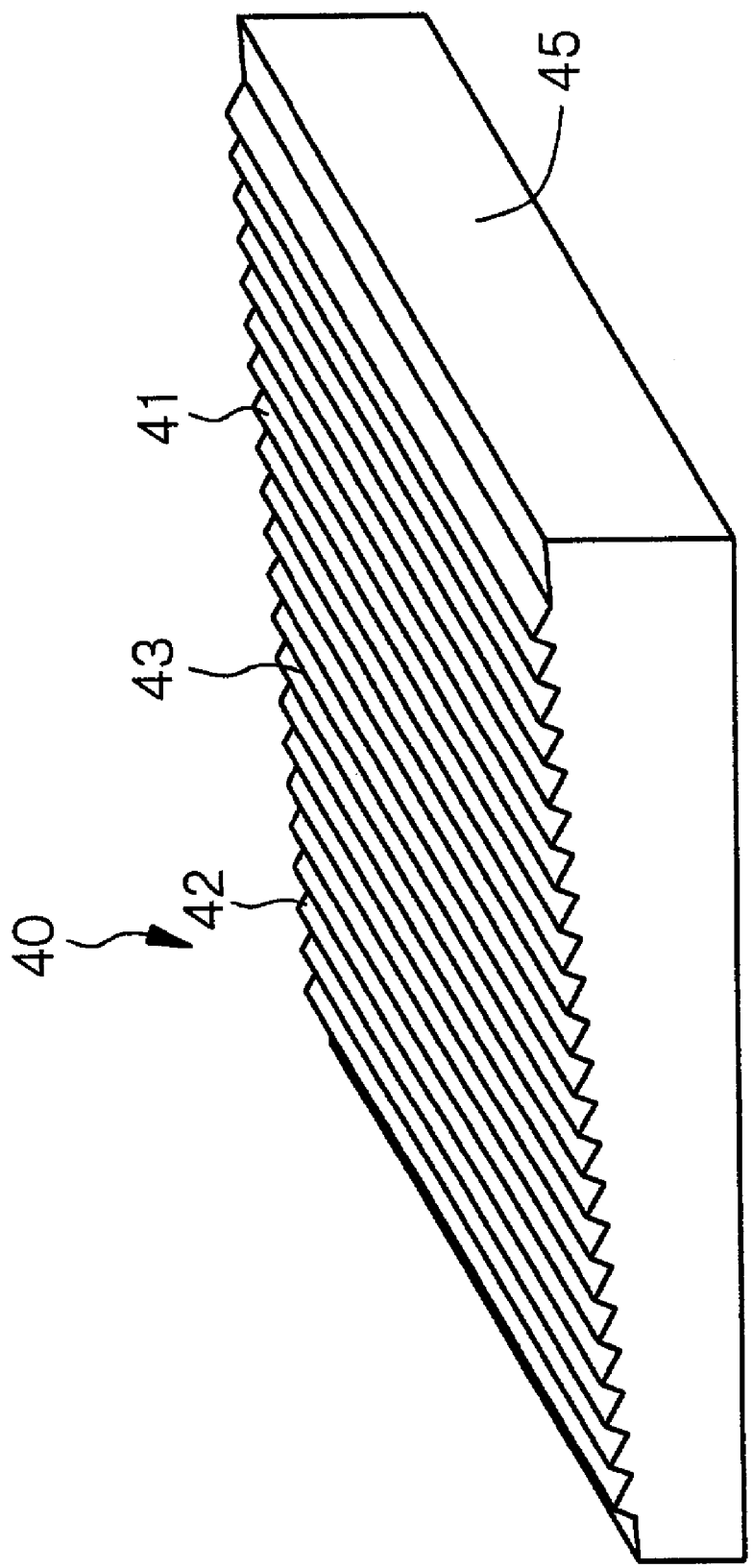
FIG. 4 is a schematic perspective view of a light guide plate.

The mold assembly is used to mold a light guide plate 40 whose schematic cross-sectional view is shown in FIG. 3A and whose schematic perspective view is shown in FIG. 4. The light guide plate 40 has a first main surface 41 and a nearly flat second main surface 44 opposite to the first main surface 41. In Example 1, the surface portion of the first main surface 41 is provided with convex portions 42 having a height (H) of 5 μm and a pitch of 200 μm. The convex portions 42 of at least 80% of the total convex portions 42 provided in the surface portion of the first main surface 41 have tip portions 43 having a radius of curvature of $2 \times 10^{-6}$ m or less. Otherwise, the surface of the convex portions 42 provided in the surface portion of the first main surface 41 has a surface roughness $R_z$ of 0.3 μm or less. Each convex portion 42 provided in the surface portion of the first main surface 41 comprises a continuous convex extending along a direction making a predetermined angle (specifically, a direction nearly at right angles) with the direction of incidence of light into the light guide plate 40 (a direction indicated by outlined arrows in FIG. 3A and FIGS. 6A to 6D). That is, when the light guide plate 40 is cut with an imaginary plane that is in the direction of incidence of light into the light guide plate 40 and perpendicular to the first main surface 41, the convex portions 42 have a cross-sectional form of a saw blade (triangles). That is, in the light guide plate 40 of Example 1, no flat portion exists in that portion of the first main surface 41 of the light guide plate 40 which is positioned between one convex portion 42 and another convex portion 42, and the first main surface 41 has concavo-convex portions. An edge (ridge) of each convex portion 42 corresponds to the tip portion 43 of each convex portion 42. The light guide plate 40 as a whole has the form of a wedge-shaped truncated quadrangular pyramid, and opposite two side walls of the truncated quadrangular pyramid correspond to the first main surface 41 and the second main surface 44. Light enters the light guide plate 40 through a side wall (large-thickness end portion 45) corresponding to a bottom surface of the truncated quadrangular pyramid, and exits from the first main surface 41 and the second main surface 44. In Example 1, the large-thickness portion 45 had a thickness of 1.2 mm, a side wall (small-thickness end portion 46) corresponding to a top surface of the truncated quadrangular pyramid had a thickness of 1.0 mm, and the light guide plate 40 had a width of 40 mm and a length of 60 mm. The "width" refers to a length measured in the direction in parallel with the saw-blade-shaped (prism-shaped) convex portions 42 (in the direction perpendicular to the paper surface of FIG. 3A).

Figure 1B:
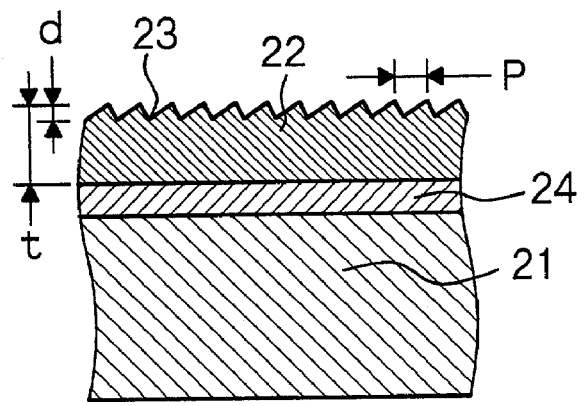
Figure 1C:
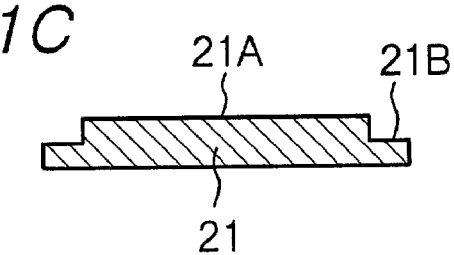
Figure 2B:
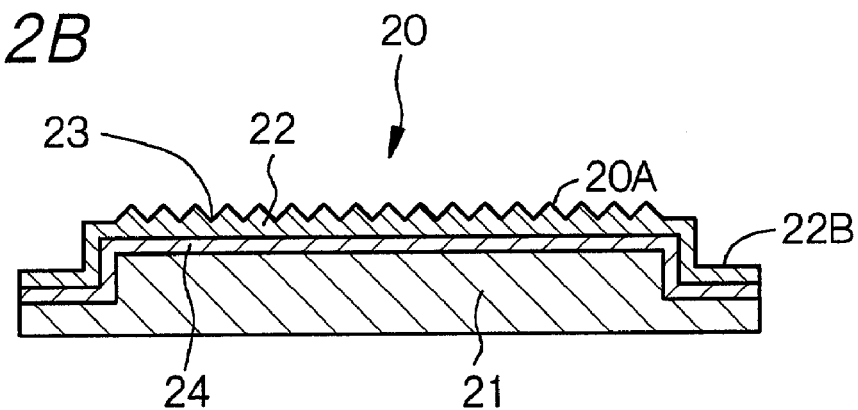

FIG. 2B shows an enlarged cross-sectional view of the insert block 20 (thickness 3.0 mm), and FIG. 1B shows an enlarged schematic partial cross-sectional view thereof. The insert block 20 is used for forming (molding) the first main surface 41 of the above light guide plate 40 and has an insert block body 21 made of partially stabilized zirconia ceramics (partially stabilized zirconium oxide, $ZrO_2$) containing yttrialite ($Y_2O_3$) as a partially stabilizing agent and a metal layer 22 formed on the surface of the insert block body 21 which surface faces the cavity 12 and provided with concave portions 23 for forming the convex portions 42 of the light guide plate 40. FIG. 1C shows a schematic cross-sectional view of the insert block body 21. The content of the partially stabilizing agent in the partially stabilized zirconia ceramics having a composition of $ZrO_2$—$Y_2O_3$ was 3 mol %. The partially stabilized zirconia ceramics has a heat conductivity of approximately 3.8 J/(m·s·k). The saw-blade-shaped (prism-shaped) concave portions 23 formed in the metal layer 22 have a depth d of 5 μm and a pitch P of 200 μm and have the form of a saw blade (triangles). Each concave portion 23 formed in the metal layer 22 comprises a continuous concave extending in a direction making a predetermined angle with the direction of incidence of light into the light guide plate (specifically the direction nearly at right angles), and the concave portions 23 have a form complementary to the convex portions 42 formed in the first main surface 41 of the light guide plate 40. A portion where the above concave portions 23 are formed corresponds to a cavity surface 20A of the insert block 20. The surface of the concave portion 23 formed in the metal layer 22 (more specifically, the surface of the entire concavo-convex portion) had a surface roughness $R_z$ of 0.2 µm or less (specifically, $R_z$=0.01 µm on average).

The metal layer 22 is made of two layers, one is a 5 µm thick Ni layer formed by electric plating and the other is a 100 µm thick Ni compound layer formed thereon (Ni—P layer formed by electroless plating). That is, the metal layer 22 had a thickness t of 105 µm. The drawings show the metal layer 22 as a single layer. That surface of the insert block body 21 which faces the cavity 12 has a surface roughness $R_z$ of 0.5 µm. Further, a 10 µm thick activated metal layer 24 made of a Ti—Cu—Ag eutectic composition is formed between the insert block body 21 and the metal layer 22. The activated metal layer 24 is formed by an activated metal soldering method.

A metal layer 22B having a flat surface (see FIG. 2B) is formed on the surface of that portion of the insert block body 21 which faces the cover plate 13 in a state where the first mold member 10 and the second mold member 11 are clamped. The metal layer 22B is formed concurrently with the metal layer 22, and the activated metal layer 24 is present under the metal layer 22B.

Specifically, a mixture of a zirconia powder and an yttrialite powder was press-molded and then calcined or sintered to prepare the insert block body 21 (see the cross-sectional view of FIG. 1C). Then, that surface (to be referred to as "surface 21A" of the insert block body 21 which faces the cavity 12 and that surface (to be referred to as "surface 21B" of the insert block body 21 which faces the cover plate 13 were polished and finished with a diamond grinder, so that these surfaces 21A and 21B had a surface roughness $R_z$ of 0.5 µm. Then, the activated metal layer 24 was formed on the above surfaces 21A and 21B of the insert block body 21 by an activated metal soldering method. Specifically, a paste prepared from a Ti—Cu—Ag eutectic composition was applied to the above surfaces 21A and 21B of the insert block body 21, and the applied paste was baked at a high temperature of approximately 800° C. in vacuum, to form the activated metal layer 24. Then, a portion where the activated metal layer 24 was not formed on the insert block body 21 was masked, and a nickel layer was formed by an electric plating method. Further, an Ni—P layer was formed thereon by an electroless plating method. Then, the Ni—P layer was machined using a diamond tool having saw-blade-shaped (prism-shaped) concavo-convex portions, to form the concave portions 23 in the metal layer 22.

The first mold member (movable mold member) 10 was fabricated from a carbon steel S55C and cut to form an insert-block-fitting portion. The metal layer 22B formed on the surface 21B was cut with a metal-working surface cutting machine. And, the insert block 20 was fit to the insert-block-fitting portion, the end portions of the insert block 20 were covered with the cover plate 13, and the cover plate 13 was fixed to the first mold member 10 with the bolts 14.

Further, the second mold member (fixed mold member) 11 was fabricated from a carbon steel S55C and cut to form an insert-block-fitting portion. And, a second insert block 30 was fixed to the insert-block-fitting portion with an adhesive. The second insert block 30 has the same constitution as that of the insert block 20 except that the second insert block 30 has a flat surface and a different thickness. Further, the second insert block 30 can be prepared by the same method as that applied to the preparation of the insert block 20, and a metal layer 31 is formed on the surface of the second insert block 30. The metal layer 31 has a surface roughness $R_z$ of 0.01 µm.

The thus-fabricated first mold member (movable mold member) 10 and the second mold member (fixed mold member) 11 were assembled to obtain the mold assembly of Example 1. In a state where the first mold member 10 and the second mold member 11 were clamped, the insert block 20 and the cover plate 13 had a clearance $C_{21}$ of 0.001 mm, and the overlap amount of the cover plate 13 relative to the insert block 20 was $\Delta S_{21}$ of 2.0 mm. Further, the second insert block 30 and the cover plate 13 also had a clearance $C_{43}$ of 0.001 mm, and the overlap amount $\Delta S_{43}$ of the cover plate 13 relative to the second insert block 30 was 2.0 mm as well. In the above structure, the end portions of the insert block 20 and the second insert block 30 come to be free from contact to a molten transparent resin introduced into the cavity 12.

The thus-completed mold assembly was attached to a molding machine, and the mold assembly was heated to 130° C. and rapidly cooled to 40° C. with a mold temperature regulator. However, none of the insert block 20 and the second insert block 30 suffered any damage or breaking such as cracking. Further, no damage or breaking occurred in the metal layers 22 and 31.

With a TR100EH injection molding machine manufactured by SODICK Corp., a polycarbonate resin having a weight-average molecular weight of $1.6 \times 10^4$ as a transparent resin was injection-molded. The molding condition was set as shown in the following Table 1. The molten polycarbonate resin was introduced (injected) into the cavity 12 through the molten resin injection portion (having a side gate structure). After a predetermined amount of the molten polycarbonate resin was introduced (injected) into the cavity 12 through the molten resin injection portion, the polycarbonate resin in the cavity 12 was cooled to solidness, the mold assembly was opened after 30 seconds, and the light guide plate 40 was taken out of the mold assembly.

TABLE 1

| Mold temperature | 100° C. |
|---|---|
| Resin temperature | 300° C. |
| Injection pressure | $1.47 \times 10^8$ Pa (1500 kgf/cm$^2$ – G) |

The saw-blade-shaped (prism-shaped) convex portions 42 of the obtained light guide plate 40 were observed through a laser microscope (3000 magnifications) and photographs thereof were taken. The tip portions 43 of the convex portions 42 formed in the surface portion of the first main surface 41 were measured for radius of curvature on the basis of the photographs, to show that the convex portions 42 of 92% of the total convex portions 42 had the tip portions 43 having a radius of curvature of $2 \times 10^{-6}$ m or less. Further, brightness measurement was conducted in nine places in a measurement range having a diameter of 10 mm with BM5A supplied by TOPCON Corp. The nine places in the measurement range included three places in that portion of the light guide plate 40 which corresponded to vicinities of the molten resin injection portion, three places in the central portion of the light guide plate and three places near the end portion of the light guide plate. In Examples and Comparative Example to be described later, the brightness measurement was also carried out by the above method. The measurement results showed that the value of brightness minimum value/brightness maximum value was 0.95. Further, when the convex portions (indicated by an arrow "A" in FIG. 3A) formed in the surface portion of the first main surface which surface portion was positioned near the side wall (large-thickness portion 45) corresponding to the bottom surface of the truncated quadrangular pyramid had an average height of $H_1$, and when the convex portions (indicated by an arrow "B" in FIG. 3A) formed in the surface portion of the first main surface which surface portion was positioned near the side wall (small-thickness portion 46) corresponding to the top surface of the truncated quadrangular pyramid had an average height of $H_2$, the ratio of $H_2/H_1$ was at least 0.8 (specifically, it was 4.8 μm/5.0 μm=0.96). In Examples and Comparative Example to be described later, the average height of $H_1$ and the average height of $H_2$ were obtained in the above portions.

Further, the surfaces of the convex portions 42 formed in the surface portion of the first main surface 41 (more specifically, the surface of the entire concavo-convex portion) were measured for a surface roughness $R_z$ with a surface roughness measurement instrument, FORM TALYSURF manufactured by RANK TAYLOR HOBSON Ltd., to show that all the convex portions 42 (more specifically, the surface of the entire concavo-convex portion) had a surface roughness $R_z$ of 0.3 μm or less. Specifically, the convex portions 42 formed in the surface portion of the first main surface (indicated by an arrow "A" in FIG. 3A) which surface portion was positioned near the side wall (large-thickness portion 45) corresponding to the bottom surface of the truncated quadrangular pyramid had a surface roughness $R_z$ of approximately 0.01 μm, and the convex portions 42 formed in the surface portion (indicated by an arrow "B" in FIG. 3A) of the first main surface which surface portion was positioned near the side wall (small-thickness portion 46) corresponding to the top surface of the truncated quadrangular pyramid had a surface roughness $R_z$ of approximately 0.02 μm.

Figure 3B:
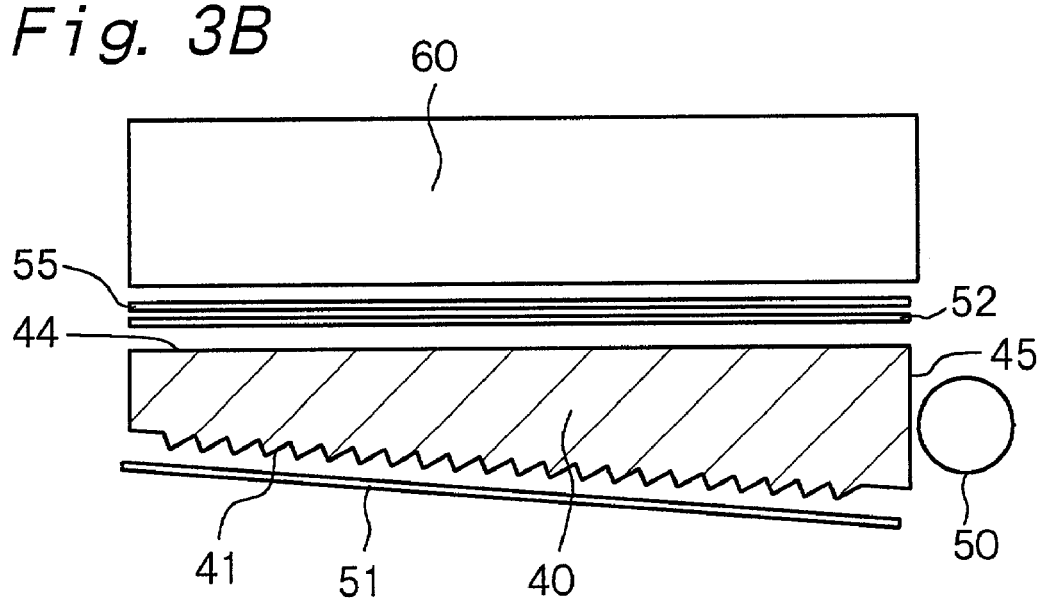

FIG. 3A shows a schematic cross-sectional view of the thus-obtained light guide plate (light guiding plate) 40. In an edge-type/back-light-type area light apparatus (surface-emitting light source apparatus) of Example 1 into which the light guide plate 40 is incorporated, the light guide plate 40 is arranged such that the second main surface 44 thereof faces a liquid crystal display device 60 as shown in the conceptual view of FIG. 3B. And, light that is emitted from a light source 50 and enters the light guide plate 40 through its wedge-shaped large-thickness portion 45 is divided into light that is reflected by the first main surface 41 and exits from the second main surface 44 and light that is transmitted through the first main surface 41. The light that is transmitted through the first main surface 41 is reflected by a reflection member 51 arranged in a position facing the first main surface 41, re-enters the light guide plate 40 and exits from the second main surface 44. The light that exits from the second main surface 44 is introduced to the liquid crystal display device 60 arranged so as to face the second main surface 44. Between the liquid crystal display device 60 and the second main surface 44 of the light guide plate 40, a diffusion sheet 52 and a prism sheet 55 are arranged and uniformly diffuses light. Convex portions (not shown) having a continuous convex form are formed in the surface of the prism sheet 55 and extends in a direction nearly in parallel with the direction of incidence of light into the light guide plate 40.

Figure 3C:
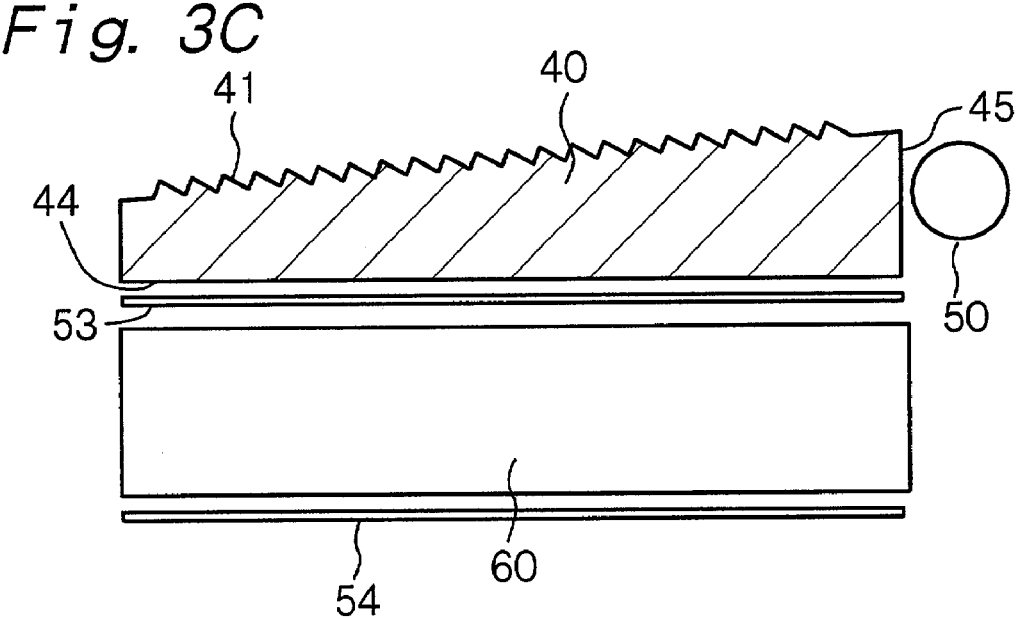

In the edge-type/front-light-type area light apparatus of Example 1, the light guide plate 40 is arranged such that its second main surface 44 faces a liquid crystal display device 60 as shown in the conceptual view of FIG. 3C. And, light that is emitted from the light source 50 and enters the light guide plate 40 through the wedge-shaped large-thickness portion 45 thereof is reflected by the convex portions 42 of the first main surface 41 and exits from the second main surface 44. And, the light is passed through the liquid crystal display device 60 arranged in a position facing the second main surface 44, is reflected by a reflection member 54 and is again passed through the liquid crystal display device 60. The above light passes through a phase difference film 53 and an anti-reflection layer (not shown) formed on the second main surface 44 of the light guide plate 40, exits from the first main surface 41 of the light guide plate 40 and is recognized as images. The front-light-type area light apparatus gives brighter images than the back-light-type area light apparatus, and can attain brightness with outer light alone, so that the front-light-type has an advantage that the power consumption can be decreased.

COMPARATIVE EXAMPLE 1

In Comparative Example 1, an insert block 20 and a second insert block 30 were fabricated from a steel material. These insert blocks 20 and 30 were incorporated into the same mold as that in Example 1, and injection molding was carried out under the same condition as that in Example 1 using the same injection molding machine as that in Example 1 and the same polycarbonate resin as that in Example 1. However, the injection pressure shown in Table 1 was insufficient, so that the injection pressure was changed to $2.16 \times 10^8$ Pa (2200 kgf/cm$^2$-G) to carry out the injection molding.

The saw-blade shaped (prism-shaped) convex portions 42 of the obtained light guide plate were observed through a laser microscope (3000 magnifications) and photographs thereof were taken. The tip portions 43 of the convex portions 42 formed in the surface portion of the first main surface 41 were measured for radius of curvature on the basis of the photographs, to show that the convex portions 42 of 73% of the total convex portions 42 had the tip portions 43 having a radius of curvature of $2 \times 10^{-6}$ m or less. Further, brightness measurement in a measurement range having a diameter of 10 mm was conducted in nine places. The measurement results showed that the value of brightness minimum value/brightness maximum value was 0.50. The ratio of $H_2/H_1$ was less than 0.8 (specifically, it was 3.8 μm/5.0 μm=0.76). Further, the surfaces of the convex portions 42 formed in the surface portion of the first main surface were measured for a surface roughness $R_z$ to show an $R_z$ of approximately 0.4 μm.

EXAMPLE 2

Example 2 is a variant of Example 1. An insert block 20 in Example 2 was fabricated by the following method. A second insert block 30 can be also fabricated by the same method.

First, a mixture of a zirconia powder and an yttrialite powder was press-molded and then calcined or sintered to prepare the insert block body 21. Then, that surface (surface 21A) of the insert block body 21 which faces the cavity 12 and that surface (surface 21B) which faces the cover plate 13 were subjected to blasting treatment using alumina particles, so that these surfaces 21A and 21B had a surface roughness $R_z$ of 2 µm. Then, a 2 µm thick Ni—P layer was formed on the above surfaces 21A and 21B of the insert block body 21 by an electroless plating method, then, a 5 µm thick Ni layer was formed thereon by an electric plating method, and further, a 100 µm thick Ni—P layer was formed thereon by an electroless plating method. Then, the Ni—P layer was machined using a diamond tool having saw-blade-shaped (prism-shaped) concavo-convex portions to form concave portions 23 in a metal layer 22.

The thus-fabricated insert block 20 and the second insert block 30 were incorporated into a mold assembly, the mold assembly was attached to a molding machine, and then the mold assembly was heated to 130° C. and then rapidly cooled to 40° C. with a mold temperature regulator. Even in this case, however, none of the insert block 20 and the second insert block 30 suffered any damage or breaking such as cracking. Further, no damage or breaking occurred in the metal layers 22 and 31.

These insert blocks 20 and 30 were incorporated into the same mold as that in Example 1, and injection molding was carried out under the same condition as that in Example 1 using the same injection molding machine as that in Example 1 and the same polycarbonate resin as that in Example 1.

The saw-blade-shaped (prism-shaped) convex portions 42 of the obtained light guide plate 40 were observed through a laser microscope (3000 magnifications) and photographs thereof were taken. The tip portions 43 of the convex portions 42 formed in the surface portion of the first main surface 41 were measured for radius of curvature on the basis of the photographs, to show that the convex portions 42 of 93% of the total convex portions 42 had the tip portions 43 having a radius of curvature of $2 \times 10^{-6}$ m or less. Further, brightness measurement in a measurement range having a diameter of 10 mm was conducted in nine places in the same manner as in Example 1. The measurement results showed that the value of brightness minimum value/brightness maximum value was 0.95. The ratio of $H_2/H_1$ was at least 0.8 (specifically, it was 4.9 µm/5.0 µm=0.98). Further, the surfaces of the convex portions 42 formed in the surface portion of the first main surface 41 were measured for a surface roughness $R_z$ to show that all the convex portions 42 (more specifically, the surface of the entire concavo-convex portion) had a surface roughness $R_z$ of 0.3 µm or less. Specifically, the convex portions 42 formed in the surface portion of the first main surface (indicated by an arrow "A" in FIG. 3A) which surface portion was positioned near the side wall (large-thickness portion 45) corresponding to the bottom surface of the truncated quadrangular pyramid had a surface roughness $R_z$ of approximately 0.01 µm, and the convex portions 42 formed in the surface portion (indicated by an arrow "B" in FIG. 3A) of the first main surface which surface portion was positioned near the side wall (small-thickness portion 46) corresponding to the top surface of the truncated quadrangular pyramid had a surface roughness $R_z$ of approximately 0.02 µm.

EXAMPLE 3

Example 3 is also a variant of Example 1. Example 3 used partially stabilized electrically conductive zirconia ceramics to constitute an insert block body 21. Further, a metal layer 22 was formed on that surface 21A of the insert block body 21 which was to face the cavity. That is, specifically, the insert block 20 is made of partially stabilized zirconia ($ZrO_2$—$Y_2O_3$) ceramics containing 8% by weight of $Fe_2O_3$ as an electrically conducting agent. Further, the content of $Y_2O_3$ as a partially stabilizing agent in the partially stabilized zirconia ceramics was 3 mol %. The above electrically conductive zirconia ceramics has a heat conductivity of approximately 3.8 J/(m·s·k) and a specific volume resistivity of $1 \times 10^8$ Ω·cm. The metal layer 22 is made of chromium (Cr). In Example 3, the metal layer 22 was formed on the entire surface of the insert block 20 by an electric plating method.

Other elements of the insert block of Example 3 can be the same as those of the insert block explained in Example 1, and a light guide plate produced using the insert block of Example 3 also has a structure similar to the structure of the light guide plate explained in Example 1 and can be fabricated in the same manner as in Example 1. Further, an area light apparatus (surface-emitting light source apparatus), the structure of a mold assembly and an injection molding method in Example 3 can be the same as the area light apparatus, the mold assembly and the injection molding method explained in Example 1, so that detailed explanations thereof are omitted. The thus-obtained light guide plate had the same dimensions and properties as those of the light guide plate explained in Example 1.

EXAMPLE 4

Figure 5:
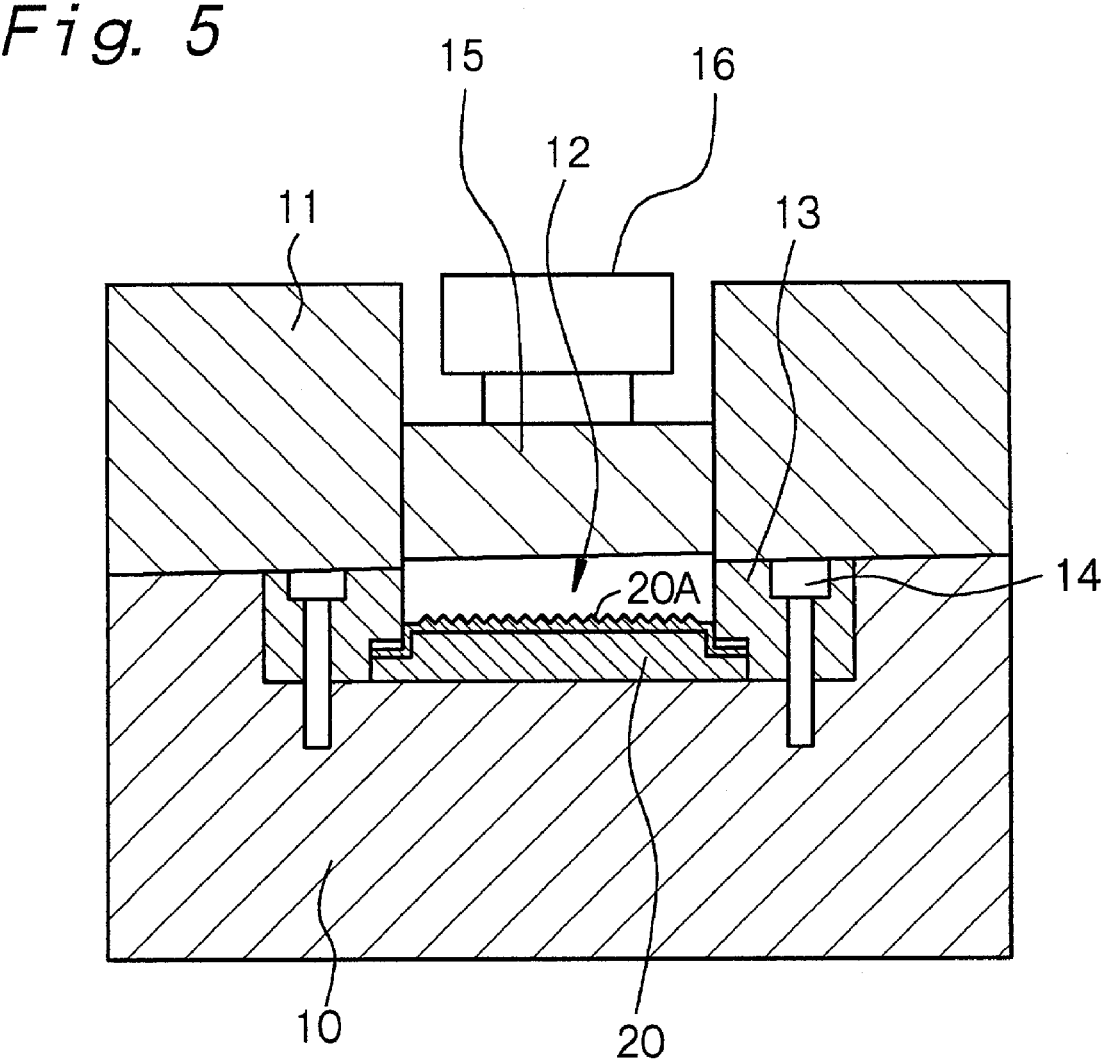
FIG. 5 is a schematic cross-sectional view of a mold assembly in Example 4.

Example 4 is also a variant of Example 1. In Example, a light guide plate 40 was molded by an injection compression molding method. FIG. 5 shows a schematic cross-sectional view of a mold assembly in Example 4. This mold assembly differs from the mold assembly explained in Example 1 in that a core 15 made of steel is provided in place of the second insert block and that a hydraulic cylinder 16 is provided for moving the core 15. The core 15 is allowed to move toward the insert block 20 with the hydraulic cylinder 16, whereby the volume of the cavity 12 can be varied. Other constitutions of the mold assembly can be the same as those of the mold assembly in Example 1, so that detailed explanations thereof are omitted.

In Example 4, the movement of the core 15 was 0.1 mm. Further, the light guide plate 40 had a large-thickness portion 45 having a thickness of 0.9 mm and a small-thickness portion 46 having a thickness of 0.7 mm. And, injection molding was carried out under the same condition as that in Example 1 using the same injection machine as that in Example 1 and the same polycarbonate resin as that in Example 1. Upon completion of injection of the molten polycarbonate resin into the cavity 12, the core 15 was allowed to move toward the insert block 20 with the hydraulic cylinder 16.

The saw-blade-shaped (prism-shaped) convex portions 42 of the obtained light guide plate 40 were observed through a laser microscope (3000 magnifications) and photographs thereof were taken. The tip portions 43 of the convex portions 42 formed in the surface portion of the first main surface 41 were measured for radius of curvature on the basis of the photographs, to show that the convex portions 42 of 97% of the total convex portions 42 had the tip portions 43 having a radius of curvature of $2 \times 10^{-6}$ m or less. Further, brightness measurement in a measurement range having a diameter of 10 mm was conducted in nine places in the same manner as in Example 1. The measurement results showed that the value of brightness minimum value/brightness maximum value was 0.96. The ratio of $H_2/H_1$ was at least 0.8 (specifically, it was 5.0 μm/5.0 μm=1.00). The convex portions 42 in any portion of the light guide plate were measured for heights, to show 5.0 μm. Further, the surfaces of the convex portions 42 formed in the surface portion of the first main surface 41 were measured for a surface roughness $R_z$ to show that all the convex portions 42 (more specifically, the surface of the entire concavo-convex portion) had a surface roughness $R_z$ of 0.3 μm or less. Specifically, the convex portions 42 formed in the surface portion of the first main surface (indicated by an arrow "A" in FIG. 3A) which surface portion was positioned near the side wall (large-thickness portion 45) corresponding to the bottom surface of the truncated quadrangular pyramid had a surface roughness $R_z$ of approximately 0.01 μm, and the convex portions 42 formed in the surface portion (indicated by an arrow "B" in FIG. 3A) of the first main surface which surface portion was positioned near the side wall (small-thickness portion 46) corresponding to the top surface of the truncated quadrangular pyramid had a surface roughness $R_z$ of approximately 0.01 μm.

EXAMPLE 5

Example 5 is concerned with variants of Examples 1 to 4. Various variants of the convex portions formed in the first main surface of the light guide plate will be explained in Example 5. Other elements of the light guide plates of Example 5 can be the same as those of the light guide plates explained in Examples 1 to 4, and the light guide plates of Example 5 can be produced in the same manner as in Examples 1 to 4. Further, the area light apparatus, the structures of mold assemblies and injection molding methods can be the same as the area light apparatus, the mold assemblies and the injection molding methods explained in Examples 1 to 4, so that detailed explanations thereof are omitted.

Figure 6A:
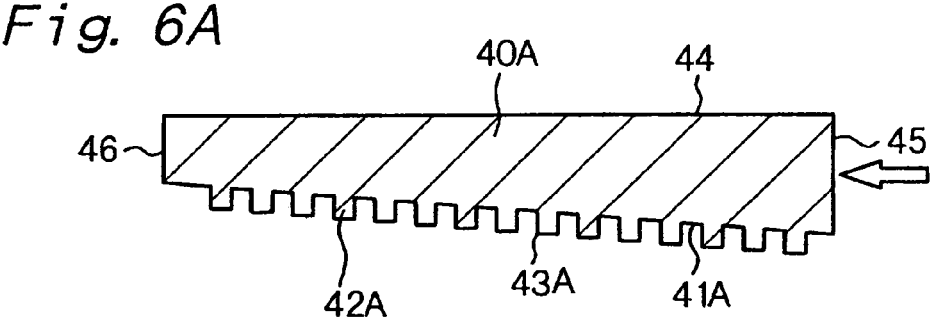
FIGS. 6A to 6D are schematic cross-sectional views of light guide plates in Example 5, respectively.
Figure 7:
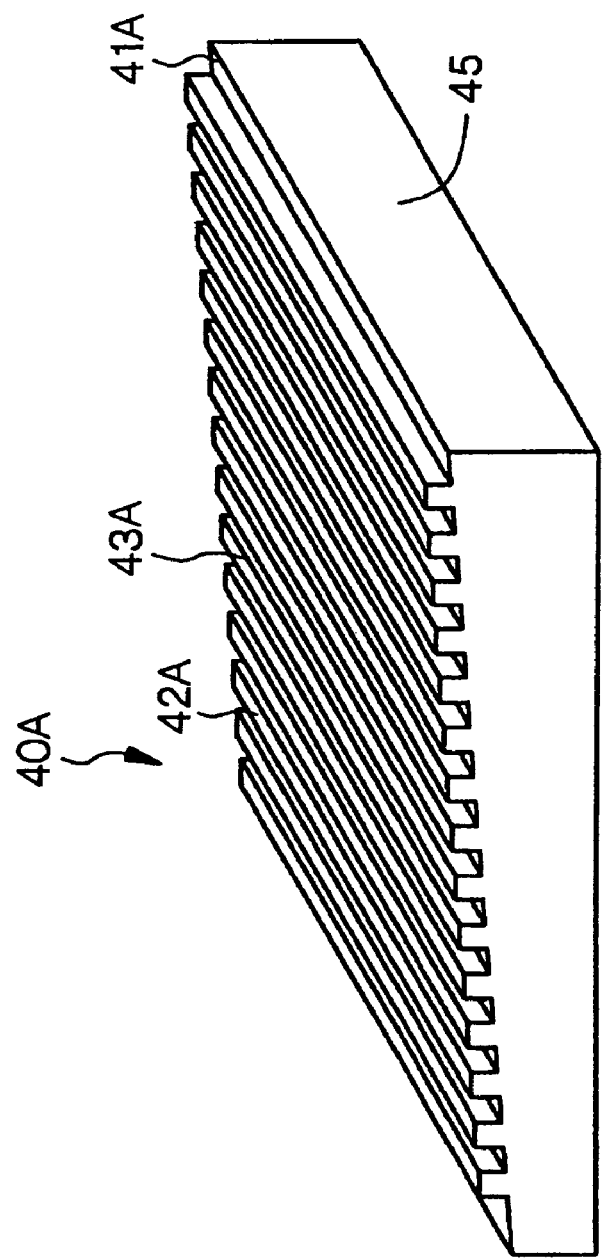
FIG. 7 is a schematic perspective view of the light guide plate shown in the cross-sectional view of FIG. 6A.

FIG. 6A shows a schematic cross-sectional view of a light guide plate (light guiding plate) 40A, and FIG. 7 shows a schematic perspective view thereof. In the light guide plate 40A, each convex portion 42A formed in the surface portion of the first main surface 41A comprises a continuous convex extending along a direction making a predetermined angle with the direction of incidence of light into the light guide plate 40A (specifically, a direction nearly at right angles). When the light guide plate 40A is cut with an imaginary plane that is in the direction of incidence of light into the light guide plate 40A and is perpendicular to the first main surface 41A, the continuous convex has the cross-sectional form of a trapezoid. The edge lines (ridges) defined by the top surface and the two side walls of each convex portion 42A corresponds to the tip portion 43A of each convex portion 42A. The same reference numerals in the drawings refer to the same elements as those indicated by such reference numerals in FIG. 3A. This light guide plate 40A is concerned with the first or third aspect of the present invention.

Figure 6B:
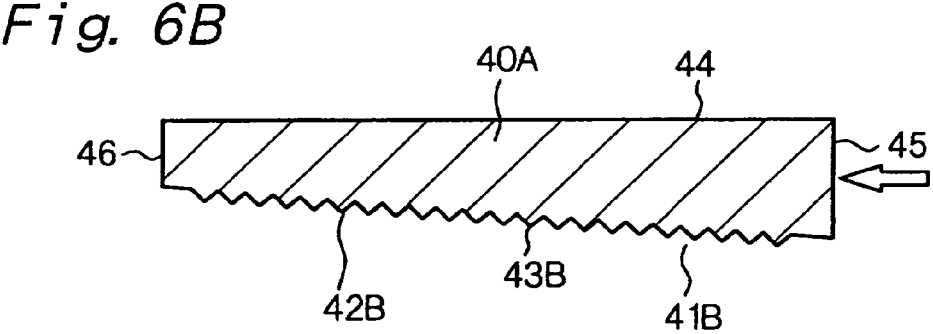
Figure 8:
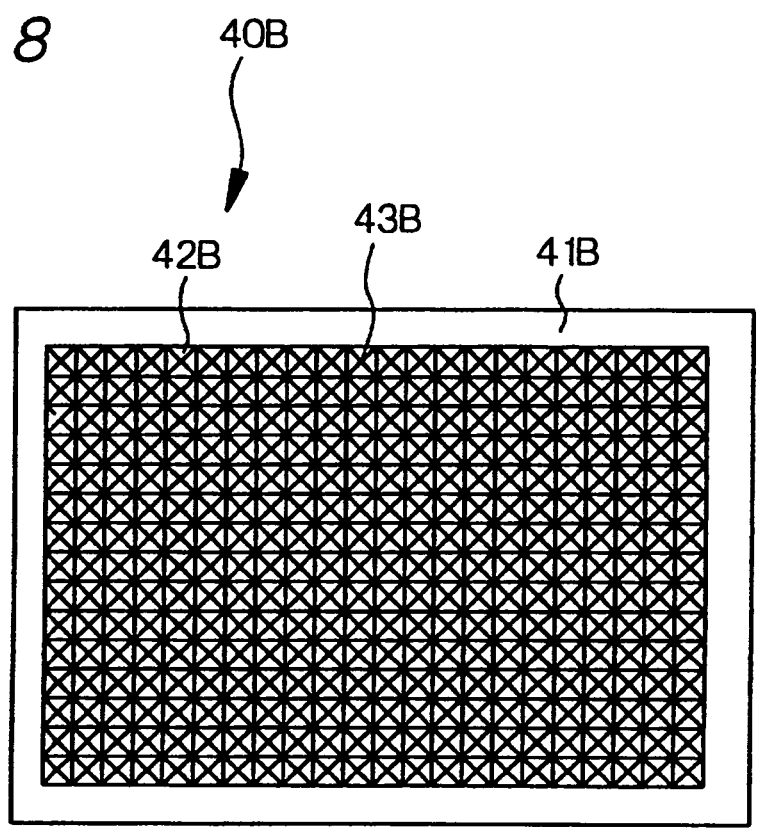
FIG. 8 is a schematic plan view of the light guide plate shown in the cross-sectional view of FIG. 6B.

FIG. 6B shows a schematic cross-sectional view of a light guide plate (light guiding plate) 40B, and FIG. 8 shows a schematic plan view thereof. In the light guide plate 40B, each convex portion 42B formed in the surface portion of the first main surface 41B comprises discontinuous convexes arranged along a direction making a predetermined angle with the direction of incidence of light into the light guide plate 40B (specifically, nearly at right angles). When the light guide plate 40B is cut with an imaginary plane that is in the direction of incidence of light into the light guide plate 40B and is perpendicular to the first main surface 41B, the discontinuous convex has the form of a pyramid. Each peak portion of the pyramid corresponds to the tip portion 43B of each convex portion 42B. This light guide plate 40B is concerned with the first or third aspect of the present invention. Further, no flat portion exists in that portion of the first main surface of the light guide plate which is positioned between one convex portion and another convex portion, and more specifically, the convex portions 42B constitutes a concavo-convex portion. In this case, the surface roughness is measured as the surface roughness $R_z$.

Figure 6C:
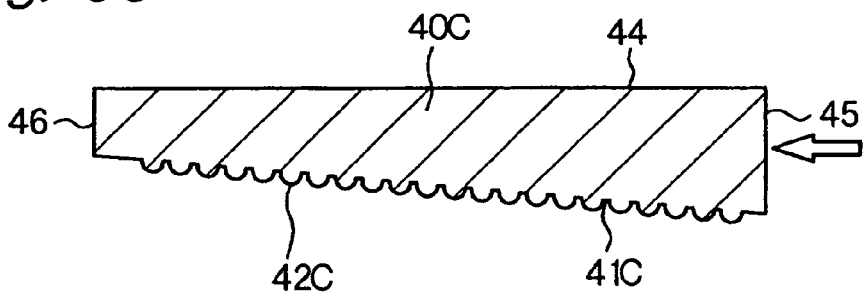
Figure 9:
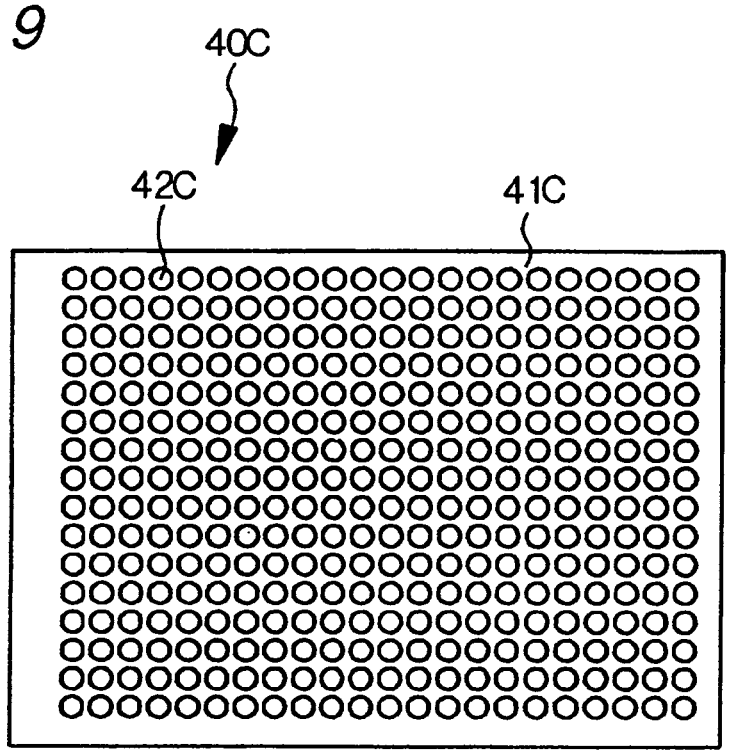
FIG. 9 is a schematic plan view of the light guide plate shown in the cross-sectional view of FIG. 6C.

Further, FIG. 6C shows a schematic cross-sectional view of a light guide plate (light guiding plate) 40C, and FIG. 9 shows a schematic plan view thereof. In the light guide plate 40C, each convex portion 42C formed in the surface portion of the first main surface comprises discontinuous convexes arranged along a direction making a predetermined angle with the direction of incidence of light into the light guide plate (specifically, nearly at right angles). The discontinuous convex portion has the form of a semi-sphere. This light guide plate 40C is concerned with the third aspect of the present invention. In this case, the surface roughness is measured as the surface roughness $R_r$.

Figure 6D:
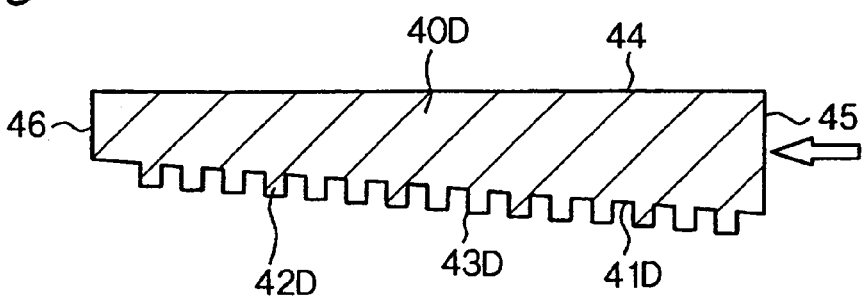
Figure 10:
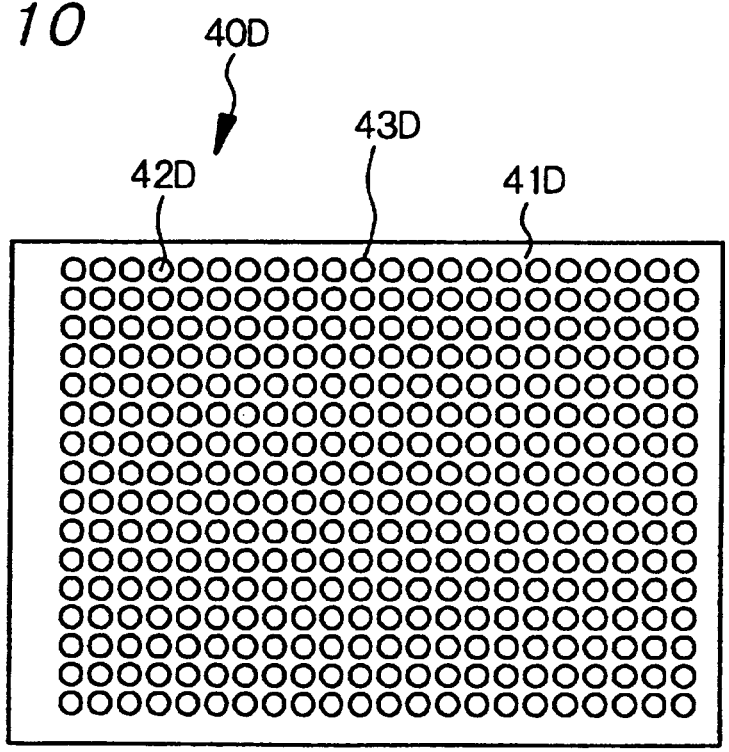
FIG. 10 is a schematic plan view of the light guide plate shown in the cross-sectional view of FIG. 6D.

Further, FIG. 6D shows a schematic cross-sectional view of a light guide plate (light guiding plate) 40D, and FIG. 10 shows a schematic plan view thereof. In the light guide plate 40D, each convex portion 42D formed in the surface portion of the first main surface comprises discontinuous convexes arranged along a direction making a predetermined angle with the direction of incidence of light into the light guide plate (specifically, nearly at right angles). The discontinuous convex portion has the form of a column. Each edge line (ridge) defined by the top surface and the side wall of each convex portion 42D corresponds to a tip portion 43D of the convex portion 42D. The above light guide plate 40D is concerned with the first or third aspect of the present invention. In this case, the surface roughness is measured as the surface roughness $R_z$.

EXAMPLE 6

Example 6 is concerned with the light guide plate/area light apparatus according to the second/fourth aspects of the present invention and the insert block/mold assembly/molding method according to the second/fourth aspects of the present invention. The light guide plate 140 or the area light apparatus (surface-emitting light source apparatus) in Example 6 has the same constitution as that of the light guide plate or the area light apparatus explained in each of Examples 1 to 4 except that concave portions are formed in the first main surface of the light guide plate. Further, the insert block or the mold assembly for forming the light guide plate and the molding method in Example 6 can be the same as the insert block or the mold assembly and the molding method explained in each of the Examples 1 to 4 except that convex portions are formed in the metal layer.

Figure 11A:
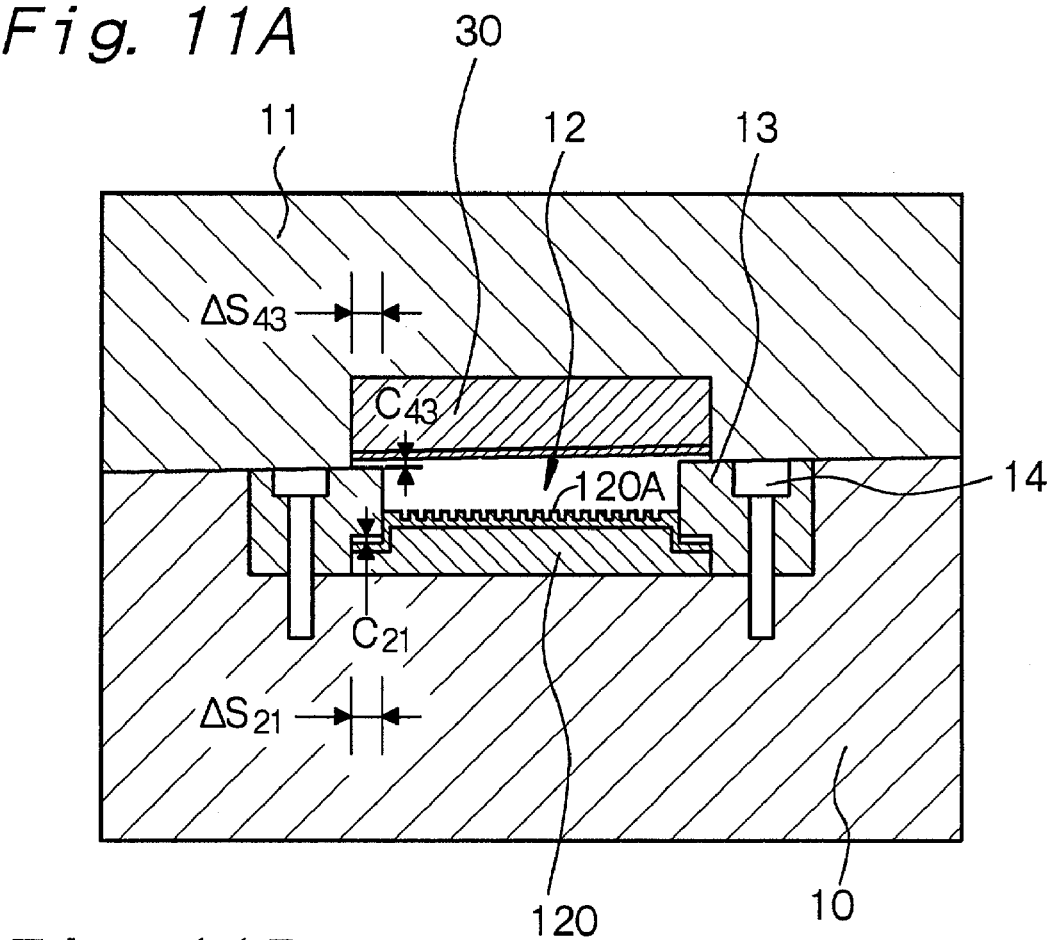
FIGS. 11A, 11B and 11C are a schematic cross-sectional view of a mold assembly in a mold-clamped state, a schematic partial cross-sectional view of an insert block and a schematic cross-sectional view of an insert block body in Example 6, respectively.
Figure 12A:
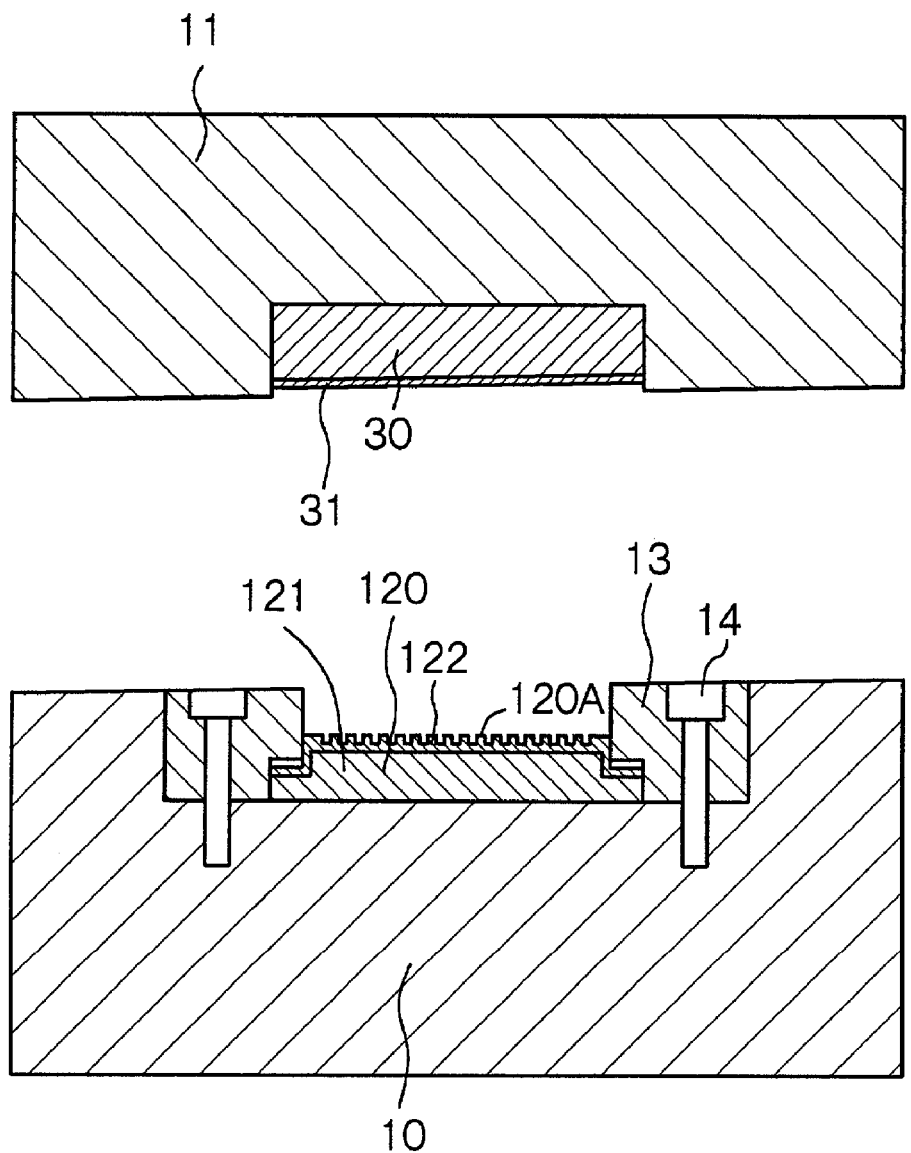
FIGS. 12A and 12B are a schematic cross-sectional view of the mold assembly in a mold-opened state, and an enlarged cross-sectional view of the insert block in Example 6, respectively.

FIG. 11A and FIG. 12A show schematic cross-sectional views of the mold assembly in Example 6. The mold assembly has (A) a mold for forming a light guide plate made of a transparent resin, the mold comprising a first mold member (movable mold member) 10 and a second mold member (fixed mold member) 11 and in which a cavity 12 is formed when the mold is clamped, (B) a side-gate-type molten resin injection portion (not shown) for introducing a molten transparent resin into the cavity 12, and (C) an insert block 120 that is arranged in the first mold member 10 and partly constitutes the cavity 12. FIG. 11A shows the mold assembly in a mold-clamped state, and FIG. 12A shows the mold assembly in a mold-opened state. The mold assembly further has a cover plate 13 that is attached to the first mold member 10 with bolts 14, partly constitutes the cavity 12 and covers an end surface of the insert block 120. The cover plate 13 covers the end surface on the entire circumference of the insert block 120. Further, a molten resin injection portion (not shown) is formed in the cover plate 13.

Figure 13A:
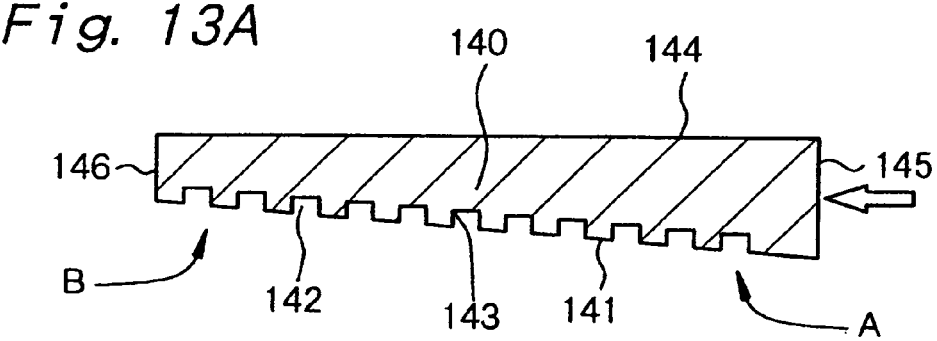
FIGS. 13A to 13D are schematic cross-sectional views of light guide plates in Example 6, respectively.
Figure 13B:
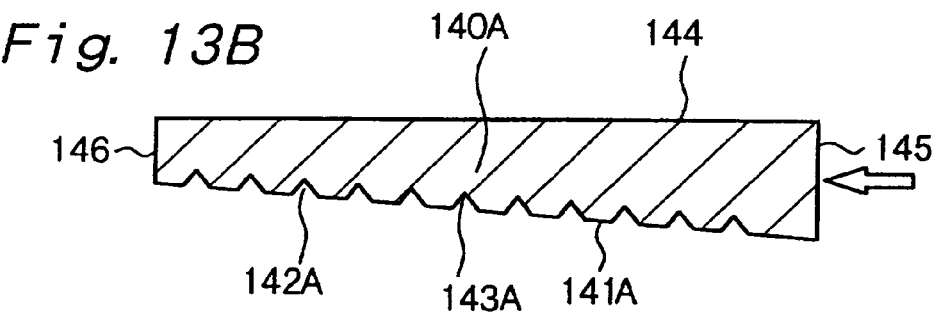
Figure 13C:
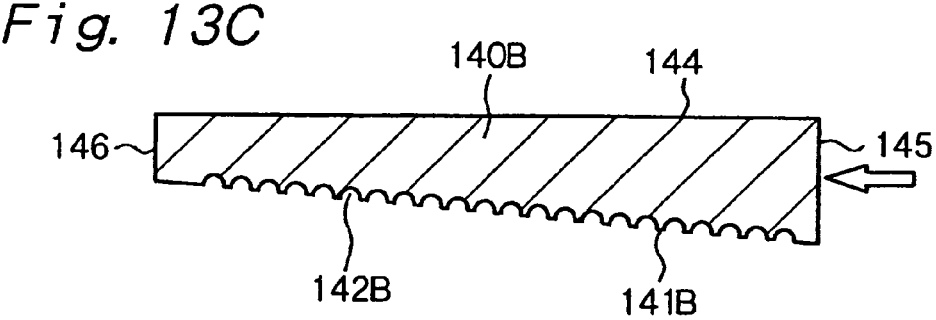
Figure 13D:
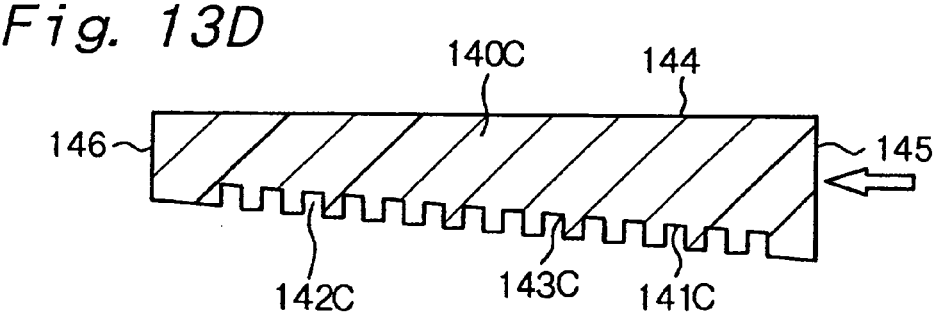
Figure 14:
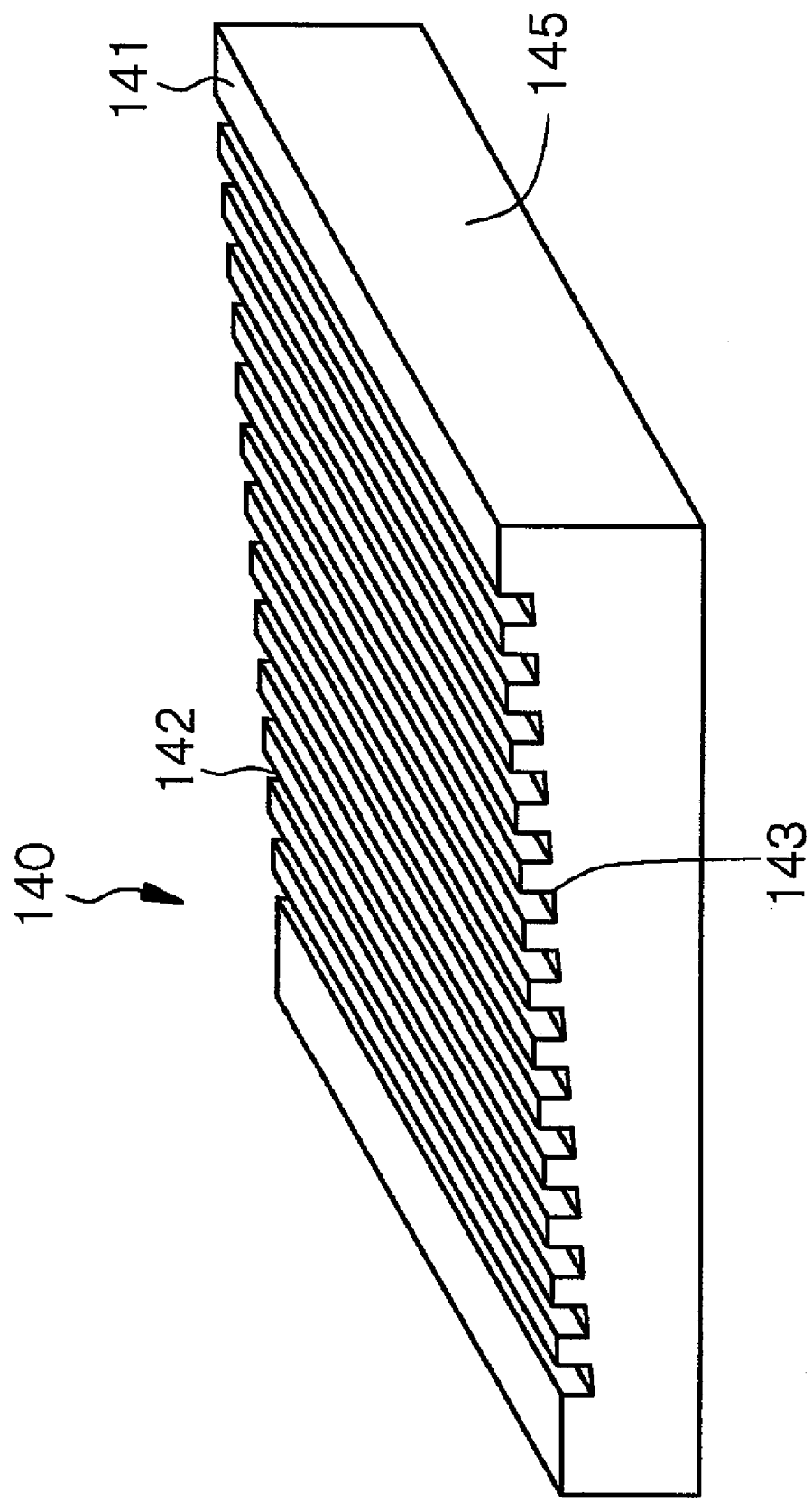
FIG. 14 is a schematic perspective view of the light guide plate shown in the cross-sectional view of FIG. 13A.

The above mold assembly is used to mold a light guide plate (light guiding plate) 140 whose schematic cross-sectional view is shown in FIG. 13A and whose schematic perspective view is shown in FIG. 14. The light guide plate 140 has a first main surface 141 and a nearly flat second main surface 144 opposite to the first main surface 141. In Example 6, the surface portion of the first main surface has concave portions 142 having a depth (D) of 5 µm and a pitch of 200 µm. And, the concave portions 142 of at least 80% of the total concave portions 142 provided in the surface portion of the first main surface 141 have bottom portions 143 having a radius of curvature of $2 \times 10^{-6}$ m or less. Otherwise, the surface of the concave portion 142 provided in the surface portion of the first main surface 141 has a surface roughness $R_z$ of 0.3 µm or less. Each concave portion 142 provided in the surface portion of the first main surface 141 comprises a continuous concave extending along a direction making a predetermined angle (specifically, a direction nearly at right angles) with the direction of incidence of light into the light guide plate 140 (a direction indicated by outlined arrows in FIGS. 13A to 13D). That is, when the light guide plate 140 is cut with an imaginary plane that is in the direction of incidence of light into the light guide plate 140 and perpendicular to the first main surface 141, the concave portions 142 have the cross-sectional form of trapezoids. The bottom portion 143 of the concave portion 142 corresponds to edge lines defined by the bottom surface and the two side walls of the concave portion 142. The light guide plate 140 as a whole has the form of a wedge-shaped truncated quadrangular pyramid, and opposite two side walls of the truncated quadrangular pyramid correspond to the first main surface 141 and the second main surface 144. Light enters the light guide plate 140 through a side wall (large-thickness end portion 145) corresponding to the bottom surface of the truncated quadrangular pyramid, and exits from the first main surface 141 and the second main surface 144. In Example 6, the large-thickness portion 145 had a thickness of 1.2 mm, a side wall (small-thickness end portion 146) corresponding to a top surface of the truncated quadrangular pyramid had a thickness of 1.0 mm, and the light guide plate 140 had a width of 40 mm and a length of 60 mm. The "width" refers to a length measured in the direction in parallel with the concave portions 142 (in the direction perpendicular to the paper surface of the drawing).

Figure 11B:
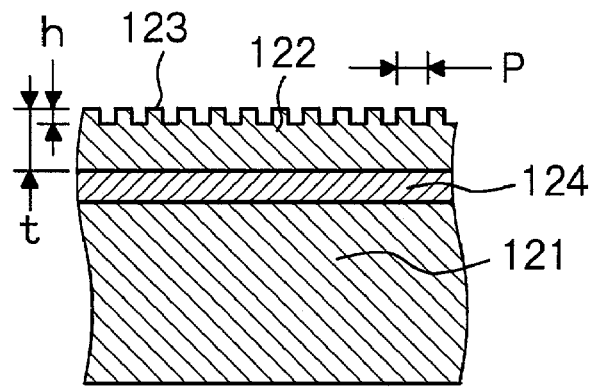
Figure 11C:
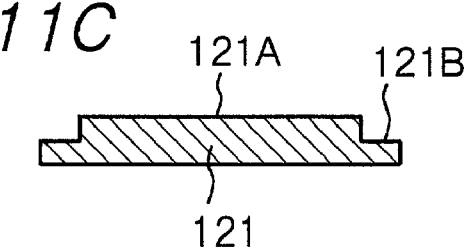
Figure 12B:
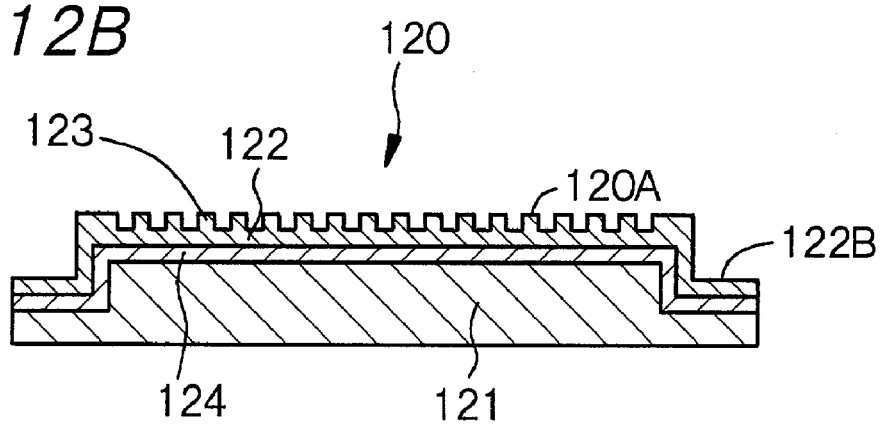

FIG. 12B shows an enlarged cross-sectional view of the insert block 120 (thickness 3.0 mm), and FIG. 11B shows an enlarged schematic partial cross-sectional view thereof. The insert block 120 is used for forming (molding) the first main surface 141 of the above light guide plate 140 and has an insert block body 121 made of partially stabilized zirconia ceramics (partially stabilized zirconium oxide, $ZrO_2$) containing yttrialite ($Y_2O_3$) as a partially stabilizing agent and a metal layer 122 formed on the surface of the insert block body 121 which surface faces the cavity 12 and provided with convex portions 123 for forming the concave portions 142 of the light guide plate 140. FIG. 11C shows a schematic cross-sectional view of the insert block body 121. The content of the partially stabilizing agent in the partially stabilized zirconia ceramics having a composition of $ZrO_2$—$Y_2O_3$ was 3 mol %. The convex portions 123 formed in the metal layer 122 have a height h of 5 µm and a pitch of 200 µm and have the form of a trapezoid. Each convex portion 123 formed in the metal layer 122 comprises a continuous convex extending along a direction making a predetermined angle with the direction of incidence of light into the light guide plate (specifically, a direction nearly at right angles), and further, they have a form complementary to the concave portions 142 formed in the first main surface 141 of the insert block 140. The portion where the above convex portions 123 are formed corresponds to a cavity surface 120A of the insert block 120. The surface of the convex portion 123 formed in the metal layer 122 (more specifically, the top surface and the two side walls of the trapezoid) had a surface roughness $R_z$ of 0.2 µm or less (specifically, $R_z$=0.01 µm on average).

The metal layer 122 is made of two layers, one is a 5 µm thick Ni layer formed by electric plating and the other is a 100 µm thick Ni compound layer formed thereon (Ni—P layer formed by electroless plating). That is, the metal layer 122 has a thickness t of 105 µm. The drawings show the metal layer 122 as a single layer. That surface of the insert block body 121 which faces the cavity 12 has a surface roughness $R_z$ of 0.5 µm. Further, a 10 µm thick activated metal layer 124 made of a Ti—Cu—Ag eutectic composition is formed between the insert block body 121 and the metal layer 122. The activated metal layer 124 is formed by an activated metal soldering method.

A metal layer 122B having a flat surface (see FIG. 12B) is formed on the surface of that portion of the insert block body 121 which faces the cover plate 13 in a state where the first mold member 10 and the second mold member 11 are clamped. The metal layer 122B is formed concurrently with the metal layer 122, and the activated metal layer 124 is present under the metal layer 122B.

Specifically, a mixture of a zirconia powder and an yttrialite powder was press-molded and then calcined or sintered to prepare the insert block body 121 (see the cross-sectional view of FIG. 11C). Then, that surface (to be referred to as "surface 121A") of the insert block body 121 which faces the cavity 12 and the surface (to be referred to as "surface 121B") of the insert block body 121 which faces the cover plate 13 were polished and finished with a diamond grinder, so that these surfaces 121A and 121B had a surface roughness $R_z$ of 0.5 µm. Then, an activated metal layer 124 was formed on the above surfaces 121A and 121B of the insert block body 121 by an activated metal soldering method. Specifically, a paste prepared from a Ti—Cu—Ag eutectic composition was applied to the above surfaces 121A and 121B of the insert block body 121, and the applied paste was baked at a high temperature of approximately 800° C. in vacuum, to form the activated metal layer 124. Then, a portion where the activated metal layer 124 was not formed in the insert block body 121 was masked, and a nickel layer was formed by an electric plating method. Further, an Ni—P layer was formed thereon by an electroless plating method. Then, the Ni—P layer was machined using a diamond tool having concavo-convex portions, to form the convex portions 123 in the metal layer 122.

The first mold member (movable mold member) 10 was fabricated from a carbon steel S55C and cut to form an insert-block-fitting portion. The metal layer 122B formed on the surface 121B was cut with a metal-working surface cutting machine. And, the insert block 120 was fit to the insert-block-fitting portion, the end surfaces of the insert block 120 were covered with the cover plate 13, and the cover plate 13 was fixed to the first mold member 10 with the bolts 14.

Further, the second mold member (fixed mold member) 11 was fabricated from a carbon steel S55C and cut to form an insert-block-fitting portion. And, a second insert block 30 was fixed to the insert-block-fitting portion with an adhesive. The second insert block 30 has the same constitution as that of the insert block 120 except that the second insert block 30 has a flat surface and a different thickness. Further, the second insert block 30 can be prepared by the same method as that applied to the preparation of the insert block 120, and a metal layer 31 is formed on the surface of the second insert block 30. The metal layer 31 has a surface roughness $R_z$ of 0.01 µm.

The thus-fabricated first mold member (movable mold member) 10 and the second mold member (fixed mold member) 11 were assembled to obtain the mold assembly of Example 6. In a state where the first mold member 10 and the second mold member 11 were clamped, the insert block 120 and the cover plate 13 had a clearance $C_{21}$ of 0.001 mm, and the overlap amount $\Delta S_{21}$ of the cover plate 13 relative to the insert block 120 was 2.0 mm. Further, the second insert block 30 and the cover plate 13 also had a clearance $C_{43}$ of 0.001 mm, and the overlap amount $\Delta S_{43}$ of the cover plate 13 relative to the second insert block 30 was 2.0 mm. In the above structure, the end portions of the insert block 120 and the second insert block 30 come to be free from contact to a molten transparent resin introduced into the cavity 12.

The thus-completed mold assembly was attached to a molding machine, and the mold assembly was heated to 130° C. and rapidly cooled to 40° C. with a mold temperature regulator. Even in this case, however, none of the insert block 120 and the second insert block 30 suffered any damage or breaking such as cracking. Further, no damage or breaking occurred in the metal layers 122 and 31.

The same injection molding machine as that in Example 1 was used. The same polycarbonate resin as that in Example 1 was used as a transparent resin and injection-molded under the condition shown in Table 1 in Example 1. The molten polycarbonate resin was introduced (injected) into the cavity 12 through the molten resin injection portion (having a side gate structure). After a predetermined amount of the molten polycarbonate resin was introduced (injected) into the cavity 12 through the molten resin injection portion, the polycarbonate resin in the cavity 12 was cooled to solidness, and after 30 seconds, the mold assembly was opened, and the light guide plate 140 was taken out of the mold assembly.

The concave portions 142 of the obtained light guide plate 140 were observed through a laser microscope (3000 magnifications) and photographs thereof were taken. The bottom portions 143 of the concave portions 142 formed in the surface portion of the first main surface 141 were measured for radius of curvature on the basis of the photographs, to show that the concave portions 142 of 96% of the total concave portions 142 had the bottom portions 143 having a radius of curvature of $2 \times 10^{-6}$ m or less. Further, brightness measurement in a measurement range having a diameter of 10 mm was conducted in nine places in the same manner as in Example 1. The measurement results showed that the value of brightness minimum value/brightness maximum value was 0.93. Further, when the concave portions (indicated by an arrow "A" in FIG. 13A) formed in the surface portion of the first main surface which surface portion was positioned near the side wall (large-thickness portion 145) corresponding to the bottom surface of the truncated quadrangular pyramid had an average depth of $D_1$, and when the concave portions (indicated by an arrow "B" in FIG. 13A) formed in the surface portion of the first main surface which surface portion was positioned near the side wall (small-thickness portion 146) corresponding to the top surface of the truncated quadrangular pyramid had an average depth of $D_2$, the ratio of $D_2/D_1$ was at least 0.8 (specifically, it was 0.98). In Examples to be described later, the average depth of $D_1$ and the average depth of $D_2$ were obtained in the above portions.

Further, the surfaces of the concave portions 142 formed in the surface portion of the first main surface 141 (more specifically, the bottom surface and the two side walls of each concave portion 142) were measured for a surface roughness $R_z$, to show that all of the concave portions 142 had a surface roughness $R_z$ of 0.3 µm or less (specifically, approximately 0.02 µm on average).

FIG. 13A shows a schematic cross-sectional view of the thus-obtained light guide plate 140. The edge-type/backlight-type area light apparatus of Example 6 to which the light guide plate 140 is incorporated has the same structure as that shown in the conceptual view of FIG. 3B. The edge-type/front-light-type area light apparatus of Example 6 to which the light guide plate 140 is incorporated has the same structure as that shown in the conceptual view of FIG. 3C.

Further, the insert block 140 can be fabricated from the same material by the same method as those explained in Example 2 or 3. Further, the light guide plate 140 can be molded not only by the molding method explained in Example 1, but also by the molding method explained in Example 4.

Figure 15:
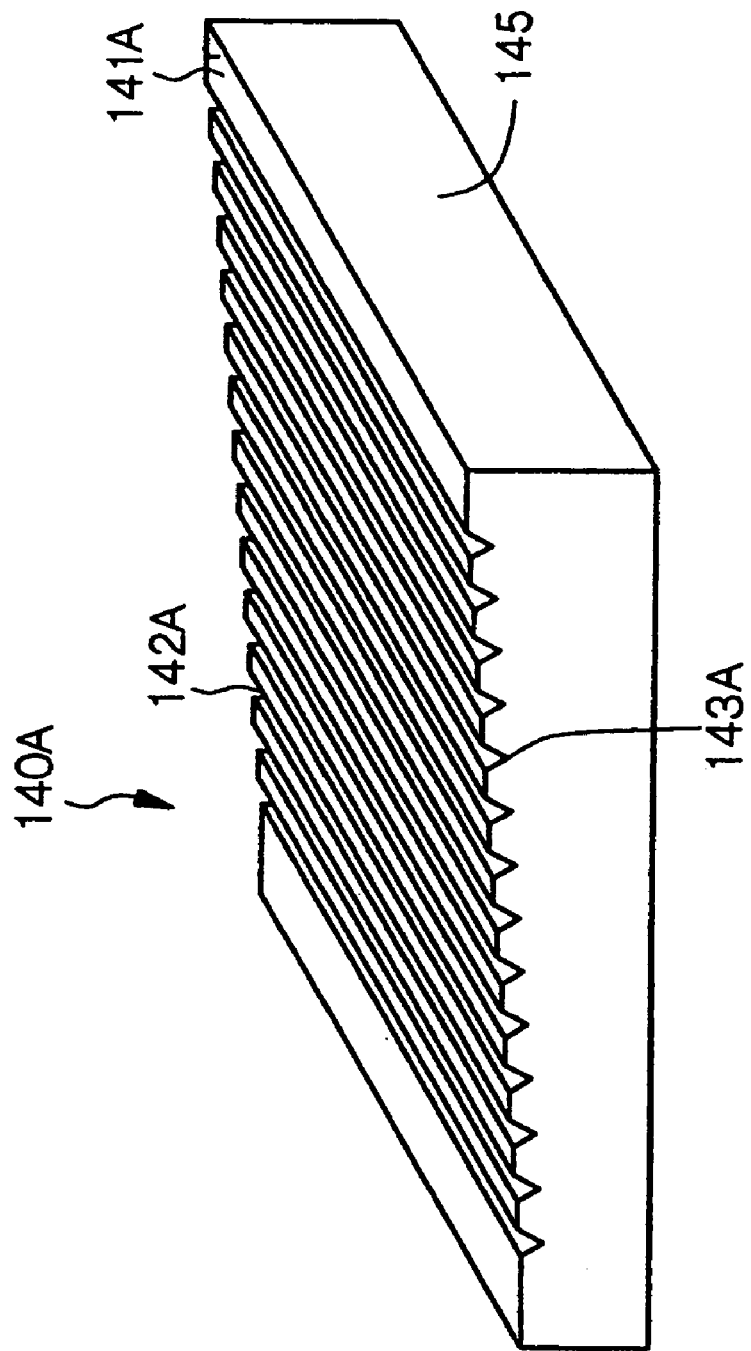
FIG. 15 is a schematic perspective view of the light guide plate shown in the cross-sectional view of FIG. 13B.

The cross-sectional form of the concave portion obtained when the light guide plate is cut with an imaginary plane that is in the direction of incidence of light into the light guide plate and is perpendicular to the first main surface shall not be limited to the form of a trapezoid. FIG. 13B shows a schematic cross-sectional view of a light guide plate when the cross-sectional form of each concave portion 142A, obtained by cutting the light guide plate with an imaginary plane that is in the direction of incidence of light into the light guide plate 140A and is perpendicular to the first main surface 141A, is triangular, and FIG. 15 shows a schematic perspective view thereof. In this case, a bottom edge line of the concave portion 142A corresponds to the bottom portion 143A of the concave portions 142A. This light guide plate 140A is concerned with the second or fourth aspect of the present invention.

FIG. 13C shows a schematic cross-sectional view of a light guide plate 140B in which each concave portion 142B formed in the surface portion of the first main surface 141B comprises discontinuous concaves arranged in a direction making a predetermined angle with the direction of incidence of light into the light guide plate 140B (specifically, a direction nearly at right angles). The discontinuous concave has a nearly semi-spherical form. The light guide plate 140B has substantially the same schematic plan view as that shown in FIG. 9 except that reference numerals are different. The above light guide plate 140B is concerned with the fourth aspect of the present invention. In this case, the surface roughness is measured as the surface roughness $R_r$.

FIG. 13D shows a schematic cross-sectional view of a light guide plate 140C in which each concave portion 142C formed in the surface portion of the first main surface 141C comprises discontinuous concaves arranged in a direction making a predetermined angle with the direction of incidence of light into the light guide plate 140C (specifically, a direction nearly at right angles). The discontinuous concave has a column form. The light guide plate 140C has substantially the same schematic plan view as that shown in FIG. 10 except that reference numerals are different. An edge line portion defined by the bottom surface and the side wall of the concave portion 142C corresponds to the bottom portion 143C of the concave portion 142C. The above light guide plate 140C is concerned with the second or fourth aspect of the present invention. In this case, the surface roughness is measured as the surface roughness $R_z$.

While the present invention has been explained with reference to preferred embodiments hereinabove, the present invention shall not be limited thereto. The structures of the mold assemblies in Examples, the transparent resin used, the condition for the injection molding, the constitutions and structures of the insert blocks and the second insert blocks, and constitutions and structures of the light guide plates are examples, and can be altered as required.

Figure 16:
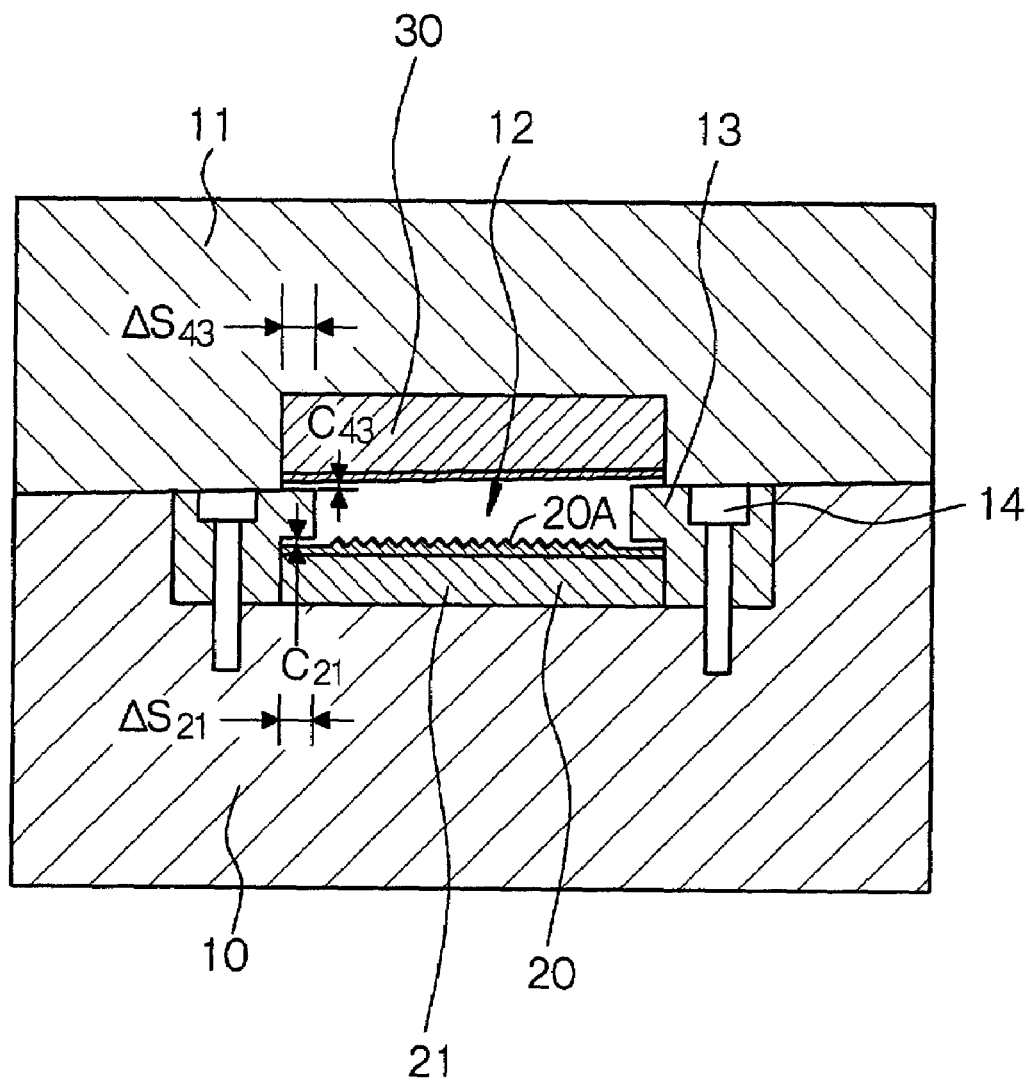
FIG. 16 is a schematic cross-sectional view of a variant of the mold assembly in Example 1.

For example, as shown in the schematic cross-sectional view of FIG. 16, the insert block body 21 of the insert block 20 can have a nearly flat plate.

Figure 17A:
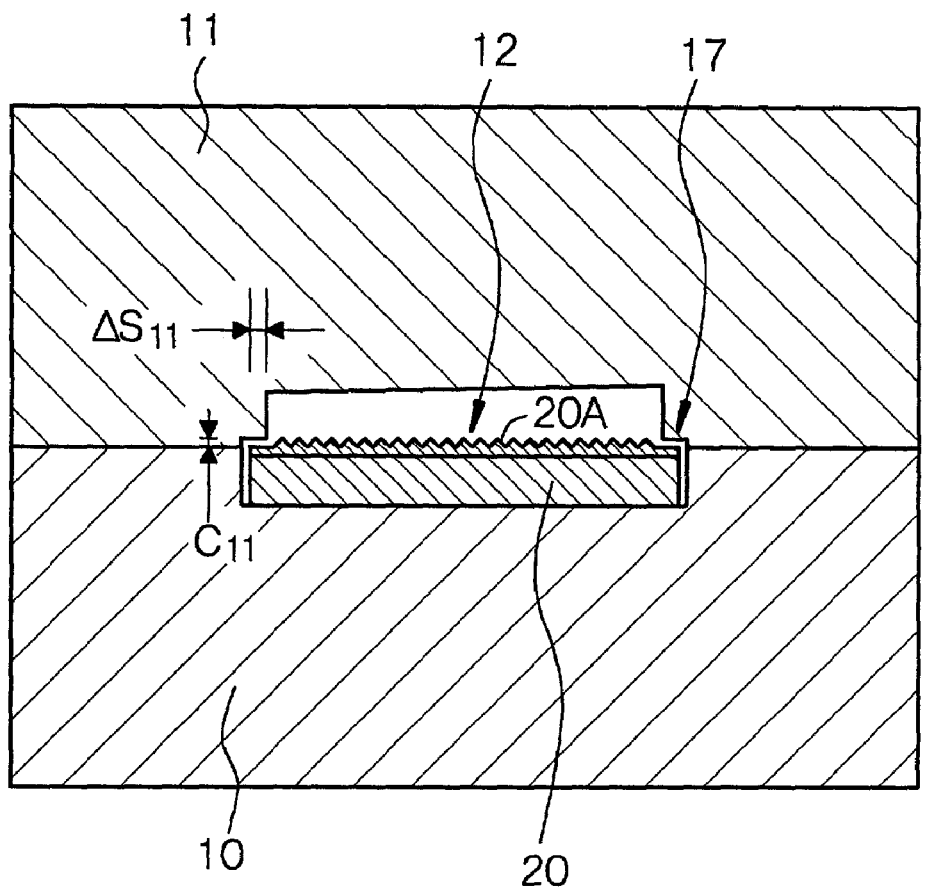
FIGS. 17A and 17B are a cross-sectional view of the first structure of the mold assembly, etc., and an enlarged cross-sectional view of an insert block, respectively.
Figure 17B:
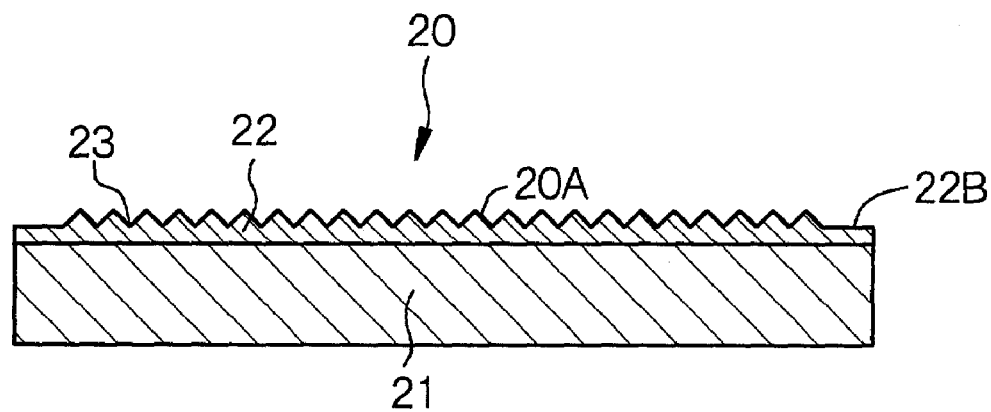

Further, as FIG. 17A shows a mold-clamped state as a schematic cross-sectional view and as FIG. 17B shows a schematic enlarged cross-sectional view of an insert block 20, there may be employed a structure (first structure of a mold assembly, etc.) in which a metal layer 22B having a flat surface is formed in the surface of that portion of an insert block body 21 which faces the second mold member 11 in a state where the first mold member 10 and the second mold member 11 are clamped, and the facing surface of the second mold member 11 which faces the insert block 20 and that portion of the insert block 20 which faces the facing surface of the second mold member 11 have a clearance $C_{11}$ of 0.03 mm or less ($C_{11} \leq 0.03$ mm) in a state where the first mold member 10 and the second mold member 11 are clamped. Concave portions 23 are formed in a desired portion of that surface (cavity surface 20A of the insert block 20) of the insert block 20 which constitutes the cavity, other than the facing surface of the insert block 20. In a state where the first mold member 10 and the second mold member 11 are clamped, preferably, the overlap amount $\Delta S_{11}$ of the facing surface of the second mold member 11 relative to the insert block 20 is at least 0.5 mm. The facing surface of the second mold member 11 is a kind of a notch (cutout) provided in the surface of the second mold member 11 which surface faces the facing surface of the insert block 20. It may be an extending portion, etc., of parting surface of the second mold member 11.

Alternatively, there may be employed a structure (third structure of a mold assembly, etc.) in which there is further provided a cover plate 13 that is attached to the first or second mold member 10 or 11, partly constitutes the cavity 12 and covers part of end surface of the insert block 20; a metal layer 22B having a flat surface is formed in the surface of that portion of the insert block body 21 which faces the cover plate 13 in a state where the first mold member 10 and the second mold member 11 are clamped, and the metal layer 22B is further formed in the surface of that portion of the insert block body 21 which faces the second mold member 11; the facing surface of the second mold member 11 which faces the insert block 20 and that portion of the insert block 20 which faces the facing surface of the second mold member 11 have a clearance $C_{31}$ of 0.03 mm or less ($C_{31} \leq 0.03$ mm), the overlap amount $\Delta S_{31}$ of the facing surface of the second mold member 11 relative to the insert block 20 is at least 0.5 mm ($\Delta S_{31} \geq 0.5$ mm), the insert block 20 and the cover plate 13 have a clearance $C_{31}$ of 0.03 mm or less ($C_{32} \leq 0.03$ mm), and the overlap amount $\Delta S_{32}$ of the cover plate relative to the insert block 20 is at least 0.5 mm ($\Delta S_{32} \geq 0.5$ mm) in a state where the first mold member 10 and the second mold member 11 are clamped. The mold assembly in the third structure of the mold assembly, etc., substantially has a cross section prepared by combining, for example, the cross section shown in FIG. 1 or 16 and for example, the cross section shown in FIG. 17.

Figure 18:
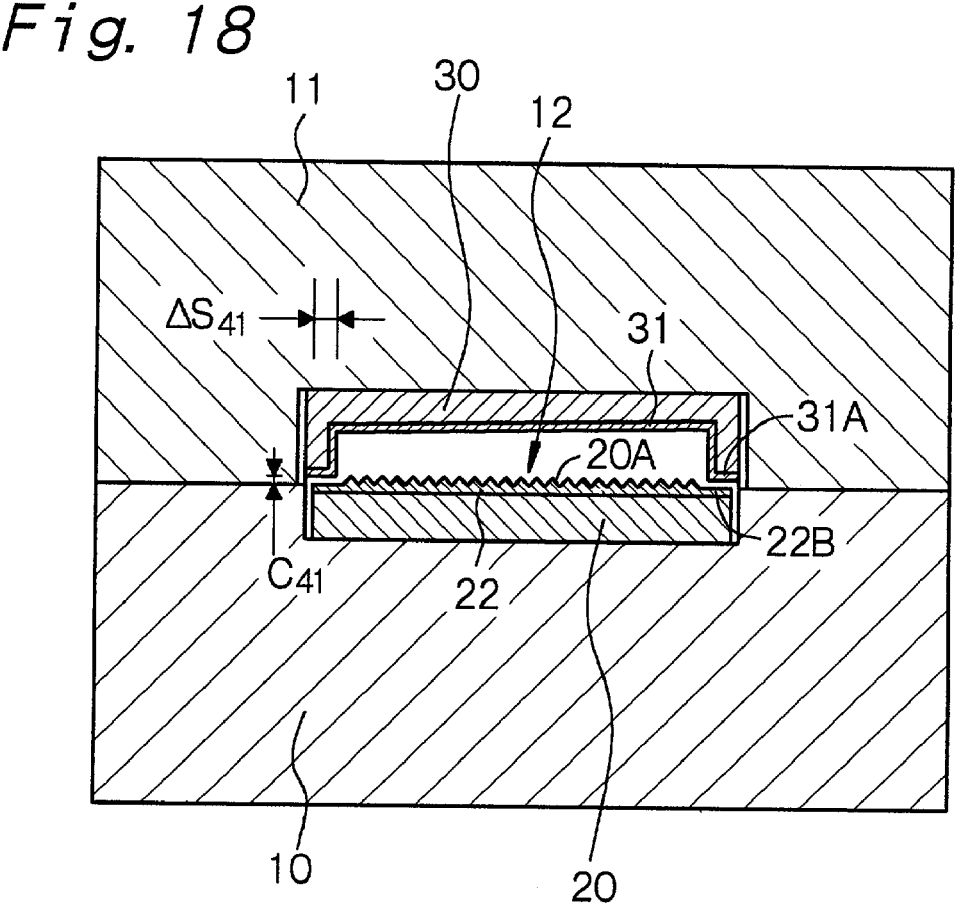
FIG. 18 is a cross-sectional view of the fourth structure of the mold assembly, etc.

As is shown in the schematic cross-sectional view of FIG. 18, there may be also employed a structure (fourth structure of a mold assembly, etc.) in which a metal layer 22B having a flat surface is formed in the surface of that portion of the insert block 20 which faces the second insert block 30 in a state where the first mold member 10 and the second mold member 11 are clamped; a metal layer 31 having a flat and smooth surface is formed in the surface of that portion of the second insert block 30 which faces the insert block 20 in a state where the first mold member 10 and the second mold member 11 are clamped; and that portion of the insert block 20 which faces the second insert block 30 and that portion of the second insert block 30 which faces the insert block 20 have a clearance $C_{41}$ of 0.03 mm or less ($C_{41} \leq 0.03$ mm) in a state where the first mold member 10 and the second mold member 11 are clamped. In a state where the first mold member 10 and the second mold member 11 are clamped, preferably, the overlap amount $\Delta S_{41}$ of that portion of the insert block 20 which faces the second insert block 30 relative to that portion of the second insert block 30 which faces the insert block 20 is at least 0.5 mm ($\Delta S_{41} \geq 0.5$ mm).

Figure 19:
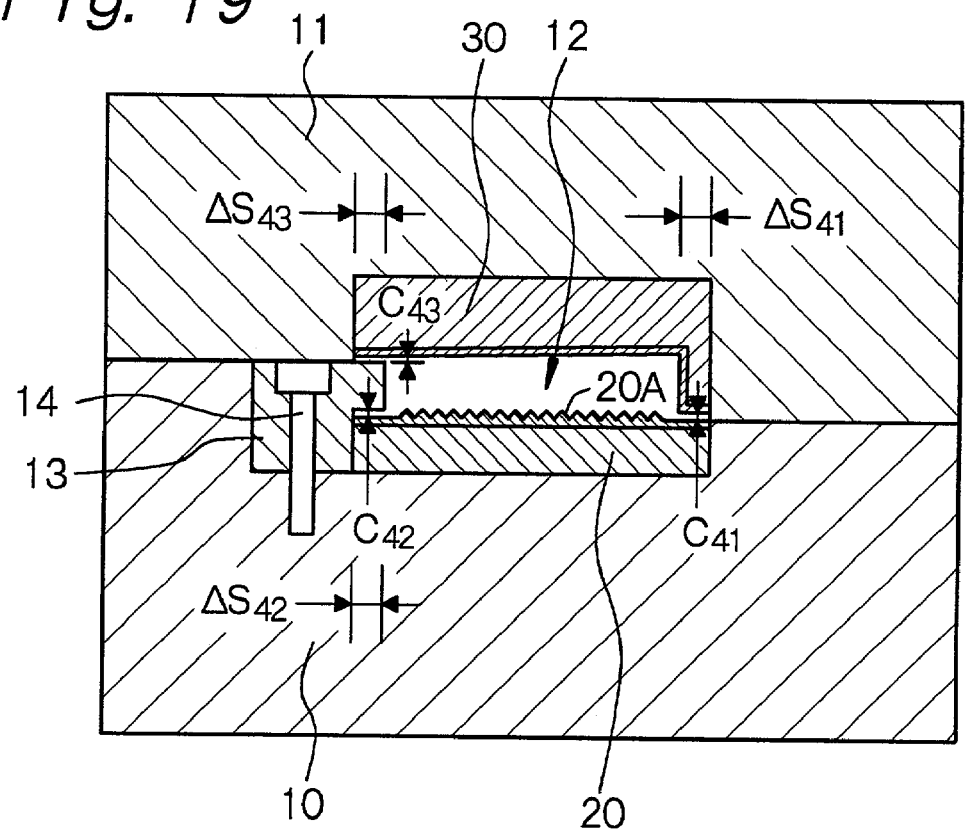
FIG. 19 is a cross-sectional view of a variant of the fourth structure of the mold assembly, etc.

As is shown in the schematic cross-sectional view of FIG. 19, there may be also employed another constitution in which the mold assembly further has a cover plate 13 that is arranged between the insert block 20 and the second insert block 30, is attached to the first mold member 10 and has a molten resin injection portion (not shown). And, there may be employed a constitution in which the clearance $C_{42}$ between the insert block 20 and the cover plate 13 and the clearance $C_{43}$ between the second insert block 30 and the cover plate 13 are 0.03 mm or less ($C_{42}, C_{43} \leq 0.03$. mm), the overlap amount $\Delta S_{42}$ of the cover plate 13 relative to the insert block 20 and the overlap amount $\Delta S_{43}$ of the cover plate 13 relative to the second insert block 30 are at least 0.5 mm ($\Delta S_{42}, \Delta S_{42} \geq 0.5$ mm), and the cover plate 13 overlaps only part of the insert block 20 and part of the second insert block 30.

The above-explained variants of the insert block and the mold assembly can be applied to Examples 1 to 6.

Figure 20A:
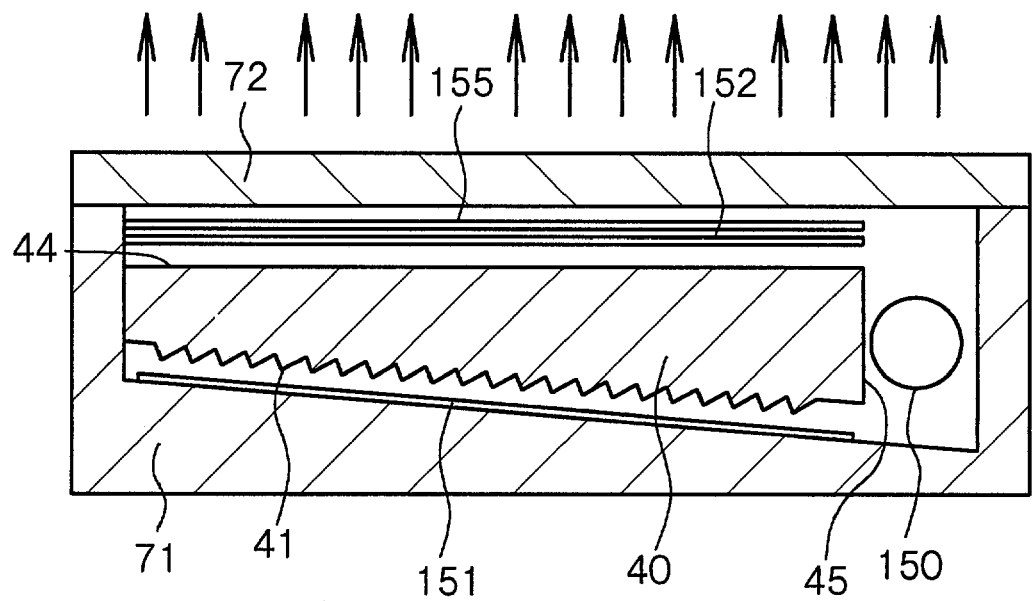
FIGS. 20A and 20B are schematic cross-sectional views of embodiments in which the light guide plate and the area light apparatus of the present invention is applied to a lighting tool in transportation means and a lighting tool typified by a room lamp, respectively.

In Examples, the area light apparatus (surface-emitting light source apparatus) to be incorporated into a liquid crystal display device has been explained. However, the field to which the present invention is applied is not limited to liquid crystal displays. FIG. 20A shows a schematic cross-sectional view of an embodiment in which the light guide plate and the area light apparatus of the present invention is applied, for example, to a lighting tool typified by a light tool of transportation means. In the above lighting tool, a flat-surface reflection plate 151 is fixed to the inner bottom surface of a base 71 made of plastic, and the light guide plate 40 is fixed above. A light source 150 formed, for example, of a light-emitting diode is provided in the side wall of the light guide plate 40 (side wall 45 corresponding to the bottom surface of the truncated quadrangular pyramid). A diffusion sheet 152 and a prism sheet 155 are fixed above the light guide plate 40. The upper portion of the base 71 is covered with a cover 72 made of plastic that transmits light. Light that is emitted from the lighting tool is shown by arrow marks. For example, the second main surface may be provided with a diffusion dot pattern, which obviates the diffusion sheet 152. In the above constitution, a uniform brightness distribution and high brightness can be achieved without providing the light-transmitting cover 72 with concavo-convex portions, and the reflection plate 151 can have a flat form. The light guide plate shall not be limited to the light guide plate explained in Example 1, and the light guide plate explained in any other Example can be employed, and the structure and constitution of the lighting tool are shown as an example.

Figure 20B:
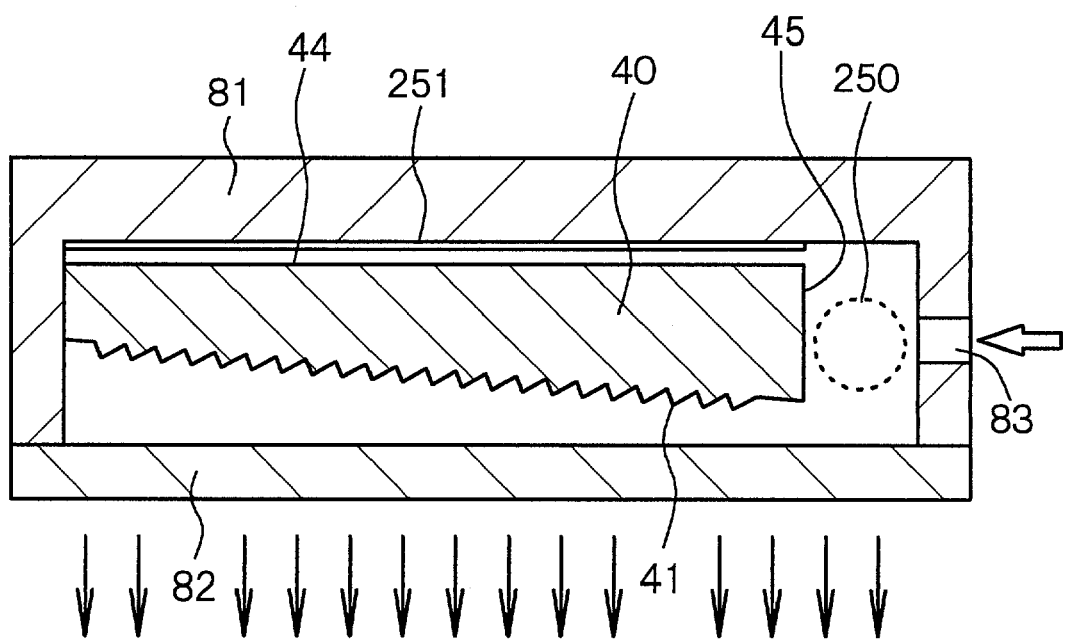
Figure 21A:
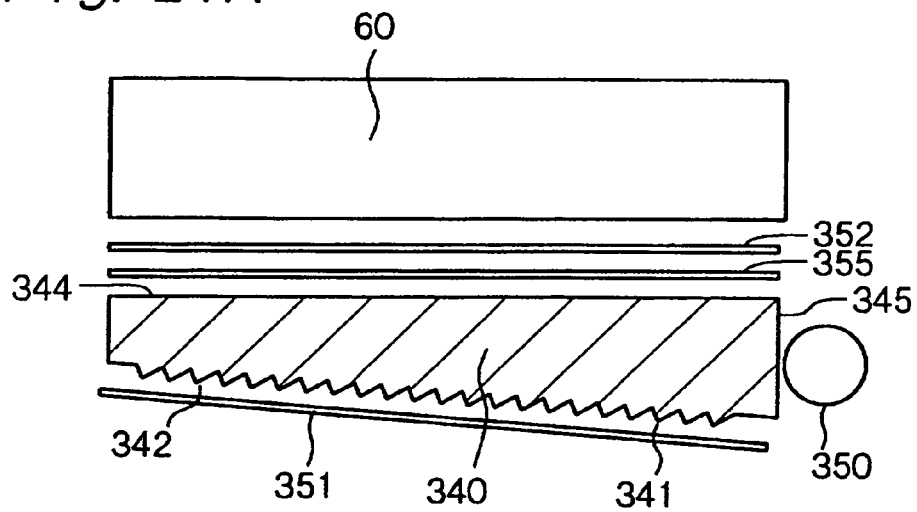
FIGS. 21A and 21B are a conceptual view of a conventional back-light-type area light apparatus and a conceptual view of a conventional front-light-type light apparatus, respectively.
Figure 21B:
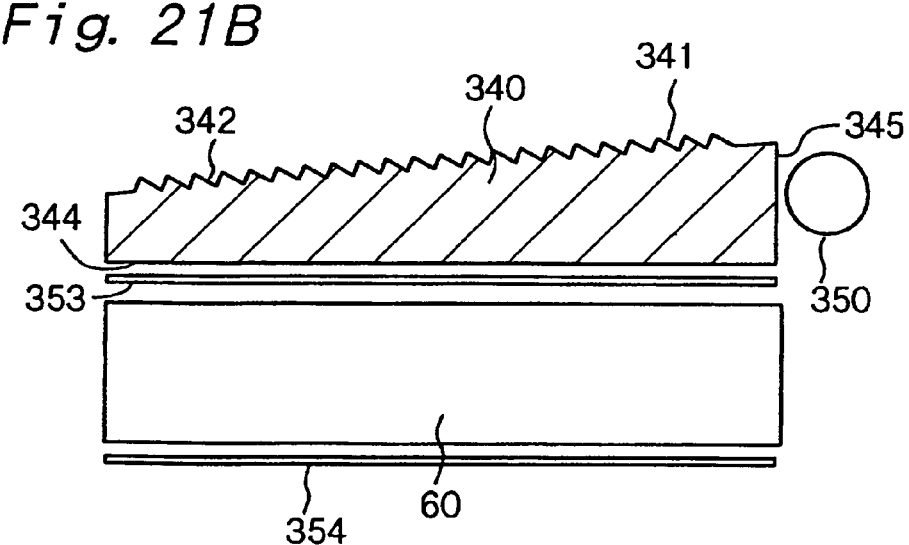

FIG. 20B shows a schematic cross-sectional view of an embodiment in which the light guide plate and the area light apparatus of the present invention is applied, for example, to a lighting tool typified by a room lamp. In the above lighting tool, a flat-surface reflection plate 251 is fixed to an inner bottom surface of a base 81 made of plastic, and the light guide plate 40 is fixed below. A light source 250 formed, for example, a fluorescent lamp is provided in the side wall of the light guide plate 40 (side wall 45 corresponding to the bottom surface of the truncated quadrangular pyramid). The lower portion of the base 81 is covered with a light-transmitting cover 82 made of plastic. Light that is emitted from the lighting tool is shown by arrow marks. In the above constitution, a uniform brightness distribution and high brightness can be achieved without providing the light-transmitting cover 82 with a diffusion pattern or a lens pattern, and further, the reflection plate 251 can have a flat form. There may be employed a constitution in which a through hole 83 is made in a portion of the base 81, one end, for example, of an optical fiber is inserted into the through hole 83 (as shown by the outlined arrow mark in FIG. 20B), and light from a light source or sunlight is introduced into the other end, namely, light emitted from the light source is introduced not only directly into the light guide plate but also introduced indirectly into the light guide plate. Otherwise, both a light source 250 and an optical fiber may be provided. The light source 250 may be removable, or the light source 250 may be movable. The light guide plate shall not be limited to the light guide plate explained in Example 1, and the light guide plate explained in any other Example can be employed, and the structure and constitution of the lighting tool are shown as an example.

In the insert block, the mold assembly or the method of molding the light guide plate made of a transparent resin according to any one of the first to fourth aspects of the present invention, rapid cooling of a molten transparent resin in a cavity can be prevented. As a result, the formation of a solidified layer in the molten transparent resin that comes in contact with the cavity surface of the insert block can be avoided. Further, the convex portions or the concave portions can be easily formed in the metal layer. Therefore, desired concave portions or convex portions can be accurately and reliably formed in the first main surface of the light guide plate.

Further, the continuous operation of molding can be easily carried out, light guide plates are stabilized in quality, and the operation of molding for a long period of time can be carried out. Further, the appearance of the light guide plate is no longer impaired, the occurrence of burrs on the end portion of the light guide plate can be prevented, the rejection rate of light guide plates can be decreased, the formation of uniform light guide plates and high-quality light guide plates can be accomplished, and the production cost of the light guide plates can be decreased.

Further, the metal layer in the facing surface of the insert block can be easily machined, the fitting of the insert block to the mold portion can be relatively easily adjusted, and the fabrication cost of the mold assembly can be decreased. Further, the occurrence of damage in an end or edge portion of the insert block can be reliably prevented, and the insert block can be used for the operation of molding for a long period of time. That is, in the mold assembly of the present invention, the insert block can be easily incorporated into the mold while the clearance (C) and the overlap amount ($\Delta S$) are in the predetermined ranges, the insert block is free from breaking even if the operation of molding is carried out for a long period of time, and light guide plates having an excellent appearance can be molded easily at a low cost.

Further, since a molten transparent resin in the cavity is improved in flowability, the pressure for introducing the molten transparent resin into the cavity can be set at a low level, so that a residual stress in the light guide plate can be alleviated and that the light guide plate is accordingly improved in quality. Further, since the introduction pressure can be decreased, the thickness of the mold portion can be decreased, the molding apparatus can be decreased in size, and the production cost of the light guide plate can be decreased.

When the area light apparatus of the present invention is incorporated into a liquid crystal display, there can be obtained a liquid crystal display that makes a remarkably bright display, and the power consumption can be decreased. When the light guide plate or the area light apparatus of the present invention is applied, for example, to a lighting tool typified by a light tool of transportation means, a uniform brightness distribution and high brightness can be achieved without providing a light-transmitting member of a light-emitting lighting tool with any concavo-convex portion, and at the same time, the reflection member (reflector) can be formed in a flat form, so that the volume of the lighting tool can be decreased. As a result, the limitation imposed on a site where the lighting tool is to be placed can be decreased. Further, when a fluorescent tube or a light-emitting diode is used as a light source, the electric power can be decreased, the energy can be saved, and light from the light source can be effectively used. In a lighting tool typified by a room lamp, or in a basement or underpass not exposed to sunlight, light from a light source (for example, fluorescent lamp) can be efficiently used, and the number of light sources can be decreased, so that the energy saving can be accomplished. Further, when natural light is used as a light source, the energy saving can be further accomplished.

What is claimed is:

1. A light guide plate which is made of a transparent resin, said light guide plate comprising:
 a first main surface; and
 a second main surface opposite to said first main surface,
 wherein said first main surface has a surface portion provided with convex portions having a height of $5 \times 10^{-7}$ m to $6 \times 10^{-5}$ m each and a pitch of $5 \times 10^{-7}$ m to $4 \times 10^{-4}$ m,
 wherein each convex portion has a tip portion, and
 wherein the tip portions of at least 80% of the total convex portions have a radius of curvature of $2 \times 10^{-6}$ m or less.

2. The light guide plate according to claim 1, wherein a value of a minimum brightness value/maximum brightness value obtained as a result of a brightness measurement of a plurality of parts of the surface portion provided with the convex portions in the first main surface satisfies at least 0.65.

3. The light guide plate according to claim 1, wherein a surface portion of the second main surface is a substantially planar surface.

4. The light guide plate according to claim 1, wherein the transparent resin is a polycarbonate resin and the light guide plate is manufactured by injection molding, and wherein each convex portion provided in the surface portion of the first main surface comprises a straight and continuous convex extending along a direction making a predetermined angle with a direction of incidence of light into the light guide plate.

5. The light guide plate according to claim 1, wherein the transparent resin is a polycarbonate resin and the light guide plate is manufactured by injection molding, and
wherein each convex portion provided in the surface portion of the first main surface comprises discontinuous convexes arranged on an imaginary straight line and along a direction making a predetermined angle with a direction of incidence of light into the light guide plate.

6. The light guide plate according to claim 1, wherein the light guide plate has a form of a wedge-shaped truncated quadrangular pyramid,
wherein opposite side walls of the truncated quadrangular pyramid correspond to the first main surface and the second main surface,
wherein light enters through a side wall corresponding to a bottom surface of the truncated quadrangular pyramid, and
wherein the light exits from at least one of the first main surface and the second main surface.

7. The light guide plate according to claim 6, wherein an $H_2/H_1$ ratio of at least 0.8 is satisfied, in which $H_1$ is an average height of the convex portion provided in the surface portion of the first main surface positioned near the side wall corresponding to the bottom surface of the truncated quadrangular pyramid, and $H_2$ is an average height of the convex portion provided in the surface portion of the first main surface positioned near the side wall corresponding to the top surface of the truncated quadrangular pyramid.

8. An area light apparatus comprising:
(a) a light guide plate which is made of a transparent resin and has a first main surface, and a second main surface opposite to said first main surface, said first main surface having a surface portion provided with convex portions having a height of $5\times10^{-7}$ m to $6\times10^{-5}$ m each and a pitch of $5\times10^{-7}$ m to $4\times10^{-4}$ m, each convex portion having a tip portion, and the tip portions of at least 80% of the total convex portions having a radius of curvature of $2\times10^{-6}$ m or less; and
(b) a light source,
wherein the light guide plate has a form of a wedge-shaped truncated quadrangular pyramid,
wherein opposite side walls of the truncated quadrangular pyramid correspond to said first main surface and said second main surface,
wherein light emitted from the light source enters through a side wall corresponding to a bottom surface of the truncated quadrangular pyramid of the light guide plate, and
wherein the light exits from at least one of said first main surface and said second main surface of the light guide plate.

9. The area light apparatus according to claim 8, wherein a value of a minimum brightness value/maximum brightness value obtained as a result of a brightness measurement of a plurality of parts of the surface portion provided with the convex portions in the first main surface satisfies at least 0.65.

10. The area light apparatus according to claim 8, wherein a surface portion of the second main surface is a substantially planar surface.

11. The area light apparatus according to claim 8, wherein the transparent resin is a polycarbonate resin and the light guide plate is manufactured by injection molding, and
wherein each convex portion provided in the surface portion of the first main surface comprises a straight and continuous convex extending along a direction making a predetermined angle with a direction of incidence of light into the light guide plate.

12. The area light apparatus according to claim 8, wherein the transparent resin is a polycarbonate resin and the light guide plate is manufactured by injection molding, and
wherein each convex portion provided in the surface portion of the first main surface comprises discontinuous convexes arranged on an imaginary straight line and along a direction making a predetermined angle with a direction of incidence of light into the light guide plate.

13. The area light apparatus according to claim 8, wherein an $H_2/H_1$ ratio of at least 0.8 is satisfied, in which $H_1$ is an average height of the convex portion provided in the surface portion of the first main surface positioned near the side wall corresponding to the bottom surface of the truncated quadrangular pyramid, and $H_2$ is an average height of the convex portion provided in the surface portion of the first main surface positioned near the side wall corresponding to the top surface of the truncated quadrangular pyramid.

14. A light guide plate which is made of a transparent resin, said light guide plate comprising:
a first main surface; and
a second main surface opposite to said first main surface,
wherein said first main surface has a surface portion provided with concave portions having a depth of $5\times10^{-7}$ m to $6\times10^{-5}$ m each and a pitch of $5\times10^{-7}$ m to $4\times10^{-4}$ m,
wherein each concave portion has a bottom portion, and
wherein the bottom portions of at least 80% of the total concave portions have a radius of curvature of $2\times10^{-6}$ m or less.

15. The light guide plate according to claim 14, wherein a value of a minimum brightness value/maximum brightness value obtained as a result of a brightness measurement of a plurality of parts of the surface portion provided with the convex portions in the first main surface satisfies at least 0.65.

16. The light guide plate according to claim 14, wherein a surface portion of the second main surface is a substantially planar surface.

17. The light guide plate according to claim 14, wherein the transparent resin is a polycarbonate resin and the light guide plate is manufactured by injection molding, and
wherein each concave portion provided in the surface portion of the first main surface comprises a straight and continuous concave extending along a direction making a predetermined angle with a direction of incidence of light into the light guide plate.

18. The light guide plate according to claim 14, wherein the transparent resin is a polycarbonate resin and the light guide plate is manufactured by injection molding, and
wherein each concave portion provided in the surface portion of the first main surface comprises discontinuous concaves arranged on an imaginary straight line and along a direction making a predetermined angle with a direction of incidence of light into the light guide plate.

19. The light guide plate according to claim 14, wherein the light guide plate has a form of a wedge-shaped truncated quadrangular pyramid, wherein opposite side walls of the truncated quadrangular pyramid correspond to said first main surface and said second main surface, wherein light enters through a side wall corresponding to a bottom surface of the truncated quadrangular pyramid, and wherein the light exits from at least one of said first main surface and said second main surface.

20. The light guide plate according to claim 19, wherein an $D_2/D_1$ ratio of at least 0.8 is satisfied, in which $D_1$ is an average depth of the concave portion provided in the surface portion of the first main surface positioned near the side wall corresponding to the bottom surface of the truncated quadrangular pyramid, and $D_2$ is an average depth of the concave portion provided in the surface portion of the first main surface positioned near the side wall corresponding to the top surface of the truncated quadrangular pyramid.

21. A light guide plate which is made of a transparent resin, said light guide plate comprising:

a first main surface; and a second main surface opposite to said first main surface, wherein said first main surface has a surface portion provided with convex portions having a height of $5 \times 10^{-7}$ m to $6 \times 10^{-5}$ m each and a pitch of $5 \times 10^{-7}$ m to $4 \times 10^{-4}$ m, and wherein each convex portion has a surface roughness of 0.3 μm or less.

22. The light guide plate according to claim 21, wherein a value of a minimum brightness value/maximum brightness value obtained as a result of a brightness measurement of a plurality of parts of the surface portion provided with the convex portions in the first main surface satisfies at least 0.65.

23. The light guide plate according to claim 21, wherein a surface portion of the second main surface is a substantially planar surface.

24. The light guide plate according to claim 21, wherein the transparent resin is a polycarbonate resin and the light guide plate is manufactured by injection molding, and wherein each convex portion provided in the surface portion of the first main surface comprises a straight and continuous convex extending along a direction making a predetermined angle with a direction of incidence of light into the light guide plate.

25. The light guide plate according to claim 21, wherein the transparent resin is a polycarbonate resin and the light guide plate is manufactured by injection molding, and wherein each convex portion provided in the surface portion of the first main surface comprises discontinuous convexes arranged on an imaginary straight line and along a direction making a predetermined angle with a direction of incidence of light into the light guide plate.

26. The light guide plate according to claim 21, wherein the light guide plate has a form of a wedge-shaped truncated quadrangular pyramid, wherein opposite side walls of the truncated quadrangular pyramid correspond to the first main surface and the second main surface, wherein light enters through a side wall corresponding to a bottom surface of the truncated quadrangular pyramid, and wherein the light exits from at least one of the first main surface and the second main surface.

27. The light guide plate according to claim 26, wherein an $H_2/H_1$ ratio of at least 0.8 is satisfied, in which $H_1$ is an average height of the convex portion provided in the surface portion of the first main surface positioned near the side wall corresponding to the bottom surface of the truncated quadrangular pyramid, and $H_2$ is an average height of the convex portion provided in the surface portion of the first main surface positioned near the side wall corresponding to the top surface of the truncated quadrangular pyramid.

28. A light guide plate which is made of a transparent resin, said light guide plate comprising:

a first main surface; and a second main surface opposite to said first main surface, wherein said first main surface has a surface portion provided with concave portions having a depth of $5 \times 10^{-7}$ m to $6 \times 10^{-5}$ m each and a pitch of $5 \times 10^{-7}$ m to $4 \times 10^{-4}$ m, and wherein each concave portion has a surface roughness of 0.3 μm or less.

29. The light guide plate according to claim 28, wherein a value of a minimum brightness value/maximum brightness value obtained as a result of a brightness measurement of a plurality of parts of the surface portion provided with the concave portions in the first main surface satisfies at least 0.65.

30. The light guide plate according to claim 28, wherein a surface portion of the second main surface is a substantially planar surface.

31. The light guide plate according to claim 28, wherein the transparent resin is a polycarbonate resin and the light guide plate is manufactured by injection molding, and wherein each concave portion provided in the surface portion of the first main surface comprises a straight and continuous concave extending along a direction making a predetermined angle with a direction of incidence of light into the light guide plate.

32. The light guide plate according to claim 28, wherein the transparent resin is a polycarbonate resin and the light guide plate is manufactured by injection molding, and wherein each concave portion provided in the surface portion of the first main surface comprises discontinuous concaves arranged on an imaginary straight line and along a direction making a predetermined angle with a direction of incidence of light into the light guide plate.

33. The light guide plate according to claim 28, wherein the light guide plate has a the form of a wedge-shaped truncated quadrangular pyramid, wherein opposite side walls of the truncated quadrangular pyramid correspond to the first main surface and the second main surface, wherein light enters through a side wall corresponding to a bottom surface of the truncated quadrangular pyramid, and wherein the light exits from at least one of the first main surface and the second main surface.

34. The light guide plate according to claim 33, wherein an $D_2/D_1$ ratio of at least 0.8 is satisfied, in which $D_1$ is an average depth of the concave portion provided in the surface portion of the first main surface positioned near the side wall corresponding to the bottom surface of the truncated quadrangular pyramid, and $D_2$ is an average depth of the concave portion provided in the surface portion of the first main surface positioned near the side wall corresponding to the top surface of the truncated quadrangular pyramid.

* * * * *